(12) United States Patent
Miyao et al.

(10) Patent No.: US 6,466,237 B1
(45) Date of Patent: Oct. 15, 2002

(54) INFORMATION MANAGING DEVICE FOR DISPLAYING THUMBNAIL FILES CORRESPONDING TO ELECTRONIC FILES AND SEARCHING ELECTRONIC FILES VIA THUMBNAIL FILE

(75) Inventors: Nobuyoshi Miyao, Sakurai; Yoshiaki Tomaru, Yamatokoriyama; Kazuyuki Motowaki, Nabari; Miyoko Maruyama, Higashiosaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/354,311

(22) Filed: Jul. 16, 1999

(30) Foreign Application Priority Data

Jul. 28, 1998 (JP) .......................................... 10-213255
Dec. 8, 1998 (JP) .......................................... 10-349082

(51) Int. Cl.7 ................................................ G09G 5/00
(52) U.S. Cl. ...................................... 345/838; 345/848
(58) Field of Search ........................ 345/700, 764–767, 345/775–776, 781–784, 788–805, 810–811, 834–840, 848–854, 419, 427, 581, 619, 625, 649, 660, 684; 700/500, 526

(56) References Cited

U.S. PATENT DOCUMENTS 5,499,330 A * 3/1996 Lucas et al. ................ 345/764
5,977,974 A 11/1999 Hatori et al. ................ 345/839
6,005,578 A * 12/1999 Cole .......................... 345/854
6,006,227 A * 12/1999 Freeman et al. ............ 707/102
6,054,989 A * 4/2000 Robertson et al. .......... 345/727
6,069,606 A * 5/2000 Sciammarella et al. ..... 345/660

FOREIGN PATENT DOCUMENTS

| EP | 0 717 346 | 6/1996 |
| JP | 5-66910 A | 3/1993 |
| JP | 5-80965 A | 4/1993 |
| JP | 7-200635 A | 8/1995 |

* cited by examiner

*Primary Examiner*—Crescelle N. dela Torre
(74) *Attorney, Agent, or Firm*—Nixon & Vanderhye P.C.

(57) ABSTRACT

An information managing device includes a liquid crystal display section and thumbnail display means. The liquid crystal display section displays a cluster of file bundles that are thumbnail files each corresponding to one of the image files, so as to enable searches through image files displayed as original document bundles. The thumbnail display means displays the images in the cluster of file bundles on the liquid crystal display section so as to partially overlap each other in a three-dimensional configuration. With the aforementioned device, a stored image file can be easily searched for on the display screen.

40 Claims, 82 Drawing Sheets

REGISTER

ACTIVATE TIMER
SET TIMER TO "SLOW"
FIG.20 (a)
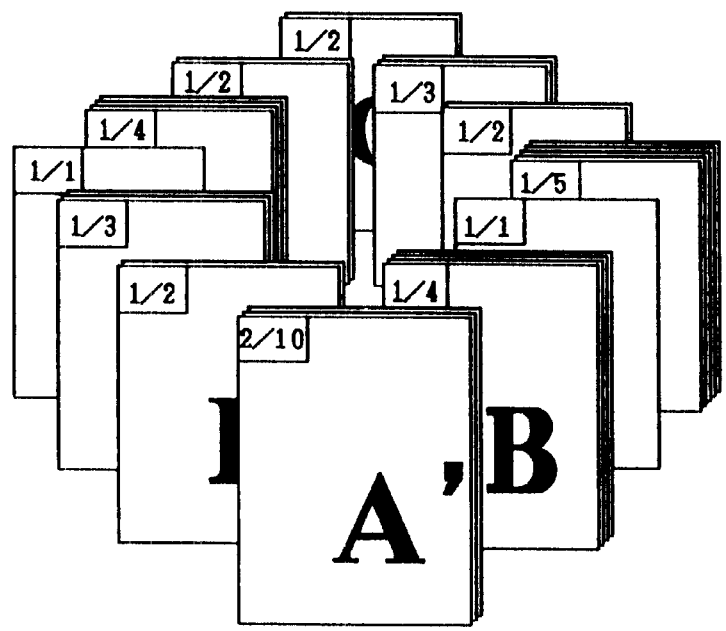
FIG.20 (b)
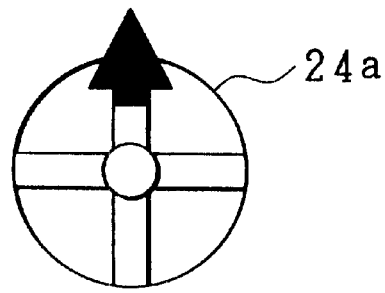

FIG. 21
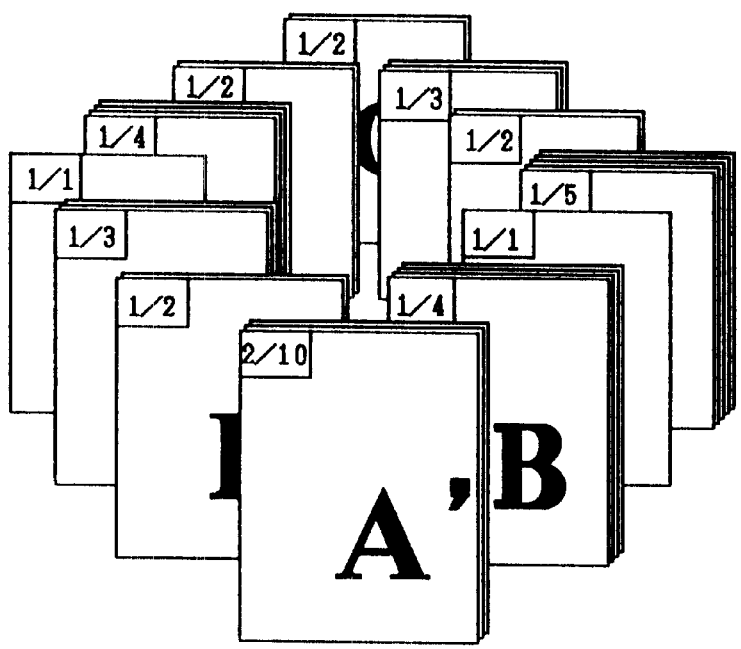
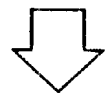
PRESSED 3 SECONDS OR LONGER?
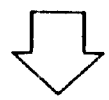
SET TIMER TO "FAST"
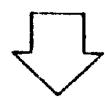
RETURN TO S125

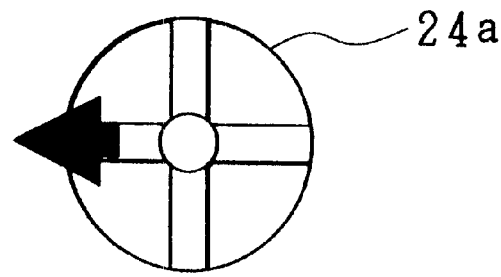
FIG.23 (a)
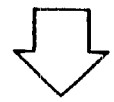
ACTIVATE TIMER
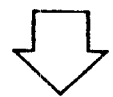
SET TIMER TO "SLOW"
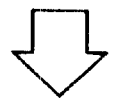
FIG.23 (b)
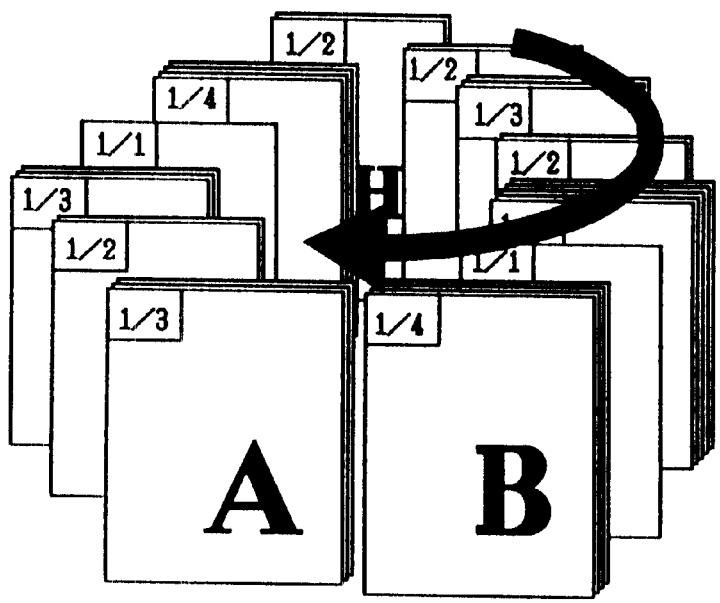

FIG.24 (a)
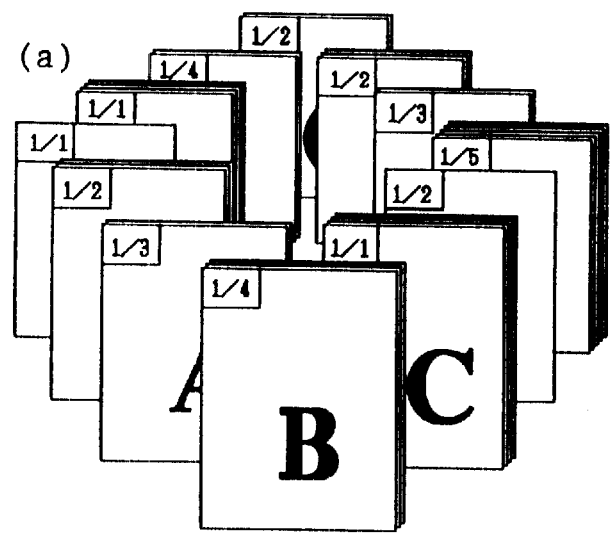
FIG.24 (b)
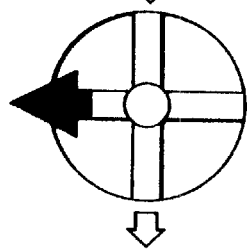
FIG.24 (c)
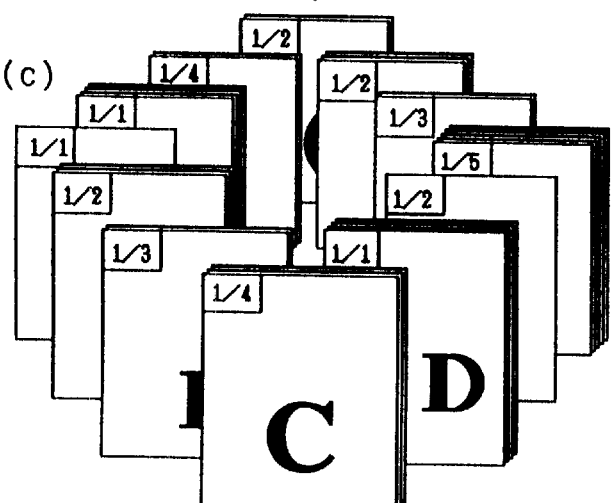
PRESSED 3 SECONDS OR LONGER?
SET TIMER TO "FAST"
RETURN TO S134

FIG. 26 (a)
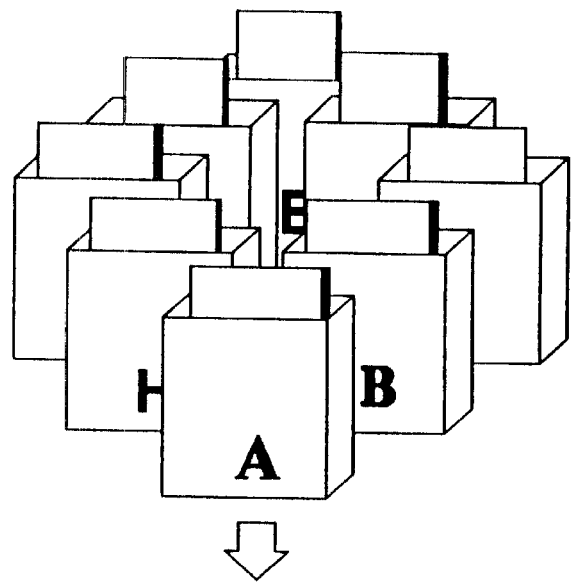
FIG. 26 (b)
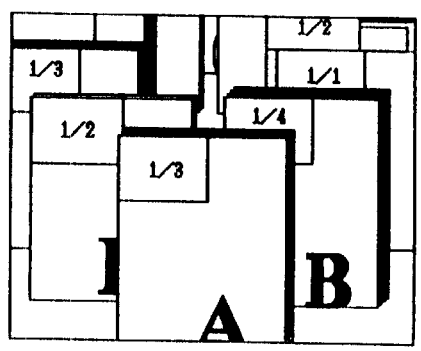
FIG. 26 (c)
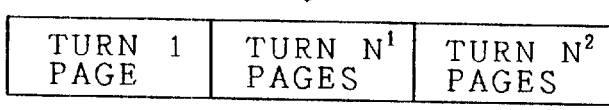
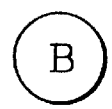
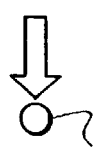

READ PARAMETERS

REGISTER

FIG. 58 (a)
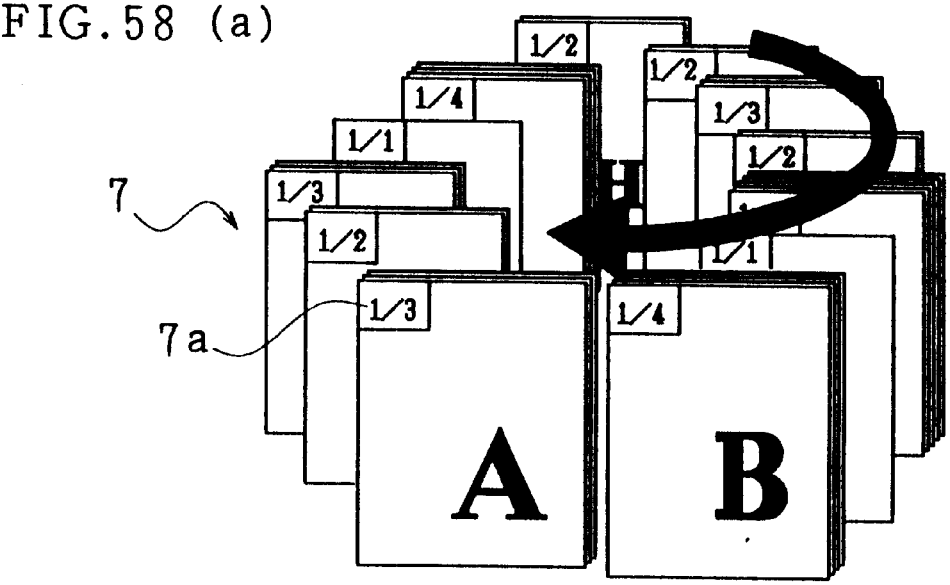
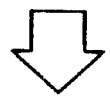
FIG. 58 (b)
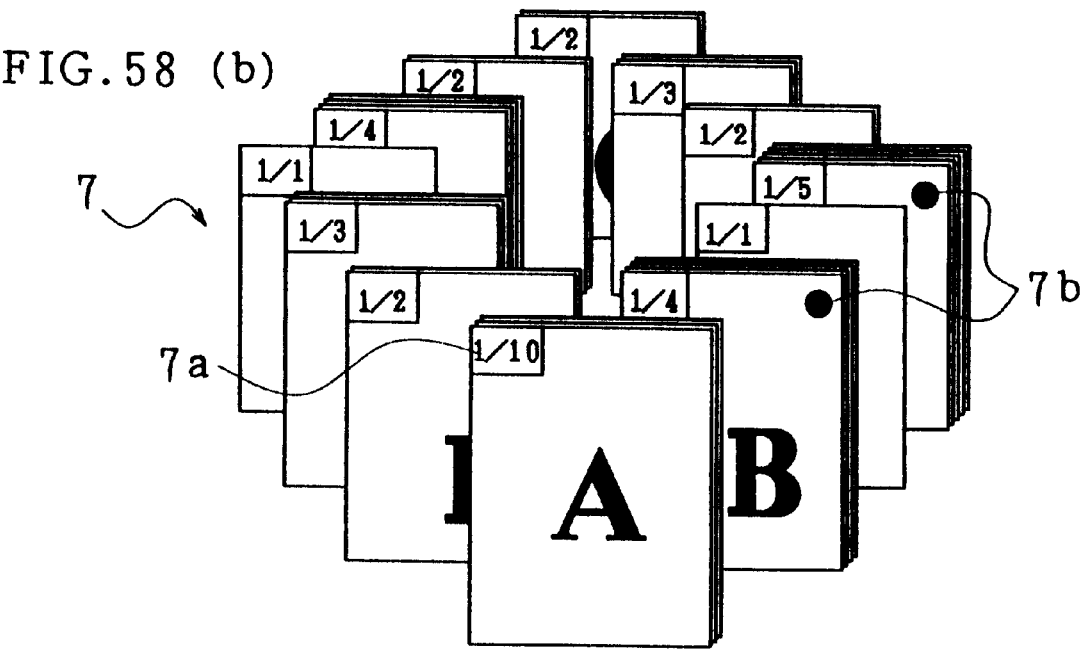

⇧ GROUP

⇩ SYNTHESIZE

ASSOCIATED (SYNTHESIZE)

FIG.65 (a)
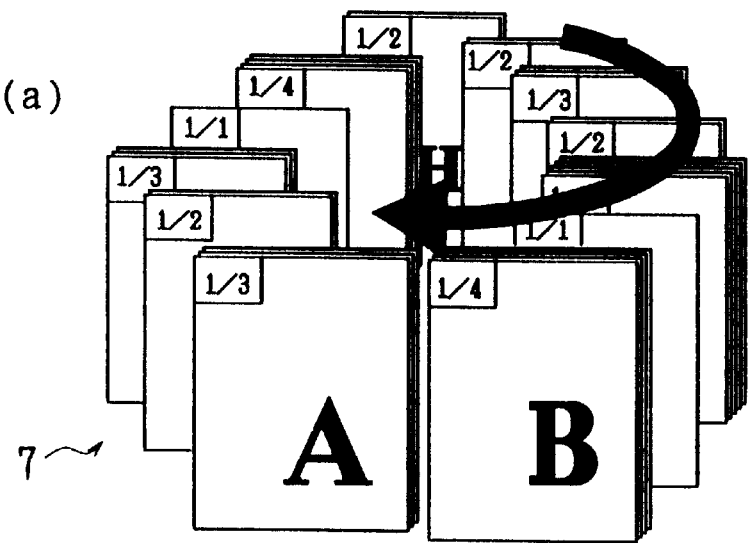
FIG.65 (b)
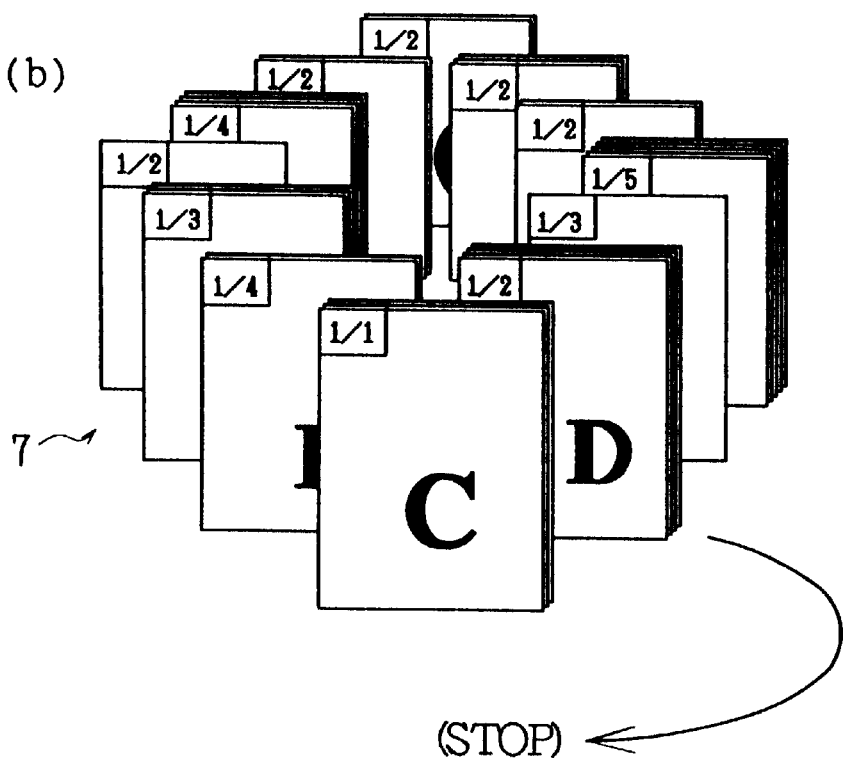
(STOP)

FIG. 67 (a)
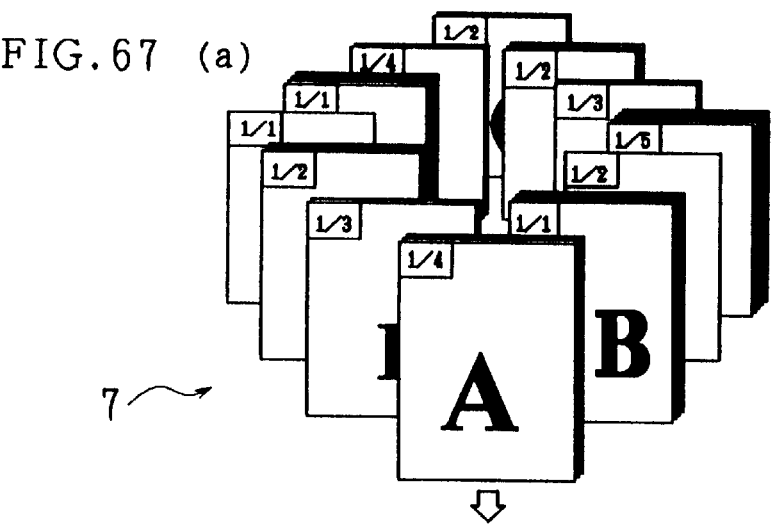
FIG. 67 (b)
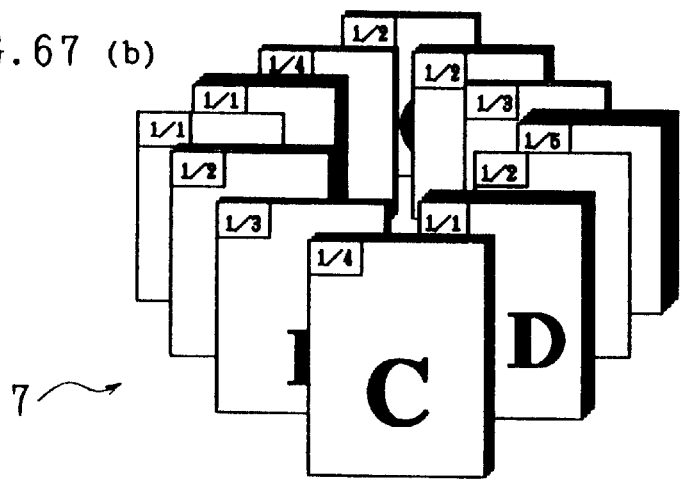
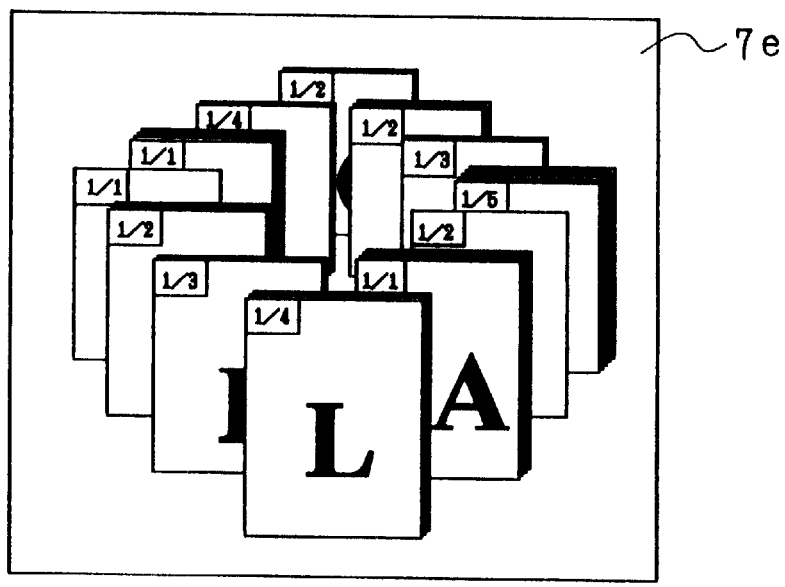

SCROLL UP

SCROLL DOWN

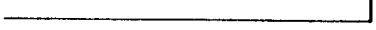
FIG. 70 (a)
FIG. 70 (b)
FIG. 70 (c)
SCROLL RIGHT
SCROLL UP FIG. 73 (a)
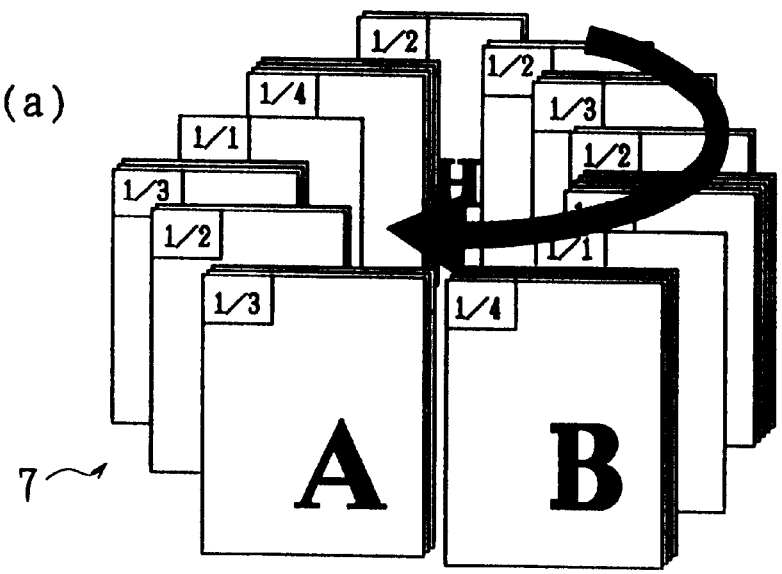
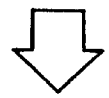
FIG. 73 (b)
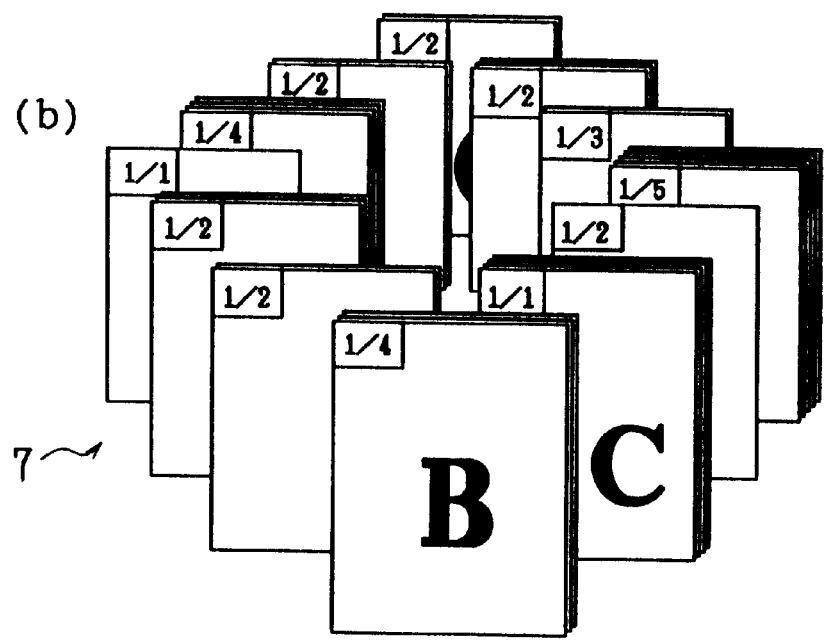

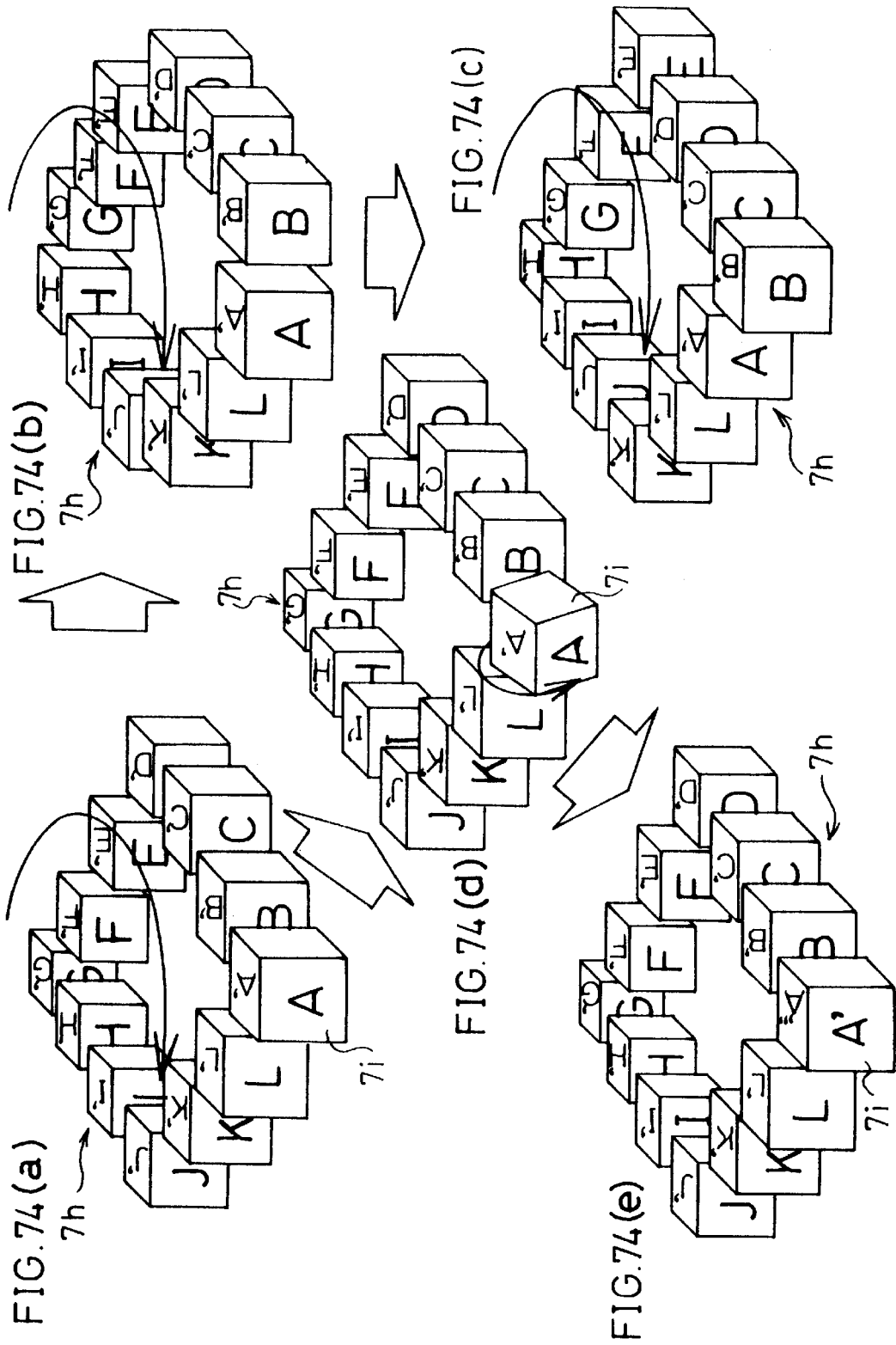

FIG. 77 (Prior Art)

| NAME | SIZE | TYPE OF FILE | CREATED ON | LAST MODIFIED ON |
|---|---|---|---|---|
| ☐ FLOWER 35 | 64KB | TIFF | H9.12.21 | H9.12.22 |
| ☐ LANDSCAPE 19 | 128KB | TIFF | H9.12.02 | H9.12.31 |
| ☐ LANDSCAPE 3 | 23KB | JPEG | H4.08.15 | H4.08.16 |
| ☐ BUILDING 1 | 2MB | BMP | H6.01.08 | H6.09.08 |
| ☐ PEOPLE 36 | 10KB | JPEG | H7.03.12 | H7.05.12 |
| ☐ FLOWER 20 | 10MB | BMP | H8.10.19 | H8.10.19 |
| ☐ FLOWER 6 | 1011KB | TIFF | H3.02.20 | H4.02.20 |
| ☐ PEOPLE 60 | 50KB | JPEG | H8.04.30 | H8.06.30 |
| ☐ BUILDING 5 | 90KB | TIFF | H7.08.01 | H7.08.10 |
| ☐ PEOPLE 9 | 26KB | JPEG | H9.03.19 | H9.04.19 |

101

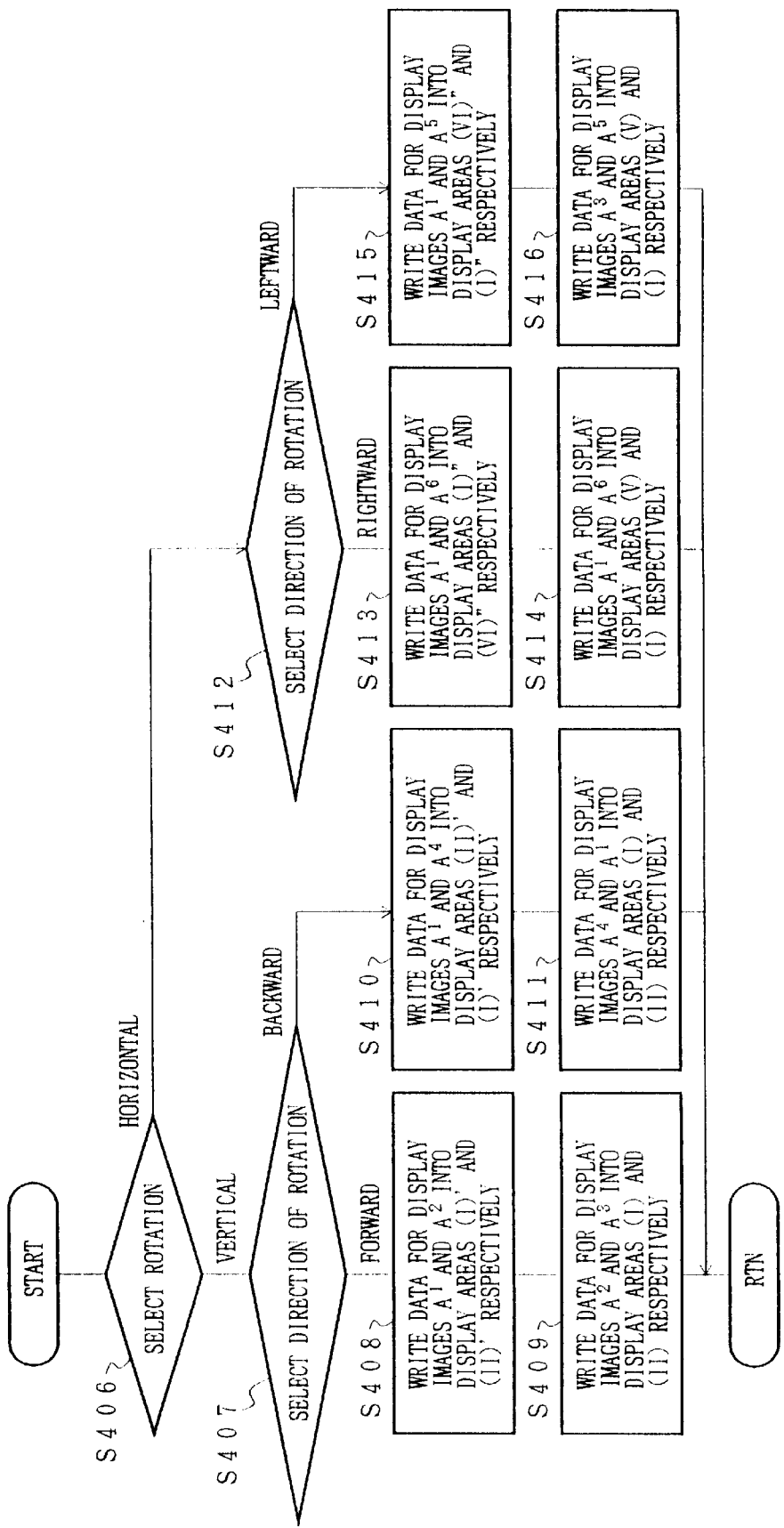

INFORMATION MANAGING DEVICE FOR DISPLAYING THUMBNAIL FILES CORRESPONDING TO ELECTRONIC FILES AND SEARCHING ELECTRONIC FILES VIA THUMBNAIL FILE

FIELD OF THE INVENTION

The present invention relates to an information managing device, for use with a computer, incorporating an external storage device, an image input and output device, and an electronic file.

BACKGROUND OF THE INVENTION

Prior art information managing devices include those which display the file names of stored electronic files as a top-to-bottom list on a display screen 101 as shown in FIG. 77 so as to allow the user to select desired files from the list displayed on the display screen 101 by moving the cursor.

This list-display method enables a lot of information to be displayed as an at-a-glance list. However, the amount of information displayed only by characters and numbers is rather limited, which renders it difficult for the user to conduct an intuitive search, and makes the search process for the necessary information time-consuming as well as inconvenient.

Accordingly, to solve the above problem, Japanese Laid-Open Patent Application No. 7-200635/1995 (Tokukaihei 7-200635, published on Aug. 4, 1995) disclosed an information managing device as shown in FIG. 78 which displays images (thumbnail images 102) that are smaller in size than the corresponding original ones on the display screen 101 so that the user can conduct a search of the stored file information through the displayed thumbnail images 102.

The information managing device allows the user to conduct an intuitive and quick file search through the display thumbnail images 102 by displaying the thumbnail images 102 on the display screen 101.

Still, the information managing device disclosed in the Patent Application leaves some problems unaddressed: the side-by-side display of the thumbnail images, although enabling an intuitive search, does not allow the user to view a lot of information simultaneously; if a large number of thumbnail images are displayed in the screen simultaneously, the thumbnail images are displayed in such small sizes on the display screen that the user might have some difficulties in visually identifying images such as painted pictures, let alone information represented by characters and logos.

SUMMARY OF THE INVENTION

The present invention has an object to offer information managing devices for manipulating electronic files, especially portable information managing devices equipped only with a small display device, that can still realise a convenient file search by taking advantage of deductive reasoning ability for a human to understand the whole from a limited amount of information, as well as by simplifying the operation system.

The present invention has another object to offer information managing devices that can display as many thumbnail images associated with the stored files as possible in sizes that allow the user to see and identify those thumbnail images displayed on the display screen.

The present invention has another object to offer information managing devices that are multifunctional, but yet come in relatively small sizes, as benefits of the multifunctionality of the information input means and the storage means provided to the information managing devices including the information managing capability, and that act also as external input and storage devices offering easy operability.

In order to achieve the above objects, an information managing device in accordance with the present invention is an information managing device for displaying thumbnail files corresponding to an image file to allow a search through the thumbnail files for an image file, and is arranged so that thumbnail display means for displaying the thumbnail files is specified to configure the images of the thumbnail files so as to partially overlap each other in a three-dimensional manner.

With the arrangement, since the thumbnail files are displayed in a three-dimensional configuration, the thumbnail file on the foreground can be specified to have a size large enough to visually identify the thumbnail file, and those thumbnail files behind the thumbnail file on the foreground are partially displayed, thereby allowing the user to obtain some information on the contents of the thumbnail files in the back.

Consequently, with the aforementioned arrangement, since the thumbnail files are displayed in a three-dimensional manner, more thumbnail files can be displayed on the display screen than conventional techniques, having an advantage that searches can be conducted more quickly through a cluster of thumbnail files for the image file corresponding to a desired thumbnail file.

Another information managing device in accordance with the present invention is, as mentioned above, an information managing device for displaying thumbnail files each corresponding to an image file to allow a search through the thumbnail files for an image file, and is arranged so that thumbnail display means for displaying the thumbnail files is specified to display the thumbnail files so as to overlap each other partially, sequentially, and diagonally from a front row to a far back row that is higher in position than the front row in accordance with positions of the thumbnail files in the configuration, so that upper portions of the thumbnail files are visible.

Therefore, with the aforementioned arrangement, the thumbnail files are displayed so as to overlap each other partially, sequentially, and diagonally from a front row to a far back row that is higher in position than the front row in accordance with positions of the thumbnail files in the configuration, so that upper portions of the thumbnail files are visible. As a result, the thumbnail file on the foreground can be specified to have a size large enough to easily visually identify the thumbnail file, and those thumbnail files behind the thumbnail file on the foreground are partially displayed, thereby allowing the user to obtain some information on the contents of the thumbnail files in the back.

Consequently, with the aforementioned arrangement, since the thumbnail files are displayed so as to overlap each other partially, more thumbnail files can be displayed on the display screen than conventional techniques, having an advantage that searches can be conducted more quickly through a cluster of thumbnail files for the image file corresponding to a desired thumbnail file.

Still another information managing device in accordance with the present invention, in order to achieve the aforementioned objects, is an information managing device including:

a rectangular parallelopiped device main body;

storage means for storing image information in the device main body;

display means provided with a display screen for displaying the image information stored in the storage means on the device main body; and a substantially rectangular parallelopiped scanner provided with a reading section for optically scanning the image information from an original document sheet and also with a transmission section for transmitting the image information to the storage means, and is arranged so that the scanner is freely attachable to, and removable from, the device main body in a first position and a second position, the first position being such that at least one of outside surfaces of the scanner forms a flush plane with a surface of the device main body, the surface being substantially parallel to the display screen, the second position being such that the reading section of the scanner opposes a surface of the device main body, the surface being substantially parallel to the display screen.

Therefore, with the aforementioned arrangement, the scanner is freely attachable to, and removable from, the device main body in a first position and a second position. As a result, the scanner in the first position is highly integrated into the device main body, allowing easy and convenient installation of the scanner on the desk and enhancing portability of the scanner. The scanner is in the second position forms a transport guide surface for original document sheets from the surface that is substantially parallel to the display screen on the device main body, and can stabilise reading of information on the original document sheet through the reading surface of the scanner, facilitating information input.

Furthermore, with the aforementioned arrangement, the scanner is freely attachable to, and removable from, the device main body. As a result, the scanner becomes capable of freely scanning information drawn on a variety of original documents, further facilitating information input.

For a fuller understanding of the nature and advantages of the invention, reference should be made to the ensuing detailed description taken in conjunction with the accompanying drawings.

BRIEF DESCRIPTION OF THE DRAWINGS

FIG. 20($a$) and FIG. 20($b$) are explanatory drawings explaining succeeding operations to specify the aforementioned page turning rate.

FIG. 21 is an explanatory drawing explaining further succeeding operations to specify the aforementioned page turning rate.

FIG. 23($a$) and FIG. 23($b$) are explanatory drawings explaining operations to specify the aforementioned rotation rate.

FIG. 24($a$) to FIG. 24($c$) are explanatory drawings explaining succeeding operations to specify the aforementioned rotation rate.

FIG. 26($a$) to FIG. 26($c$) are explanatory drawings explaining an example of operations to specify the aforementioned display position.

FIG. 58(a) and FIG. 58(b) are explanatory drawings showing display portions provided to the cluster of file bundles displayed on the aforementioned information managing device.

FIG. 65(a) and FIG. 65(b) are an explanatory drawings showing the rotation operation of the cluster of file bundles being temporality suspended on the aforementioned information managing device.

FIG. 67(a) and FIG. 67(b) are explanatory drawings showing a cluster of the aforementioned deleted file bundles being displayed in the form of a ring.

FIG. 70(a) to FIG. 70(c) are explanatory drawings showing the aforementioned plurality of ring-form displays being scrolled horizontally and vertically.

FIG. 72 is an explanatory drawing showing the aforementioned plurality of ring-form displays displayed in groups according to the number of times searched for.

FIG. 73(a) is an explanatory drawing showing, in the aforementioned ring-form display, file bundles that have not been searched for for a certain period of time, before those file bundles are deleted from the cluster of file bundles displayed in the form of a ring.

FIG. 73(b) is an explanatory drawing showing, in the aforementioned ring-form display, file bundles that have not been searched for for a certain period of time, after those file bundles are deleted from the cluster of file bundles displayed in the form of a ring.

FIG. 74(a) to FIG. 74(e) are explanatory drawings showing, in the aforementioned ring-form display, the file bundles displayed on the surfaces of a polyhedron.

FIG. 77 is an explanatory drawing showing a search screen of a conventional information managing device.

FIG. 83 is a flow chart showing procedures for the aforementioned information managing device to display thumbnail files as images on the surfaces of a polyhedron in a rotational movement.

DESCRIPTION OF THE EMBODIMENTS

Embodiment 1

Referring to FIG. 1 to FIG. 9, the following description will explain embodiment 1 in accordance with the present invention. First of all it should be noted that the electronic filing device related with an information managing device in accordance with the present invention works with especially high efficiency when applied to a portable terminal device that is a display/operation system having restrictions on the size thereof. Accordingly, in the description hereafter, to better illustrate the invention, an example is taken where the invention is applied to a portable electronic filing device, rather than to other kinds of devices.

Figure 1:
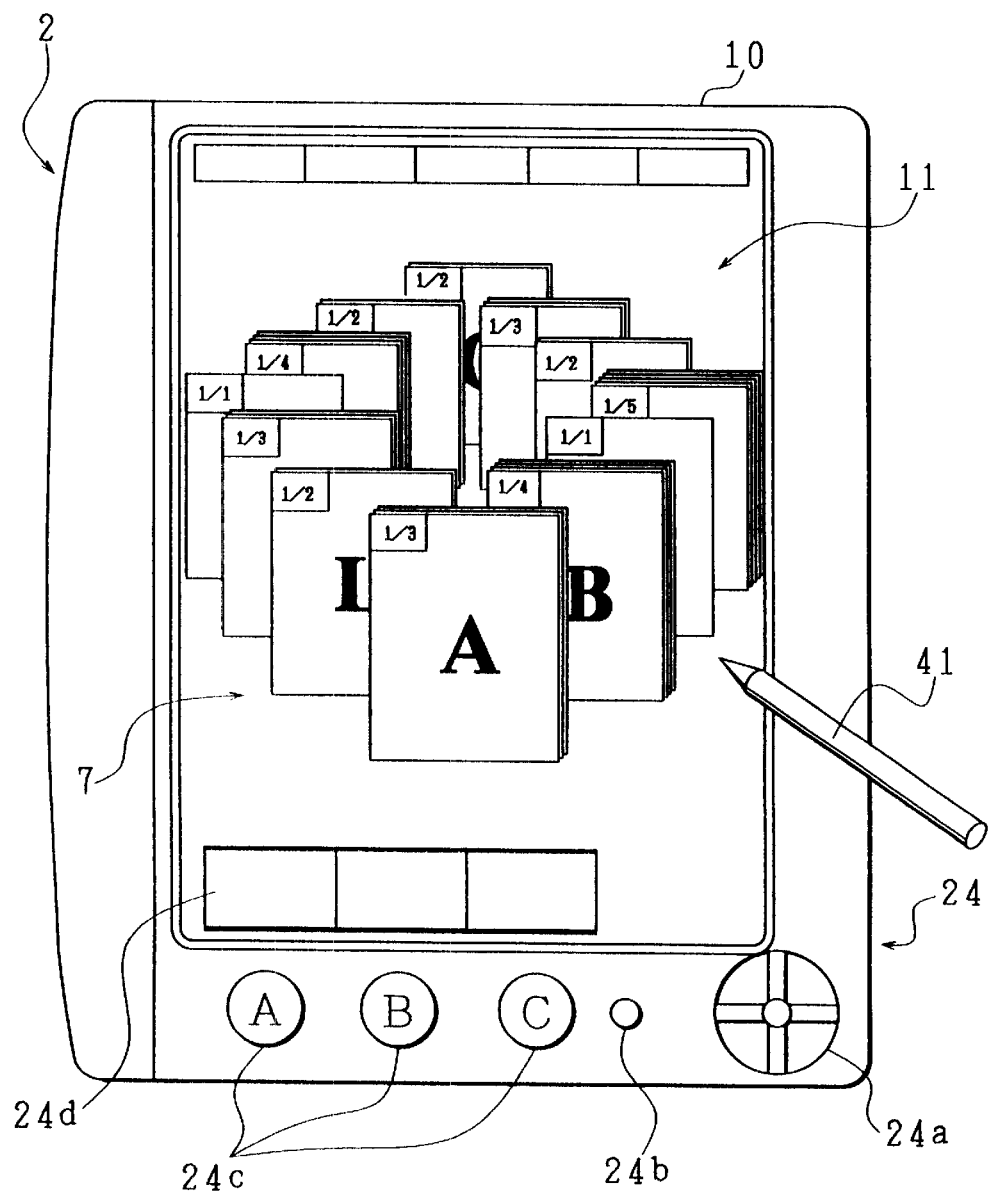
FIG. 1 is a schematic plan view illustrating an information managing device in accordance with the present invention.
Figure 2:
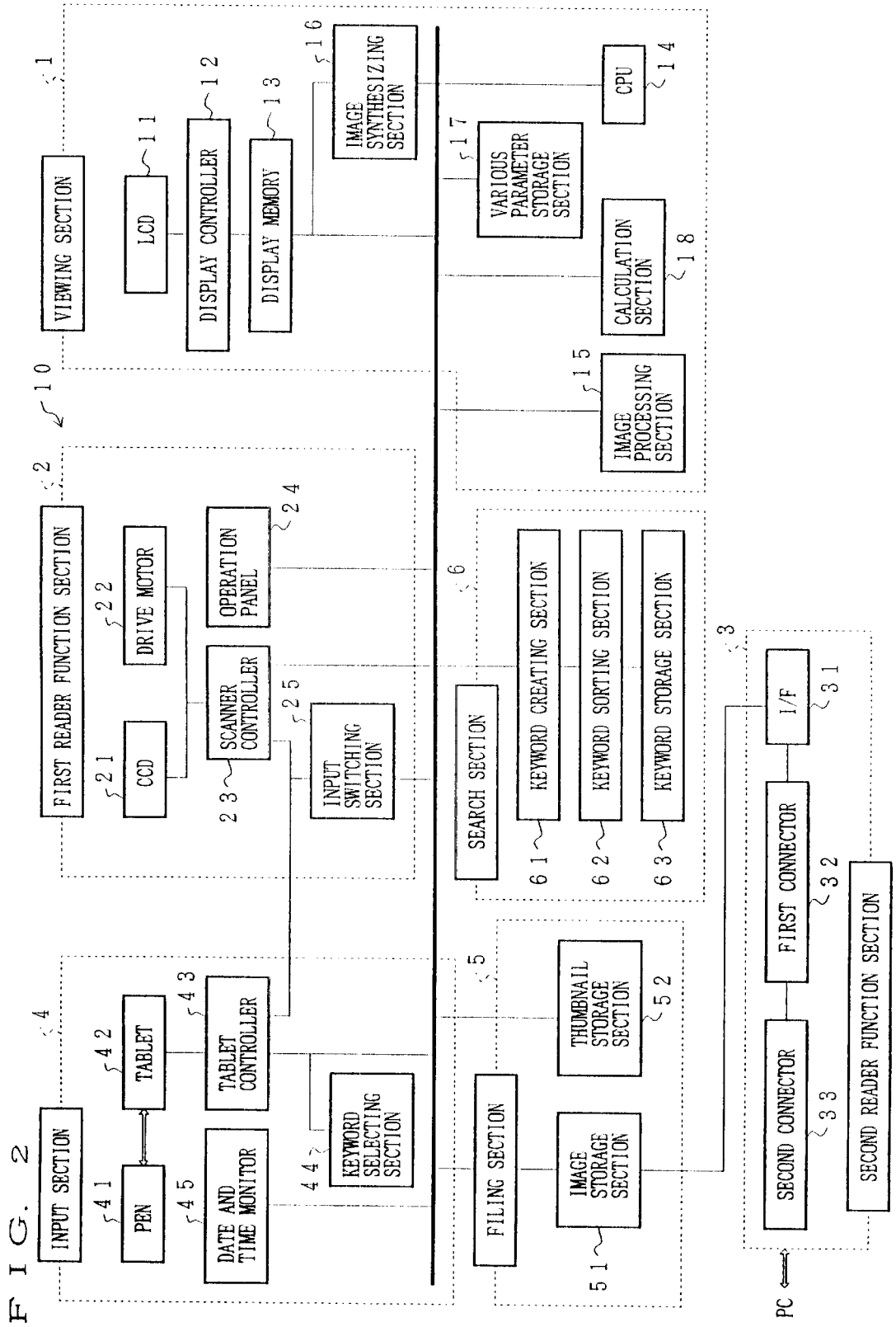
FIG. 2 is a block diagram showing an arrangement of the aforementioned information managing device.

The electronic filing device includes a portable, flat, substantially rectangular parallelopiped device main body 10 shown in FIG. 1 which incorporates, as shown in FIG. 2, a viewing section 1, a first reader function section 2, a second reader function section 3, an input section 4, a filing section 5, and a search section 6.

The viewing section 1 is for displaying image information such as images, characters, and symbols. The first reader function section 2 and the second reader function section 3 each are for reading external image information. The input section 4 is for enabling the user to directly input information using keywords or an input pen. The filing section 5 is for storing the read or input image information. The search section 6 is for storing/generating additional information, such as keywords, for the inputted image information.

The viewing section 1 includes an image display device which incorporates a central processing unit (hereinafter, will be referred to as CPU) 14 and a liquid crystal display section (hereinafter, will be abbreviated as LCD) 11, and is primarily for displaying images and controlling contents displayed on the LCD 11. The LCD 11 is for displaying image information, and is provided with, for example, a 6-inch display surface. Further incorporated in the image display device are a display controller 12, a display memory 13, an image processing section 15, an image synthesizing section 16, a various parameter storage section 17, and a calculation section 18. The display controller 12 is for controlling the LCD 11. The display memory 13 is for temporarily storing display contents. The image processing section 15 is for rotating, scaling, and performing other processes on the image. The image synthesizing section 16 is for synthesizing an original image with identification tags such as characters, markers, and headers. The various parameter storage section 17 is for storing initial settings, last-modified settings, and other settings for various operations to execute a solid (three-dimensional) display, for example, a ring display. The calculation section 18 is for comparing searched-for text with the stored text during a search.

The control operations in the embodiments below are all controlled by the CPU 14 unless otherwise stated. Accordingly, the CPU 14 has functions as thumbnail display means and image file display means.

The first reader function section 2 is composed of a CCD (Charge Coupled Device) 21, a drive motor 22, a scanner controller 23, an operation panel 24, and an input switching section 25. The CCD 21 is for converting document information, such as images, characters, and symbols, which is to be stored, and then outputting resultant electric signals, the document information being written or drawn on the surface of an original (document) that is a sheet-like object such as a piece of paper. The drive motor 22 is for transporting the document piece by piece to input the document information. The scanner controller 23 is for controlling the CCD 21 and the drive motor 22. The operation panel 24 is for allowing the user to manipulate an operation button section to control major operations of the whole device. The input switching section 25 is for manipulating the switching between a pen input, document input (single sheet input), and primary input (used with the CCD 21 and the drive motor 22 removed).

The first reader function section 2 is primarily composed of a conversion section for converting document information into electric signals inputted to the present device, and the operation panel 24 for allowing the user to manipulate major operations of the present device.

The operation panel 24 incorporates, as shown in FIG. 1, a cross key 24a, a mode switching key 24b, a display key section 24d, and command keys 24c. The cross key 24a is for entering a command for a rotation, scaling and a vertical or horizontal scroll of an image displayed on the LCD 11. The mode switching key 24b is for switching modes among A, B, C, and D whereby the user can enter various commands. The display key section 24d is displayed at the bottom of the display screen of the LCD 11 and changes in accordance with the modes A to D. The command keys 24c are for selectively entering commands displayed at the display key section 24d.

Moreover, since the surface of the operation panel 24 acts as a transport path for an original document scanned by a later-detailed hand scanner main body 2, the cross key 24a, the mode switching key 24b, and the command keys 24c are mounted on the operation panel 24 so as to form a flush surface with the operation panel 24, that is, so as not to protrude from the surface of the operation panel 24.

The second reader function section 3 includes, as shown in FIG. 2, an interface (hereinafter, I/F) 31, a first connector 32, and a second connector 33. The I/F 31 is an interface for transmitting the document information. The first connector 32 is for connecting the device main body 10 to a later mentioned cradle section (not shown) which is a housing device relay. The second connector 33 is for connecting the cradle section to a personal computer (not shown).

The second reader function section 3 is for transmitting information to and from the personal computer when the device main body 10 is housed in the concave cradle section that is provided to a later mentioned relay. The cradle section is a connector relay section (doubles as a housing in the present device) that is configured to offer easy plugging between the device main body 10 and the personal computer.

The aforementioned input section 4 is provided with a pen 41, a tablet 42, a tablet controller 43, a keyword selecting section 44, and a date and time monitor 45. The pen 41 is a device for direct data input into the present device and other manipulations. The tablet 42 is for converting information drawn on the LCD 11 with the pen 41 into electric signals. The tablet controller 43 is for controlling the tablet 42. The keyword selecting section 44 is for sending inputted or selected keywords to the search section 6. The date and time monitor 45 is for adding, on the stored information, time-related information such as the date and time when the information was stored and updated, and sending the resultant information to the search section 6.

Accordingly, the aforementioned input section 4 is for handling handwritten information inputted by the user with the pen 41 on the tablet 42 and also handling additional information inputted by the user adding keywords to the stored (saved) document information.

The aforementioned filing section 5 includes an image storage section 51 and a thumbnail storage section 52, and is primarily for storing fed document information and image information on a search example file bundle corresponding to the document information. The image storage section 51 is for storing inputted document information (image files). The thumbnail storage section 52 is for storing a search example file bundle (thumbnail files) corresponding to the stored document information.

Typically, a large capacity hard disk, for example, one having a storage capacity of about 4G bytes is used as the image storage section 51 and the thumbnail storage section 52 by making partitions in the storage area of the hard disk because of the large amount of data to be stored. The file bundle as a search example may be scaled-down corresponding document information, or an image or title representative of the corresponding document information.

The search section 6 is composed of a keyword creating section 61, a keyword sorting section 62, and a keyword storage section 63, and is primarily for handling the storing of document information and the creation of keywords for stored document information. The keyword creating section 61 is for creating keywords from unique information, such as file format, of the stored document information. The keyword sorting section 62 is for sorting those created or added keywords. The keyword storage section 63 is for storing the keywords.

In the present invention, to facilitate the document information search, as shown in FIG. 1, a cluster of file bundles 7 that are displayed on the display screen of the LCD 11 as, for example, scaled-down images are positioned three-dimensionally and sequentially from the foreground towards the back row so that the file bundles partially overlap each other to form a ring, for example. The images of the file bundles each correspond to an image of thumbnail files. Alternatively the image of a folder group, rather than the image of the file bundle, may be used as the image of the thumbnail files.

A folder is a representation of a cluster of file bundles collected according to common features such as keywords with a folder icon that has a rectangular parallelopiped shape. Accordingly, in the present invention, a specification is made so that as a desired folder is selected from a folder group on the display screen with, for example, the pen 41, the display screen of the LCD 11 changes so that the file bundles contained in the selected folder are displayed as a cluster of file bundles in the form of a ring.

Moreover, a specification is made on the display so that the file bundles, or a folder, appear so as to allow the user to see and easily identify the number of pages and approximate number of files on the LCD 11. A further specification is made, if necessary, so that the number of displayed pages and the total number of pages are displayed, for example, in the upper left corner of the file bundle.

The following description will explain in further detail methods in accordance with the present invention. As to the file bundle, or the folder, that is placed in the front row (namely, the file bundle A), the whole part thereof is displayed. As to the file bundles, or the folder, placed in the second row in the virtual solid (three-dimensional) positioning (namely, the file bundles B and L), a part thereof is hidden, and therefore unseen, behind the file bundle, or the folder, that is placed in the front row (namely, the file bundle A).

In the same manner, the file bundles (the file bundle C, K) (not shown), or the folder, placed in the next row (back row) to the file bundle (the file bundle B and L), or the folder, are positioned on the display screen of the LCD 11 so as to be hidden by the immediate front row, so that in the last the positioning layout of the cluster of the file bundles, or the folder group, is three dimensional with the front row positioned lowest of all and the following rows ascending diagonally. An example of the layout is shown in FIG. 1 which forms a ring-like shape.

Moreover, so as to realise a virtual three-dimensional structure, the cluster of the file bundles, or the folder group, positioned in the form of a ring has a structure such that the display image size of the file bundles, or the folder, positioned in a back row is sequentially smaller than the display image size of the file bundles, or the folder, positioned in an immediate front row thereof.

As a result, in the present invention, the cluster of the file bundles, or the folder group, is specified so that the file bundles, or the folder group, partially overlap each other and that the display image size decreases sequentially from the foreground towards the back row. Consequently, easy identification of many files is ensured where a large number of the file bundles, or the folder group, are displayed on the display screen of the LCD 11, and at the same time at least the image in the foreground, for example, the file bundle A in FIG. 1, is specified to have a size that allows the user to read and easily identify characters and logos displayed in the image.

Next, the following description will explain specific operations to display the cluster of the file bundles, or the folder group, three-dimensionally, for example, in the form of a three-dimensional ring.

Figure 3:
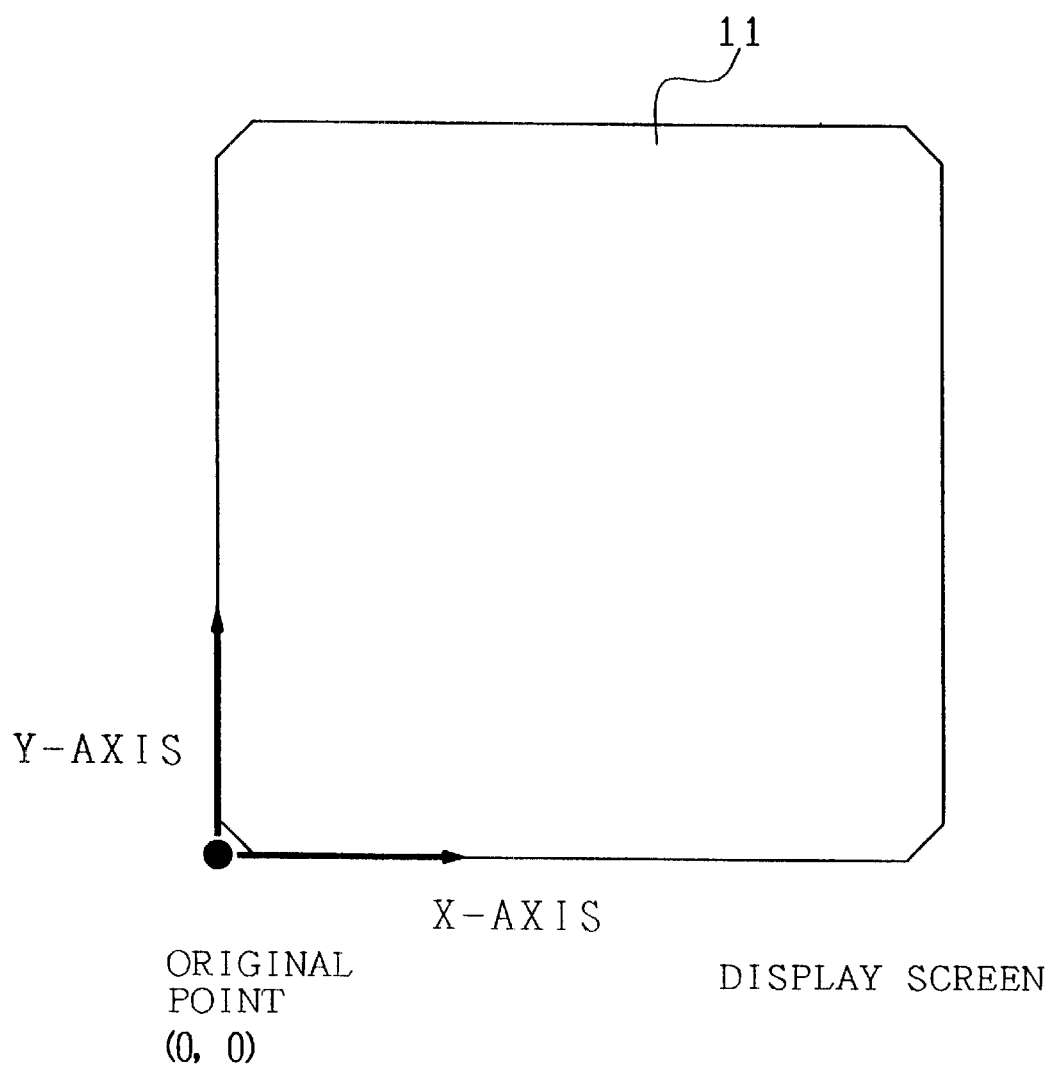
FIG. 3 is an explanatory drawing showing positional co-ordinates on the display screen of the aforementioned information managing device.

First, the following description will explain means to display the cluster of the file bundles in the form of a three-dimensional ring. First, the rectangular display screen of the LCD 11, as shown in FIG. 3, is such that a predetermined corner of the display screen of the LCD 11, for example, the bottom left corner is specified as the original point (0, 0), an X-axis and a Y-axis are assumed respectively as the axis of abscissas and as the axis of ordinates starting from the original point, and undisplayed rulers are specified along the X- and Y-axis as positional co-ordinates.

Figure 4:
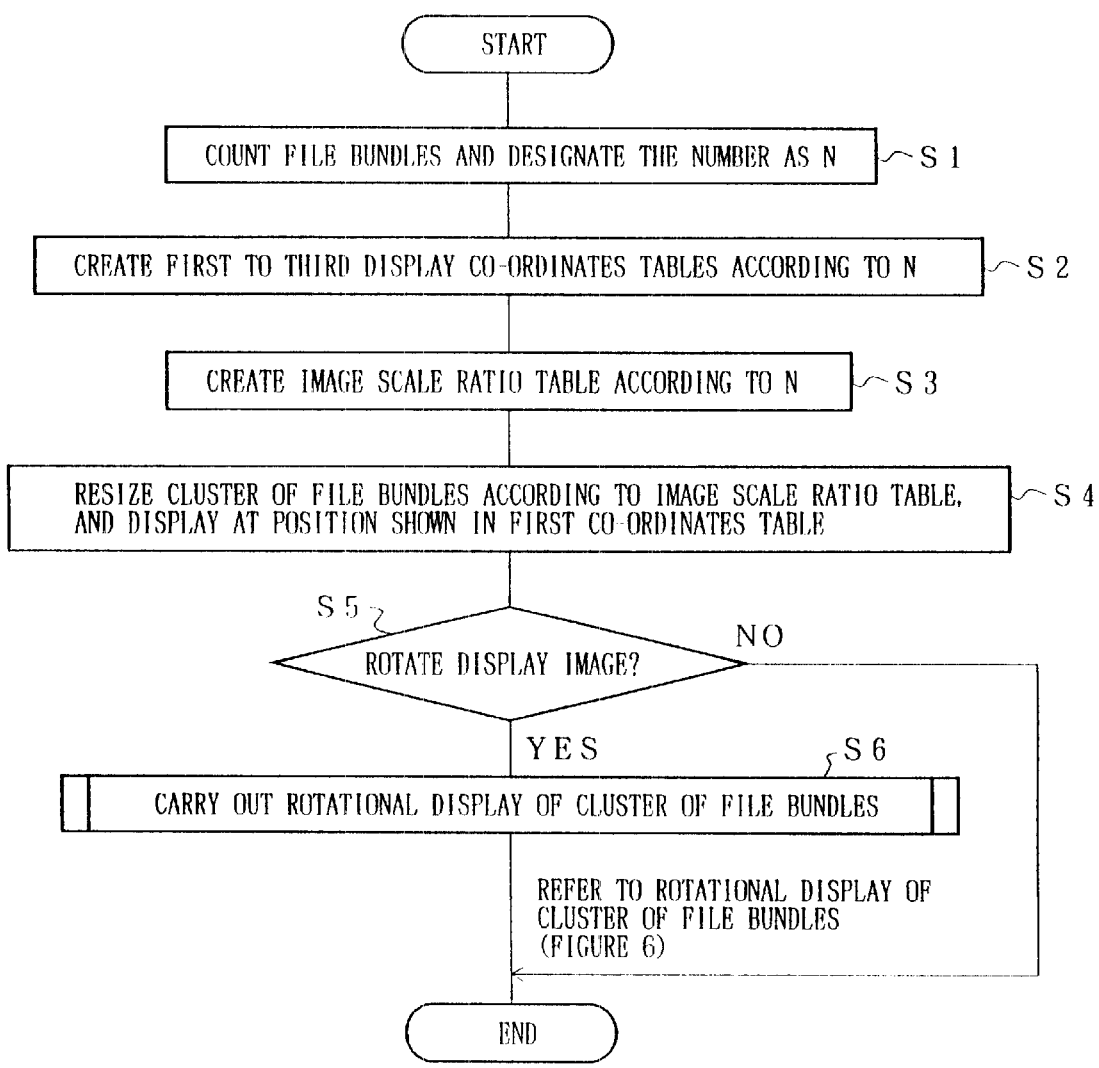
FIG. 4 is a flow chart showing procedures for the aforementioned information managing device to arrange a cluster of file bundles.

Referring to the flow chart shown in FIG. 4, the following description will explain procedures for the ring-form display on such a display screen. First, the total number of the file bundles is counted (step 1: hereinafter, a step will be abbreviated as S). Here, since the same process as that explained below may be applied to clusters including different numbers of file bundles, an example is taken in the description below where there are four file bundles and there are two-stepped rotations involved.

According to the number counted (four bundles), the co-ordinates tables 1, 2, and 3 shown respectively in Tables 1, 2, and 3 are created, and the positional co-ordinates are specified by associating the co-ordinates tables to the co-ordinate axis rulers on the aforementioned display screen (S2). The image P shown in Tables 1 to 3 represents the position of the image. The second co-ordinates table is for a clockwise rotation, and the third co-ordinates table is for an anti-clockwise rotation. Subsequently, the scale ratio whereby the source image is incorporated in the positional co-ordinates is obtained according to which the source image changes the size thereof, and the image scale ratio table shown in Table 4 is made according to the positional co-ordinates (S3).

TABLE 1

First Co-Ordinates Table

| Display screen | Image P | Co-Ordinates |
|---|---|---|
| 1 | a | (Xa Ya, xa ya) |
| 2 | b | (Xb Yb, xb yb) − (Xa Ya, xb yb) |
| 3 | c | (Xc Yc, xc yc) − (Xc Yb, xb yc) − (Xd Yd, xc yc) |
| 4 | d | (Xd Yd, xd yd) − (Xd Ya, xa yb) |

TABLE 2

Second Co-Ordinates Table

| Display screen | Image P | Co-Ordinates |
|---|---|---|
| 1 | a' | (Xa' Ya' , xa ya) |
| 2 | b' | (Xb' Yb', xb' yb') − (Xb' Ya' , xa' yb') |
| 3 | c' | (Xc' Yc', xc' yc') − (Xc' Yd' , xd' yc') |
| 4 | d' | (Xd' Yd', xd' yd') |

TABLE 3

Third Co-Ordinates Table

| Display screen | Image P | Co-Ordinates |
|---|---|---|
| 1 | a" | (Xa" Ya", xa" ya") |
| 2 | b" | (Xb" Yb", xb" yb") |
| 3 | c" | (Xc" Yc", xc" yc") − (Xb" Yb", xc" yc") |
| 4 | d" | (Xd" Yd", xd" yd") − (Xa" Ya", xd" yd") |

TABLE 4

Image Scale Ratio Table

| A | B | C | D | E |
|---|---|---|---|---|

The scale ratios A to E in the scale ratio table shown in Table 4 has a relationship given by following Equation (1):

$$A > B > C > D > E \tag{1}$$

Moreover, the thumbnail file displayed at the display position thereof occupies an area given by following Equations (2) and (3) below:

$$(\text{Area of } a) > (\text{Areas of } a', d', a'', \text{ and } b'') > (\text{Areas } b \text{ and } d) > (\text{Areas of } b', c', c'', \text{ and } d'') > (\text{Area of } c) \tag{2}$$

$$(a/A) = [(a'', d'', a', d')/B] = [(b, d)/C)] = [(b'', c'', b', c')/D] = (c/E) \tag{3}$$

Figure 5:
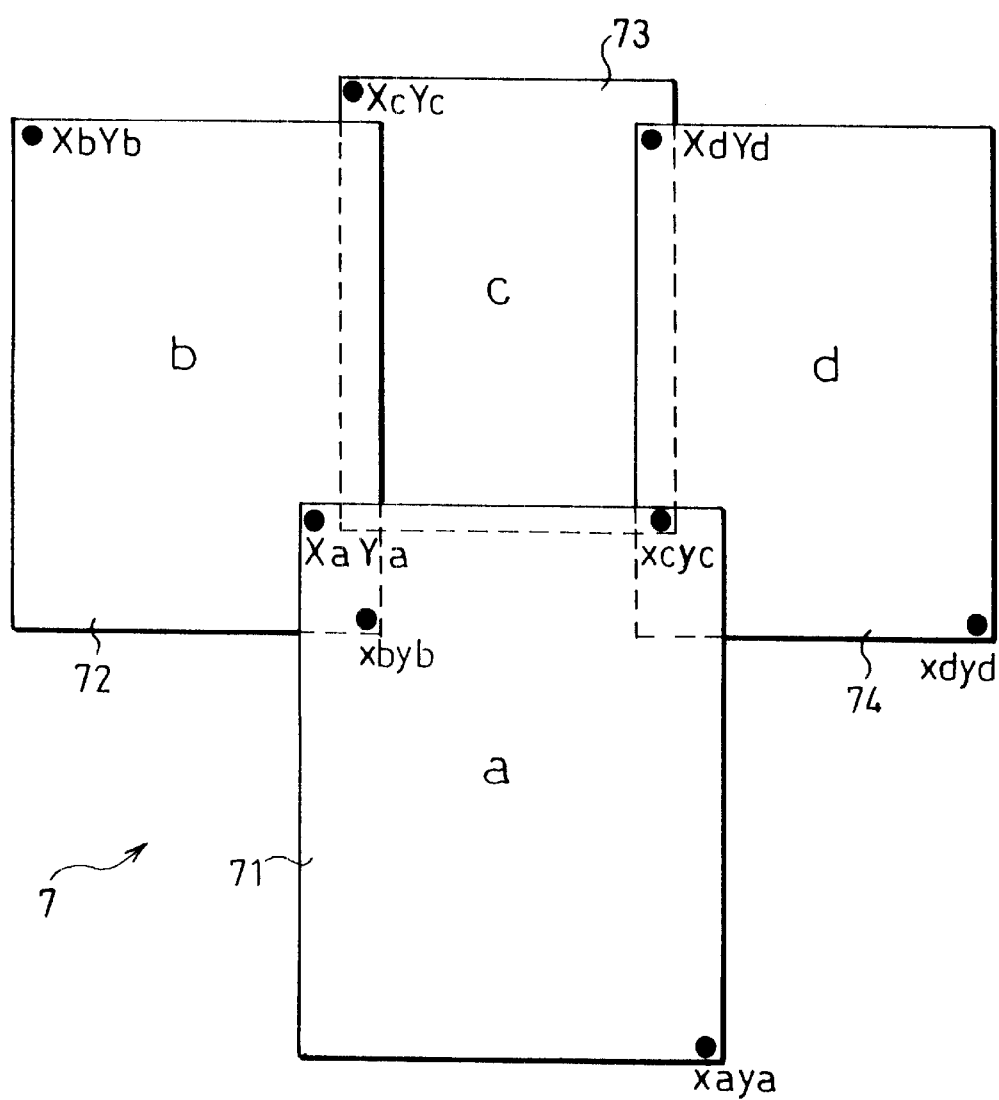
FIG. 5 is an explanatory drawing showing an example of an arrangement when the aforementioned cluster of file bundles are displayed.

Thereafter, the first source image is displayed as the first display image 71 at the position a shown in FIG. 5 so as to occupy the area calculated from the previously determined positional co-ordinates with the scale ratio A for the source image calculated from the size of the source image. In a similar manner, the second to fourth source images are displayed at the positions of b, c, and d as the second to fourth display images 72 to 74 with the scale ratios that are in accordance with the respective positions (S4). Next, in response to the rotation command operation (S5), a rotational display is carried out on the first to fourth display images 71 to 74 displayed by the aforementioned method to represent the cluster of the file bundles (S6).

Subsequently, referring to the flow chart shown in FIG. 6, the following description will explain the rotation process. First, the rotation directions are specified for the first to fourth display images 71 to 74 displayed by the aforementioned method to represent the cluster of the file bundles (S7). For example, if a command is entered for a clockwise rotation when the display screen is in the state shown in FIG. 5 where the images 71 to 74 are displayed based on the aforementioned first co-ordinates table, the first source image is displayed at the position a' shown in FIG. 7 as the first display image 71 with the scale ratio B for the source image that is calculated from the size of the source image and the position a' according to the second co-ordinates table.

In a similar manner, the second to fourth source images are displayed at the respective positions b', c', and d' as the second to fourth display images 72 to 74 representative of the respective file bundles with the scale ratios adjusted to the respective positions according to the second co-ordinates table (S8). Here, the first to fourth display images 71 to 74 representative of the file bundles are moved to positions such that the images 71 to 74 appear to have rotated as shown in aforementioned FIG. 7.

Subsequently, by moving the display of the first to fourth display images 71 to 74 representative of the file bundles back to the state shown in FIG. 5 where the images 71 to 74 are displayed based on the aforementioned first co-ordinates table after a predetermined period of time has passed since the change in the display, the first to fourth display images 71 to 74 representative of the file bundles move as if rotating on the display screen (S9).

Here, as mentioned above, the first to third co-ordinates tables are as shown in Tables 1 to 3. However, as a result of the rotational movement of the cluster of the file bundles, the arrangement of the source images changes such that the fourth, first, second, and third source images are in the respective positions a, b, c, and d.

Hence, by the display screen sequentially changing after every predetermined period of time, the displayed cluster of the file bundles appears as if rotating. In embodiment 1, for convenience in description, the clockwise rotation was described involving two positions. However, if three or more positions, i.e. co-ordinates tables for display, are specified instead of two positions, and the file bundles are displayed accordingly moving between those positions sequentially, the file bundles can be displayed as if rotating more naturally and seamlessly.

Figure 6:
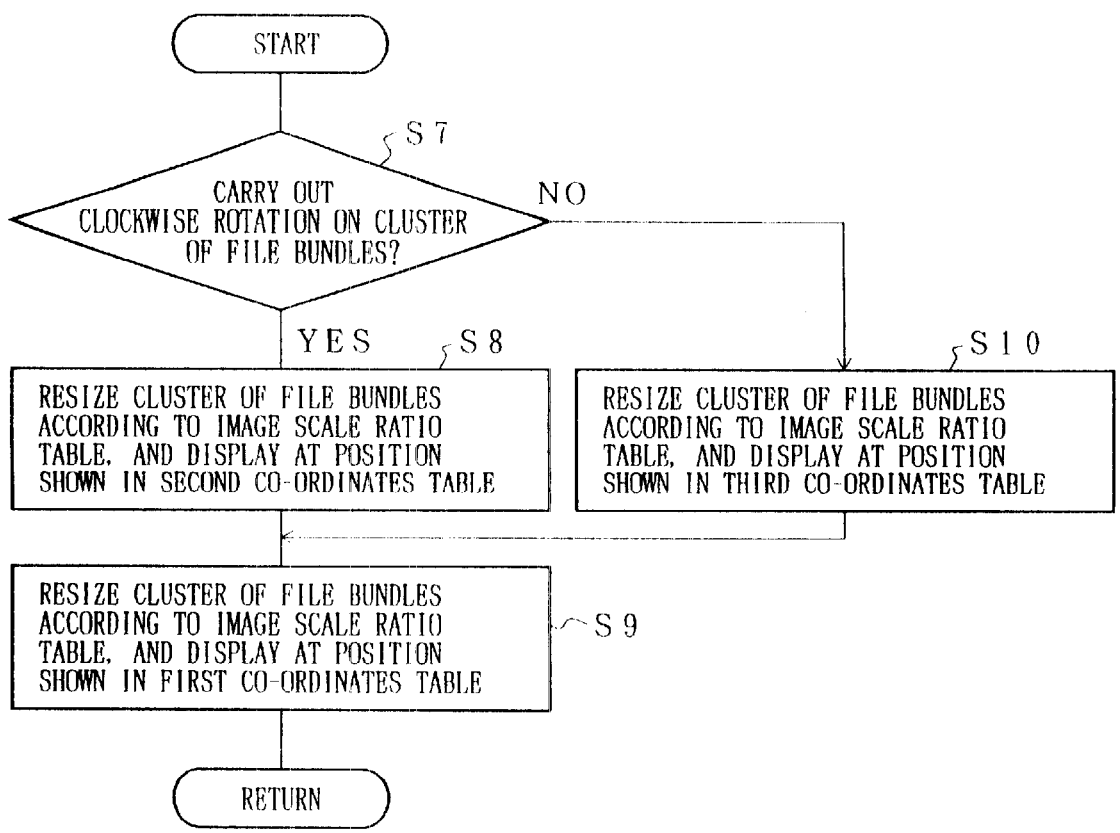
FIG. 6 is a flow chart when the aforementioned cluster of file bundles are displayed in a rotation.
Figure 7:
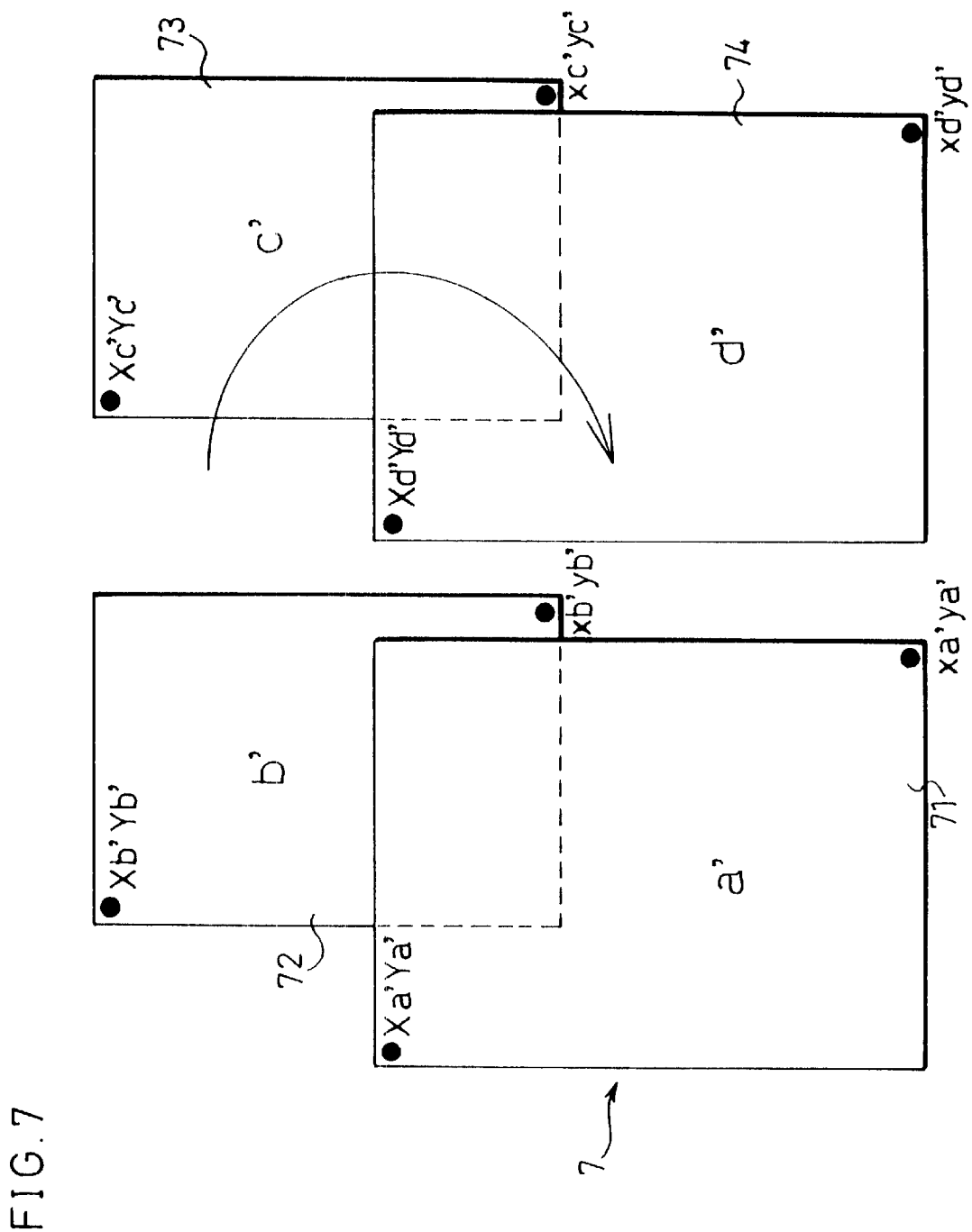
FIG. 7 is an explanatory drawing showing an example of an arrangement when the aforementioned rotation display is rotated clockwise.
Figure 8:
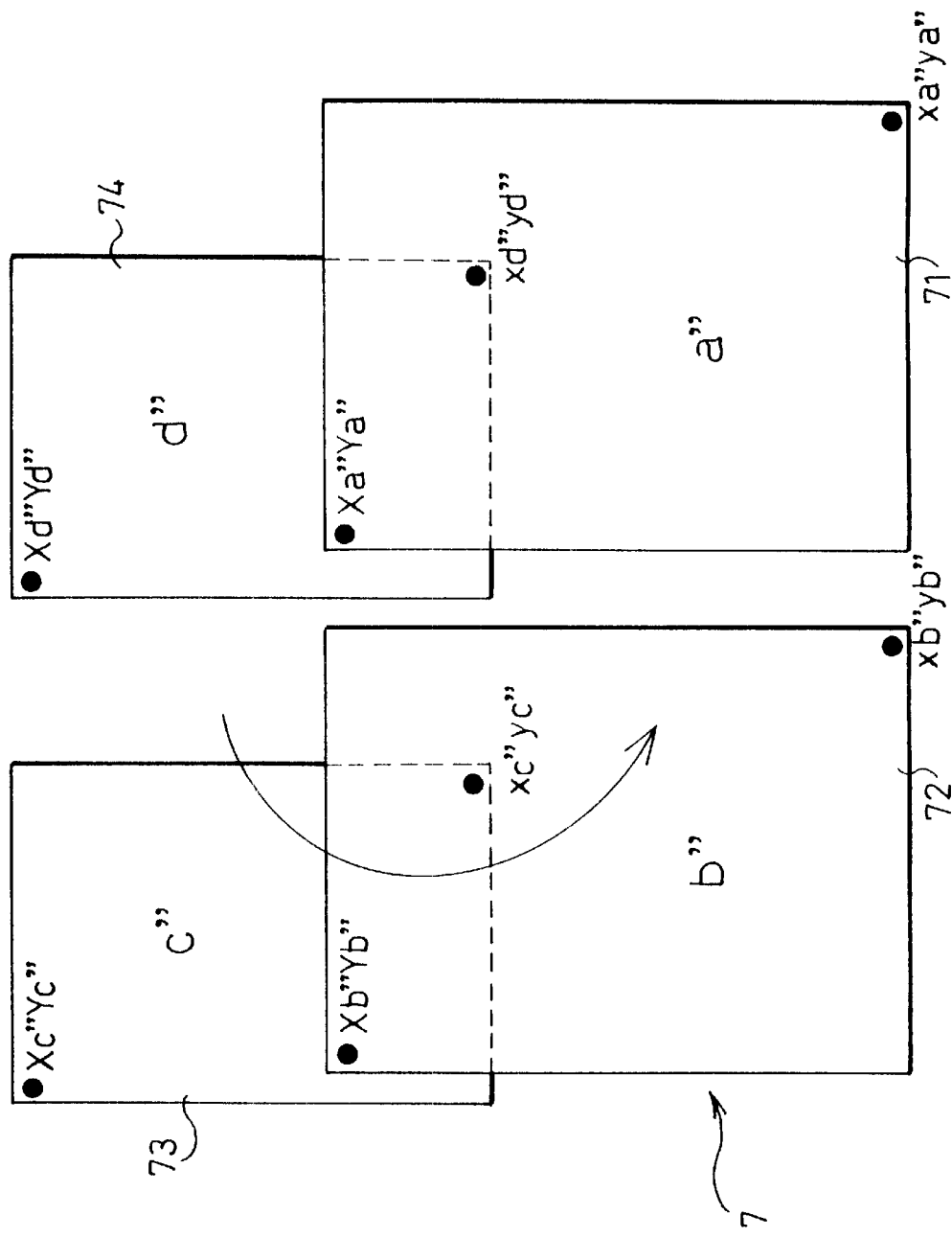
FIG. 8 is an explanatory drawing showing another example of an arrangement when the aforementioned rotation display is rotated anti-clockwise.
Figure 9:
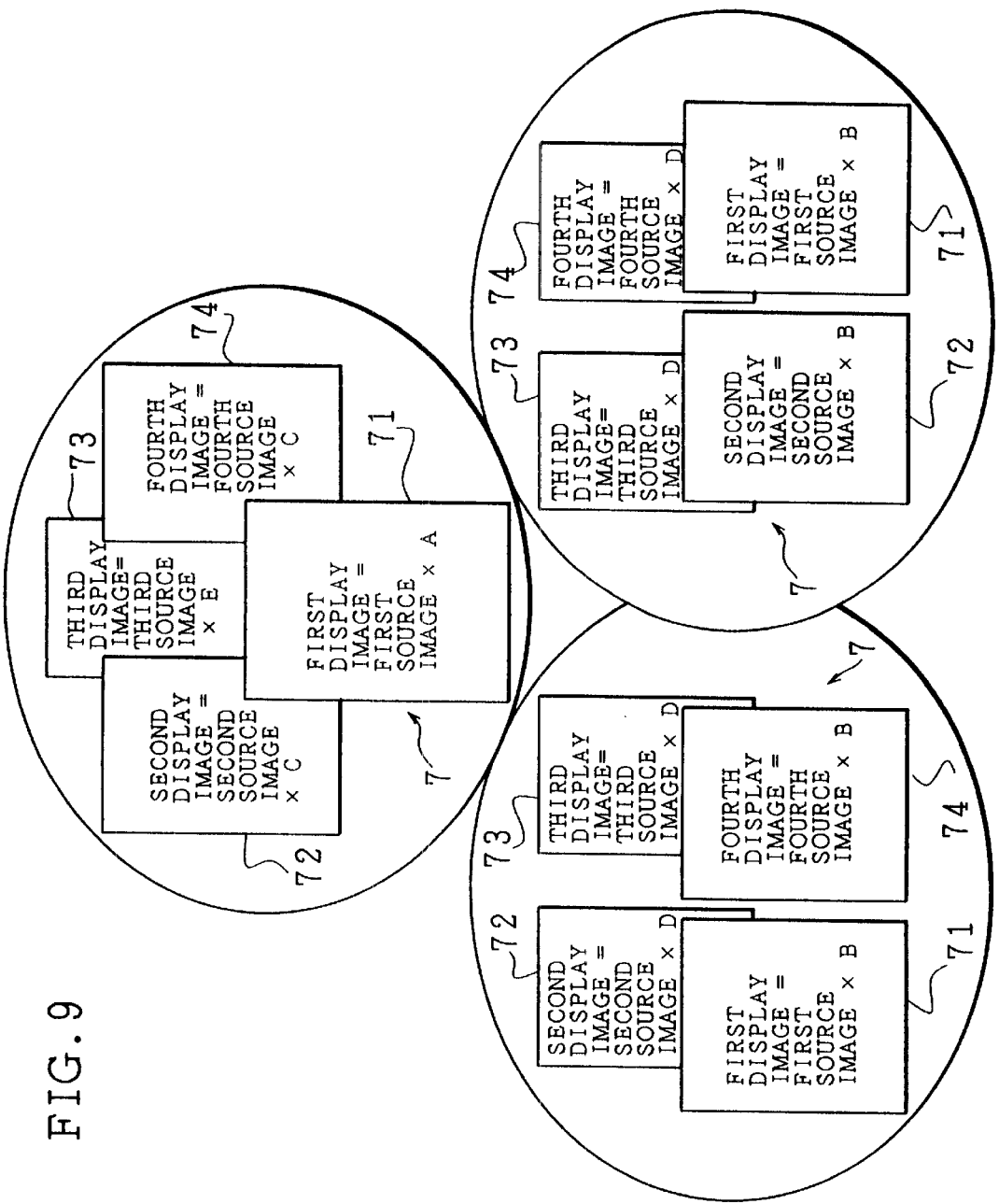
FIG. 9($a$) through FIG. 9($c$) are explanatory drawings showing scale ratios for clusters of file bundles in the rotation display.

Moreover, a similar specification can be made in a case where the rotation direction is opposite of the aforementioned rotation (anticlockwise rotation) according to, for example, the third co-ordinates table shown in FIG. 8 and in S10 of the flow chart of FIG. 6. Furthermore, the sizes of the file bundles at the display positions (arrangement positions) are specified in advance according to the number of the file bundles at the respective positions as shown in FIG. 9, and operation is carried out in the process of S3 of the flow chart shown in FIG. 4.

Embodiment 2

Referring to FIG. 10 to FIG. 14, the following description will explain embodiment 2 in accordance with the present invention: namely a method of enabling the user to change the display pages of file bundles displayed in the form of thumbnails as a search example, using the configuration described in embodiment 1 above.

Figure 10:
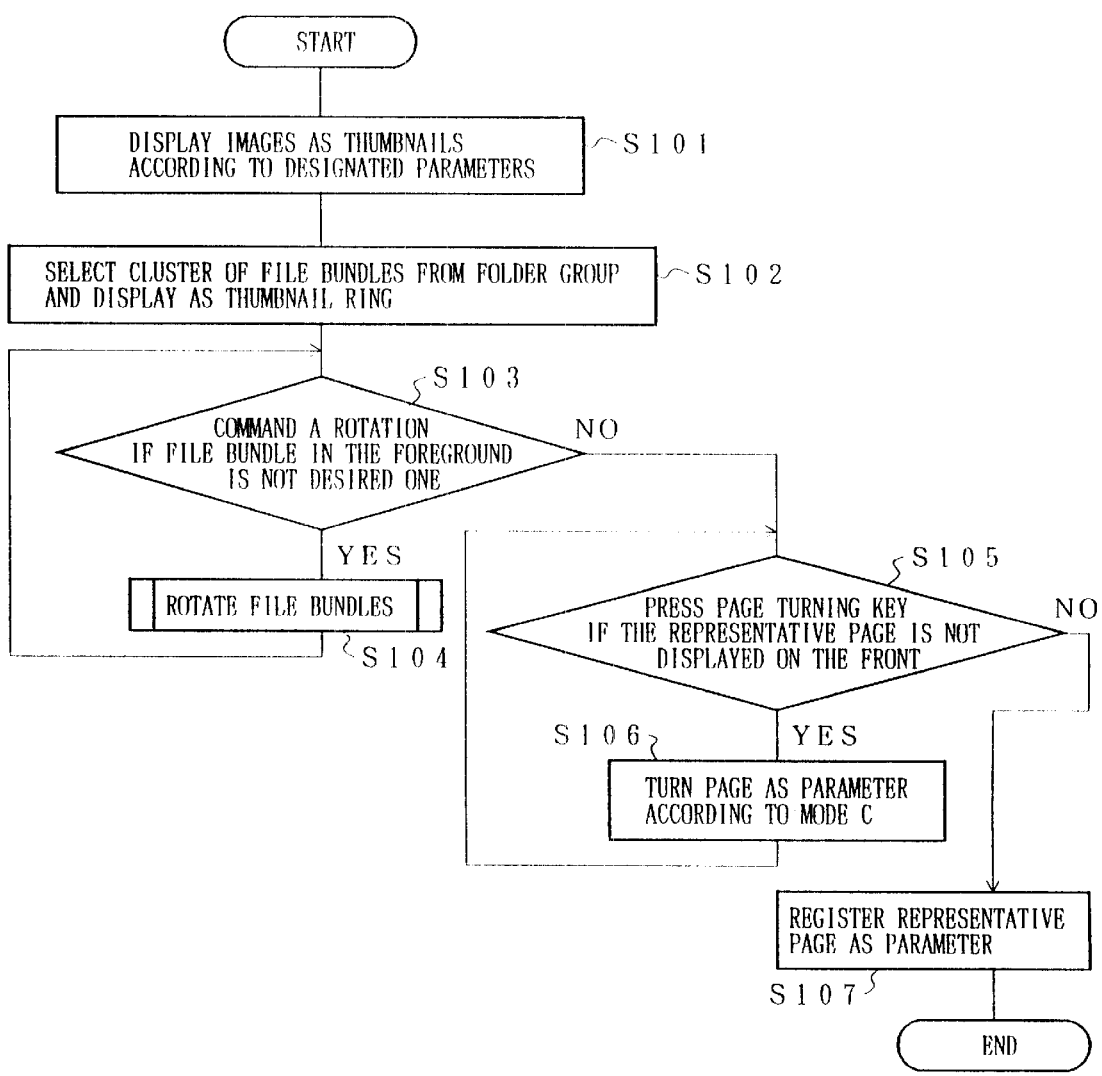
FIG. 10 is a flow chart showing procedures for the aforementioned information managing device to specify the front page.
Figure 11:
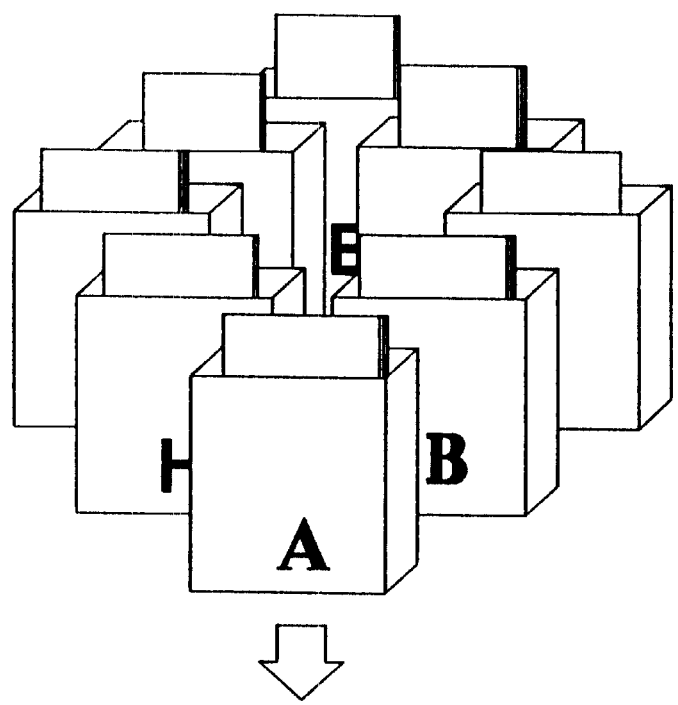
FIG. 11($a$) to FIG. 11($c$) are explanatory drawings showing an example of various operations for the aforementioned information managing device to carry out a ring-form display.
Figure 11:
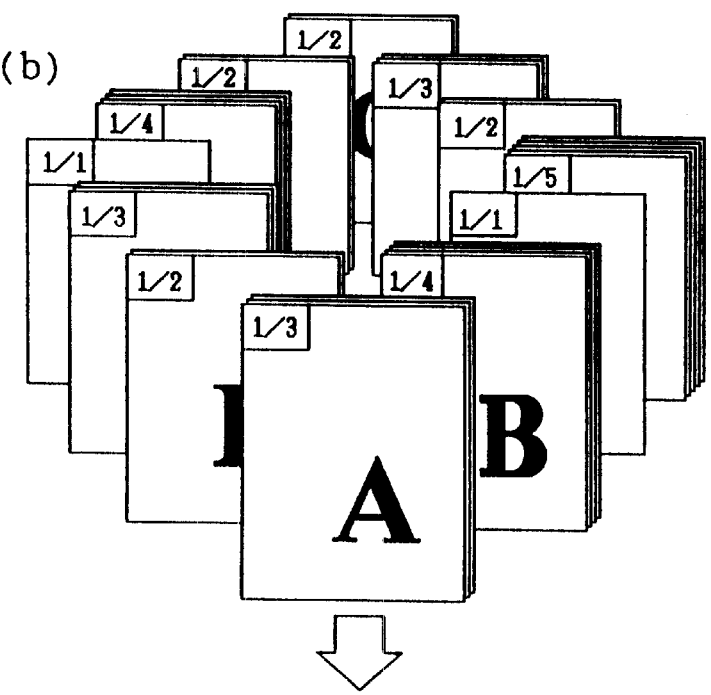
Figure 11:
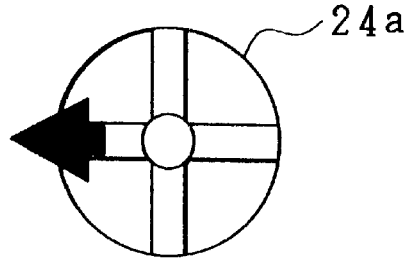
Figure 12:
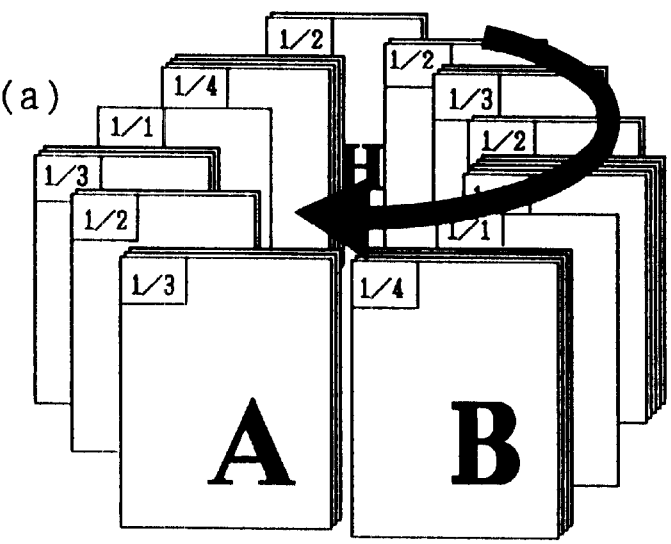
FIG. 12($a$) to FIG. 12($c$) are explanatory drawings showing operations to rotate the aforementioned ring-form display.
Figure 12:
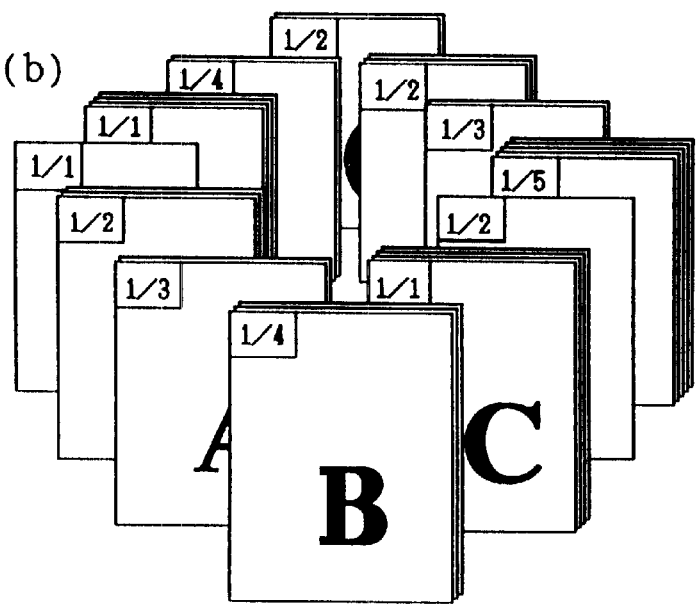
Figure 12:
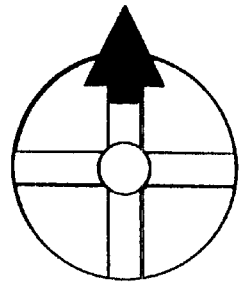
Figure 13:
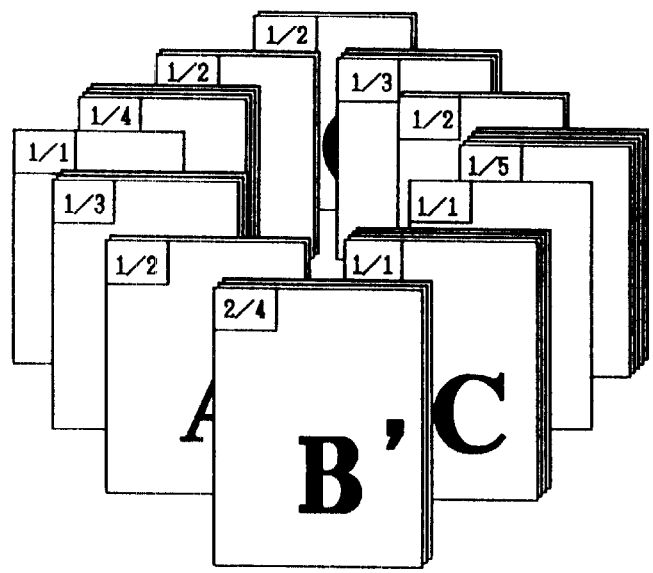
FIG. 13($a$) to FIG. 13($c$) are explanatory drawings showing procedures to specify the front page of the aforementioned ring-form display.
Figure 13:
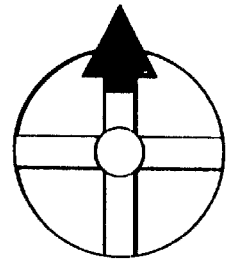
Figure 13:
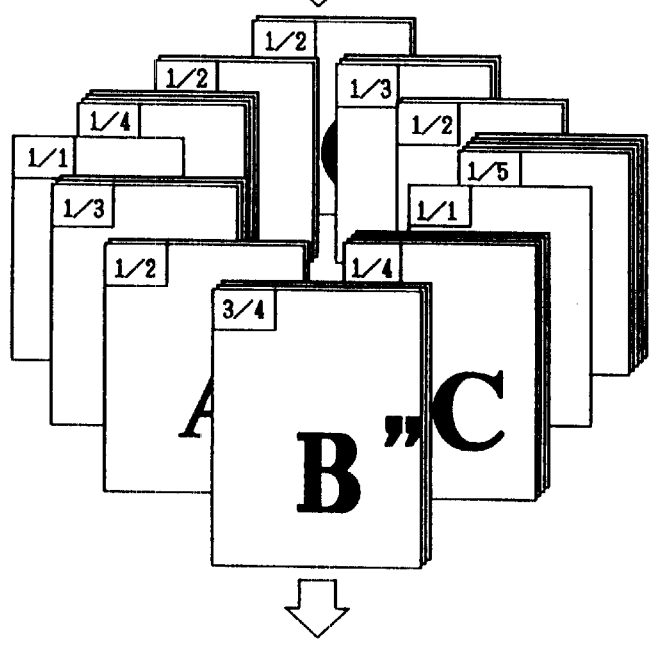

Referring to the flow chart shown in FIG. 10, the following description will explain the method. First, as mentioned above, after a folder group is selected in response to a designation by the user, a registered folder group is displayed in the form of a thumbnail ring on the display screen according to a set of rules registered by the user in advance (S101) (see FIG. 11(a)). A cluster of the file bundles is selected from the displayed folder group, and displayed in the form of a thumbnail ring according to a registered set of rules (S102) (see FIG. 11(b)).

Thereafter, if the file bundle desired by the user is not arranged to be in the front (first) row with the cluster of the file bundles displayed as a background in the form of thumbnails, the user enters a command through the aforementioned cross key 24a to rotate the cluster of the file bundles, for example, clockwise (S103) (see FIG. 11(c)).

The file bundle displayed in the front row is switched by the rotation on the display screen, and the process goes back to S103 (S104) (see FIG. 12(a) and FIG. 12(b)). Moreover, if the file bundle desired by the user is displayed in the front row, the user visually judges whether the image displayed on the front of the file bundle is the representative page desired by the user (S105).

Figure 14:
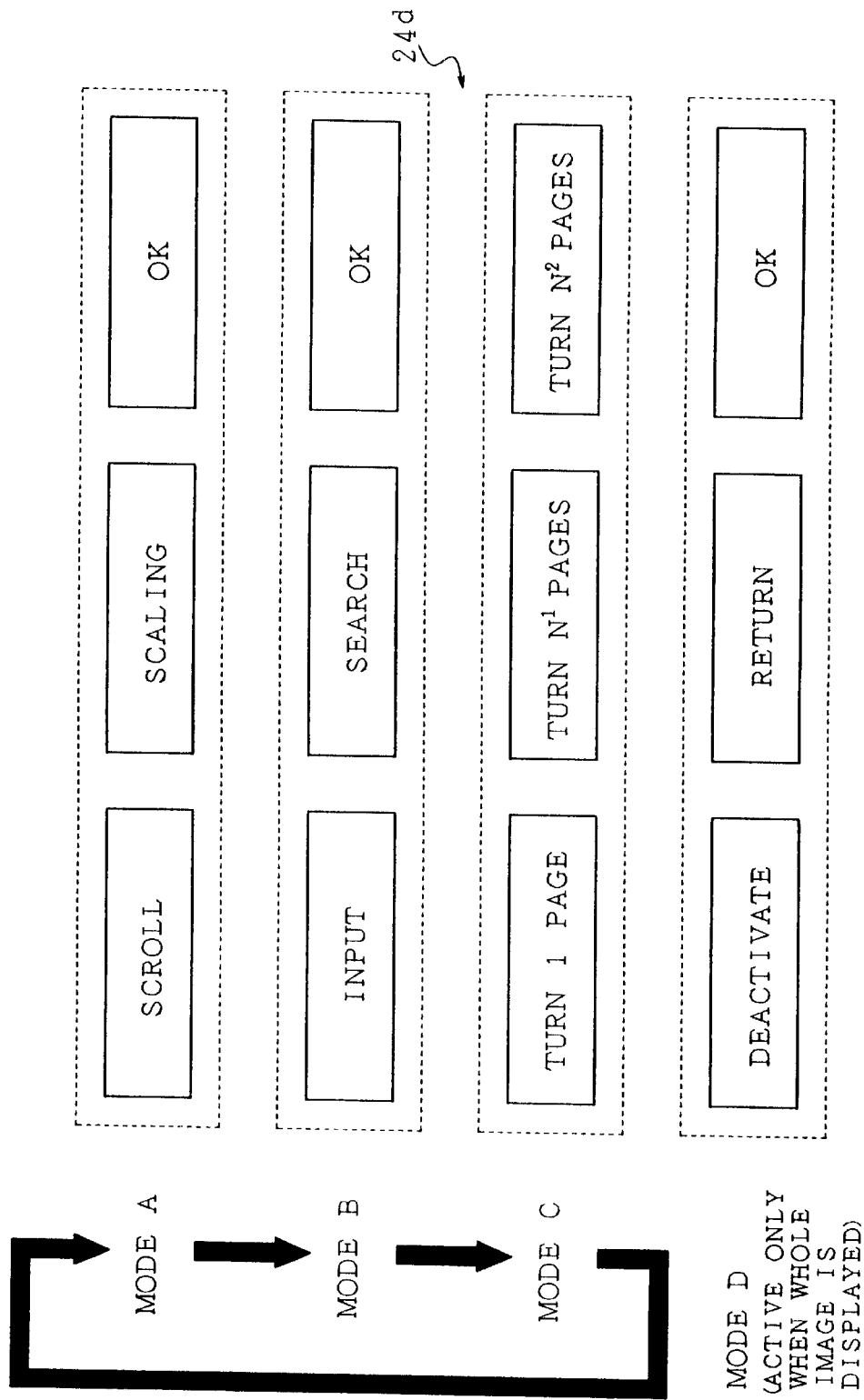
FIG. 14 is an explanatory drawing showing a specification example the display key section for the aforementioned information managing device in different modes.

If the image displayed on the front of the file bundle is not the representative page desired by the user, the user enters a page turning command (see FIG. 12(c)) through the cross key 24a and hence switches the image displayed in the front row by substituting the next page therefor (S106) (see FIG. 13(a) and FIG. 13(b)). The page turning command, as shown in FIG. 14, reads the information parameter designated in advance through the operation panel 24 working in the mode C, and thus carries out a switching operation of the image displayed at the display key section 24d. By contrast, if the desired page is displayed on the front, a parameter is automatically registered to designate the displayed page as being the representative page by proceeding to a next operation (S107) (see FIG. 13(c)).

Embodiment 3

Referring to FIG. 14 to FIG. 17, the following description will explain operations of embodiment 3 in accordance with the present invention.

Figure 15:
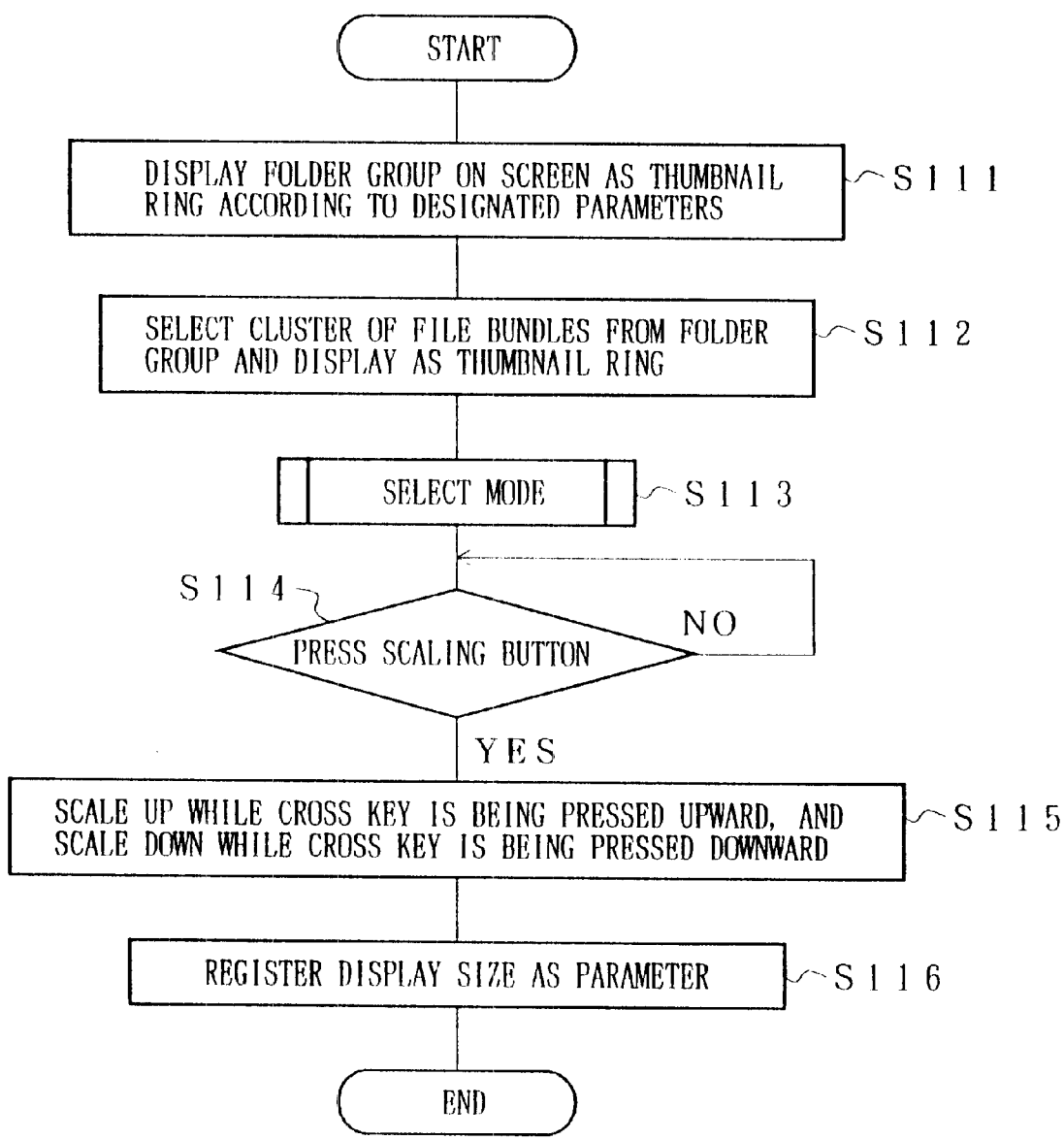
FIG. 15 is a flow chart showing procedures to specify a display size in the aforementioned ring-form display.
Figure 16:
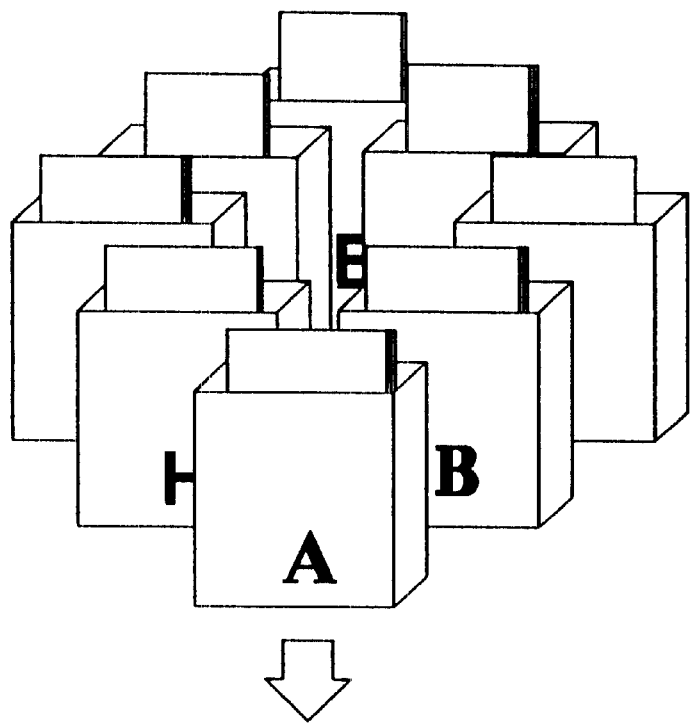
FIG. 16($a$) and FIG. 16($b$) are explanatory drawings explaining operations to specify the aforementioned display size.
Figure 16:
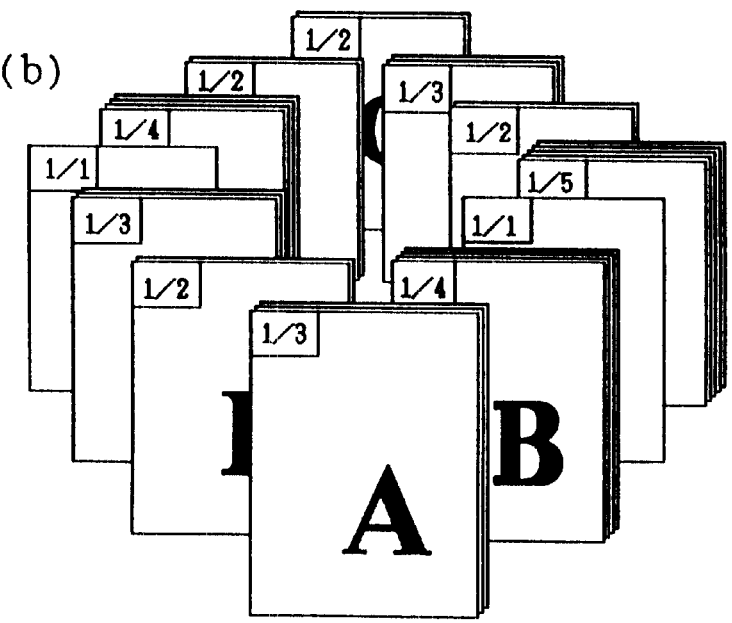

As shown in the flow chart in FIG. 15, after a folder display is selected by the user, a registered folder group is displayed in the last specified size in the form of a thumbnail ring according to a set of rules (parameters) registered in advance by the user (S111) (see FIG. 16(a)).

Subsequently, a cluster of the file bundles is read from the displayed folder group in response to a command entered by the user, and displayed in the form of a thumbnail ring according to a registered set of rules (S112) (see FIG. 16(b)).

Next, as shown in FIG. 14, FIG. 17(a), and FIG. 17(b), the mode A is selected at the display key section 24d with the mode switching key 24b (S113). The device stands by until a scaling-up/-down command is entered through one of the command keys 24c in accordance with the display key section 24d set to the mode A. If such a command is entered, the device is set to a scaling-up/-down mode (S114).

Figure 17:
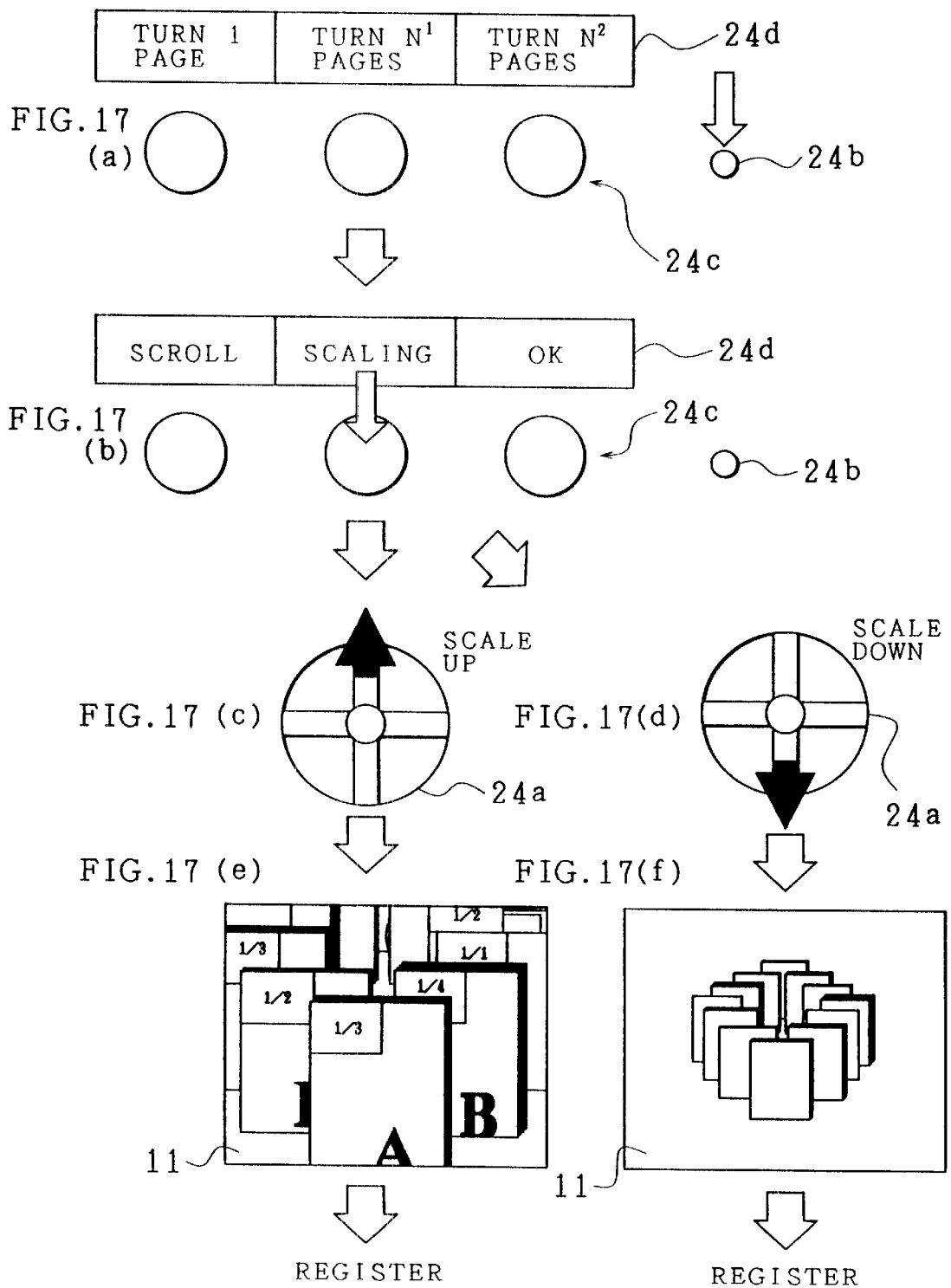
FIG. 17($a$) to FIG. 17($f$) are explanatory drawings explaining succeeding operations to specify the aforementioned display size.

Thereafter, in case where the device is set to a scaling-up/-down mode, if the top portion of the cross key 24a is pressed, the images displayed in the form of thumbnails are scaled up in accordance with the period of time during which the cross key 24*a* is held down (see FIG. 17(*c*) and FIG. 17(*e*)). By contrast, if the bottom portion of the cross key 24*a* is pressed, the images displayed in the form of thumbnails are scaled down in accordance with the period of time during which the cross key 24*a* is held down (S115) (see FIG. 17(*d*) and FIG. 17(*f*)). Next, when another operation is carried out, the device deactivates the scaling-up/-down mode, and registers the size of the image currently displayed on the LCD 11 as a parameter to end the process (Sl16).

Embodiment 4

Referring to FIG. 18 to FIG. 21, the following description will explain the operations of embodiment 4 in accordance with the present invention.

Figure 18:
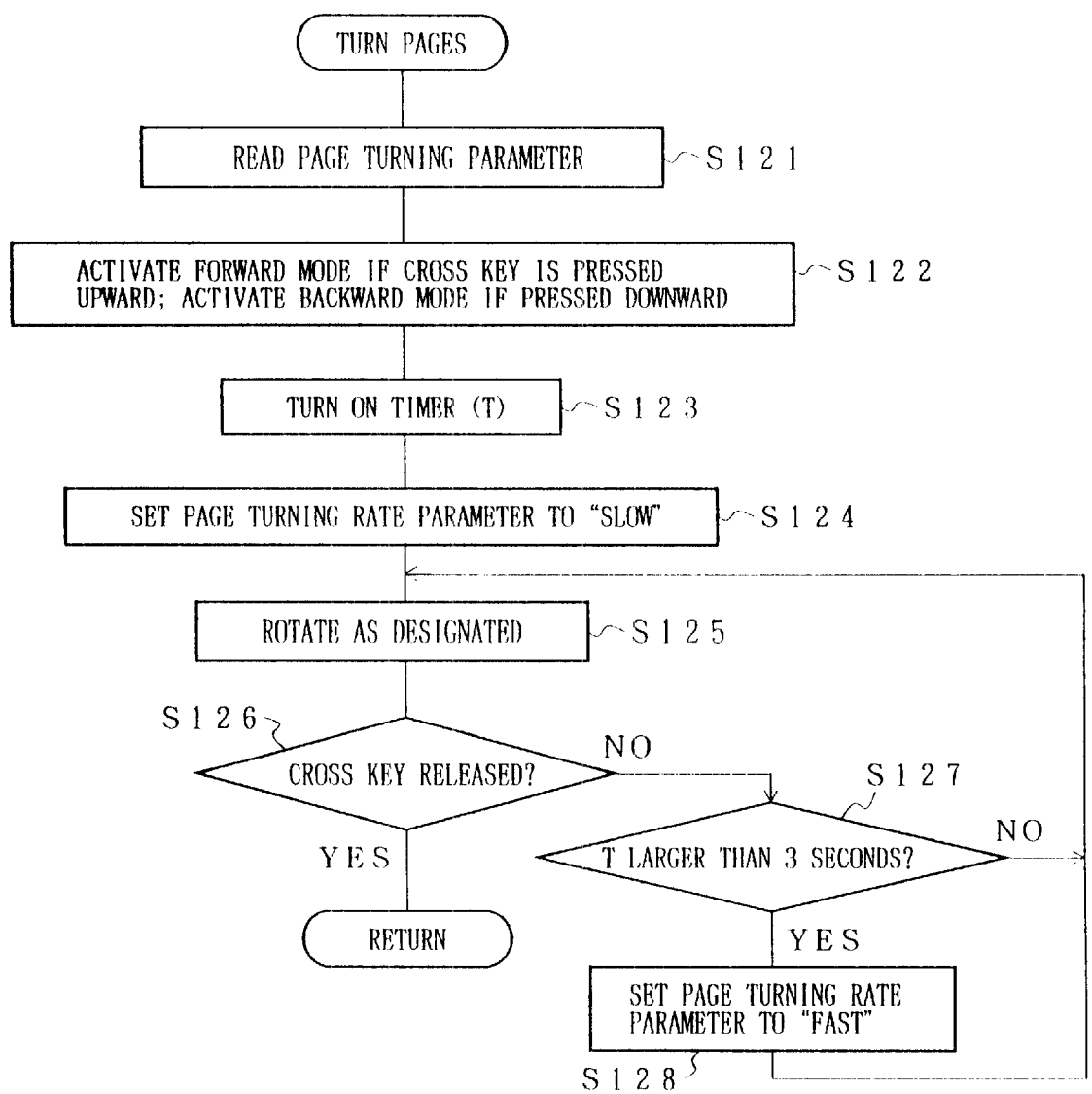
FIG. 18 is a flow chart showing procedures for the aforementioned information managing device to specify a page turning rate.
Figure 19:
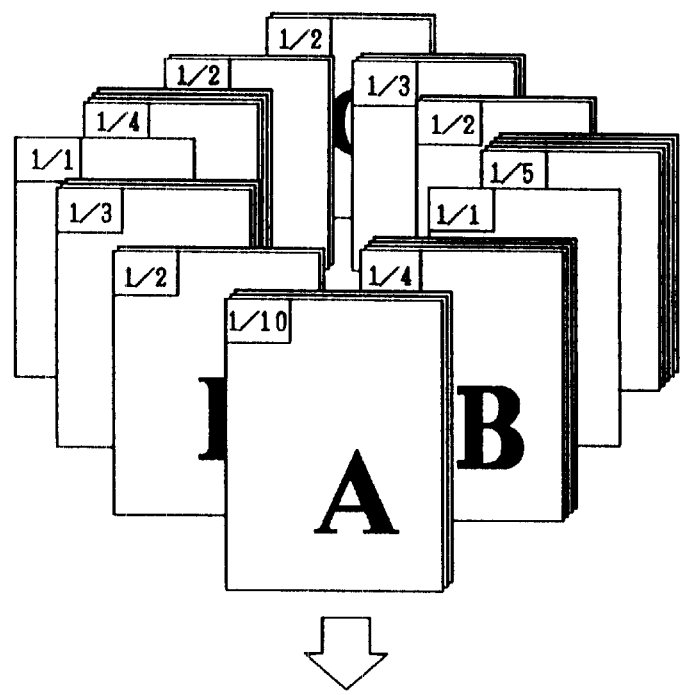
FIG. 19($a$) to FIG. 19($c$) are explanatory drawings explaining operations to specify the aforementioned page turning rate.
Figure 19:
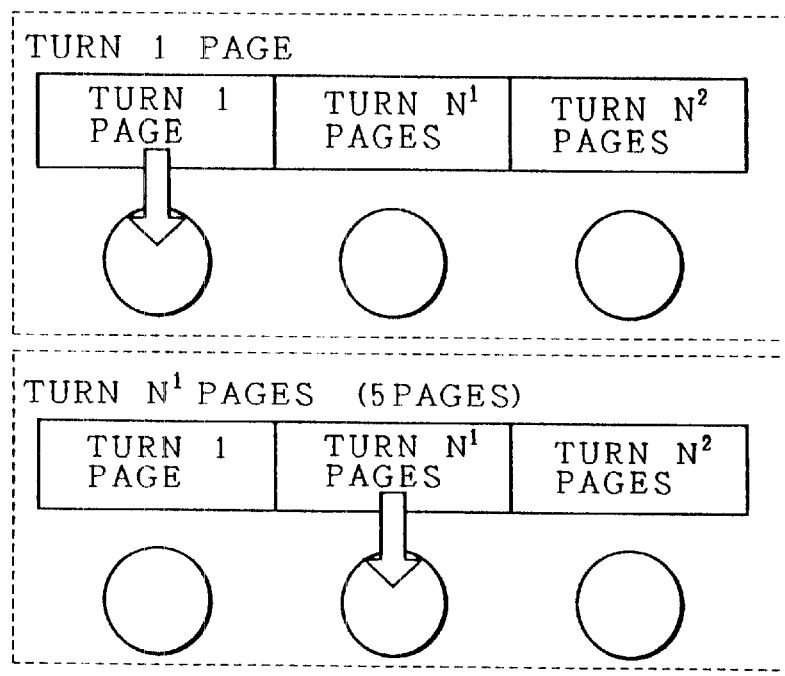
Figure 19:
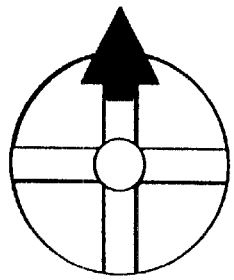

As shown in the flow chart of FIG. 18, in a similar manner to the foregoing, after the cluster of the file bundles is selected, a registered cluster of file bundles is displayed in the form of a thumbnail ring according to a set of rules (parameters) registered in advance by the user (see FIG. 19(*a*)). Subsequently, the value of the page turning parameter designated in the mode C shown in FIG. 14 is read (S121) (see FIG. 19(*b*)). If the top portion of the cross key 24*a* is pressed, a forward mode is activated; if the bottom portion thereof is pressed, a backward mode is activated (S122) (see FIG. 19(*c*)).

Thereafter, the timer setting mode is turned on (S123). Here, the rotation rate parameter is set to "Slow", which is the default value (S124). The arrangement of the file bundles displayed in the form of bundles is changed according to the value of the page turning parameter that is read in advance and also according to the set of rules designated in the forward or backward mode through the cross key 24*a* (S125) (see FIGS. 20(*a*) and 20(*b*)).

As the cross key 24*a* is released, i.e., as the cross key 24*a* returns to the default state, the page turning operation is ended. Moreover, as either the top or the bottom portion of the cross key 24*a* is pressed, the period of time during which the key is held down is counted (S126).

If the cross key 24*a* is held down not longer than a predetermined period of time, for example, three seconds, the process goes back to S125. By contrast, if the cross key 24*a* is held down longer than a predetermined period of time, for example, three seconds, the process proceeds to the next step, i.e., S128 (S127) (see FIG. 21). If the predetermined period of time has elapsed, the rotation rate parameter is automatically set to "Fast", which is a high page turning rate, so as to increase the page turning rate for the file bundles displayed in the form of thumbnails, and then the process goes back to S125 (S128).

Embodiment 5

Figure 22:
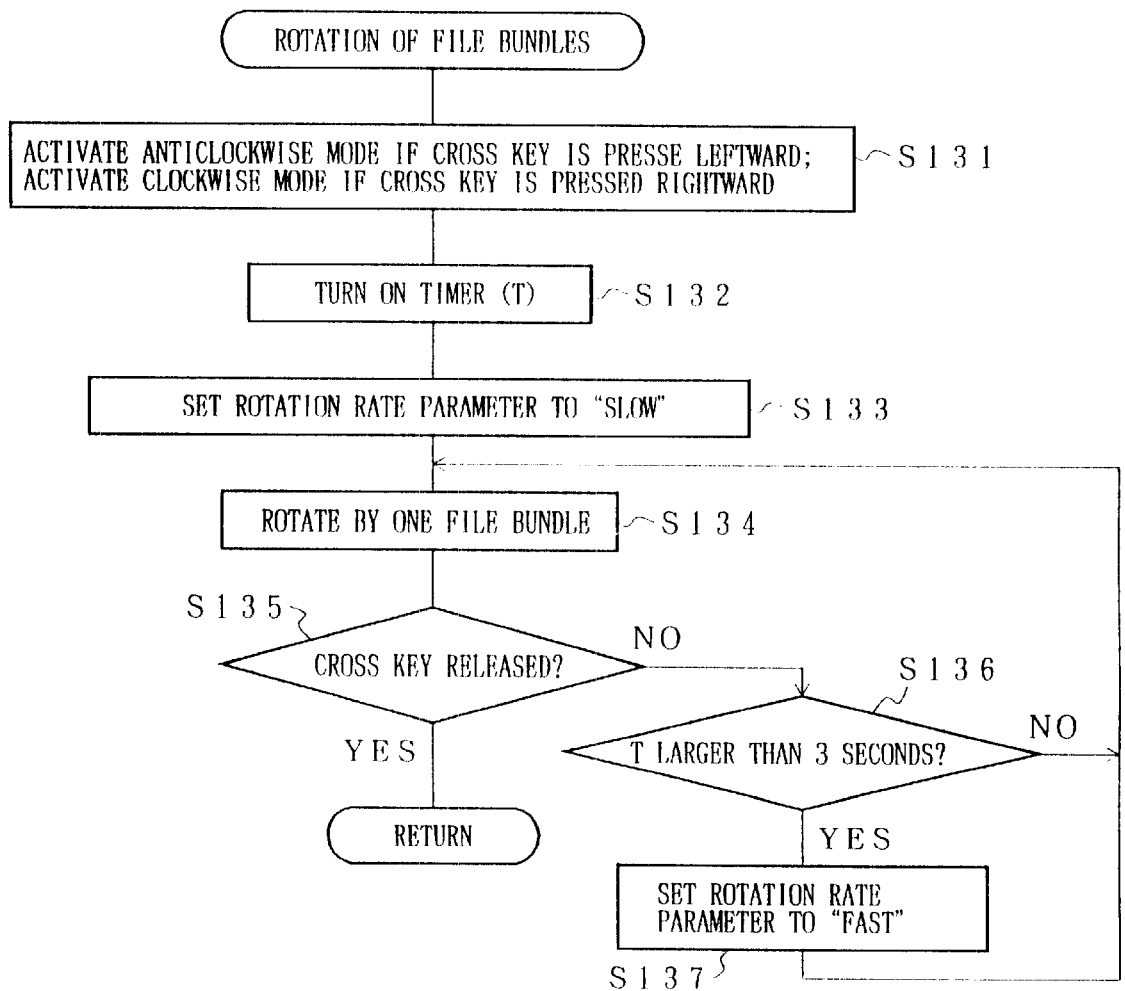
FIG. 22 is a flow chart showing procedures for the aforementioned information managing device to specify a rotation rate in the rotation operations.

Referring to FIG. 22 to FIG. 24, the following description will explain the operations of embodiment 5 in accordance with the present invention.

As shown in the flow chart in FIG. 22, in a similar manner to the foregoing, after a folder is selected from a folder group, when the cluster of the file bundles is displayed in the form of a thumbnail ring on the display screen of the LCD 11, a anticlockwise mode is activated in response to a press on the left-hand portion of the cross key 24*a*, or a clockwise mode is activated in response to a press on the right-hand portion thereof (S131).

When the cross key 24*a* is pressed in this manner, the timer setting mode is turned on (S132), as well as the rotation rate parameter is set to "Slow", which is the default value (S133).

Thereafter, when the left-hand or the right-hand portion of the cross key 24*a* is pressed, a rotation operation is started, and switches the ring-form file bundle display by one file bundle according to an anticlockwise or clockwise mode (S134) (see FIGS. 23(*a*) and 23(*b*)). Moreover, if the cross key 24*a* is pressed and held down, the period of time during which the key is held down is counted (S135).

If the cross key 24*a* is held down not longer than a predetermined period of time, for example, three seconds, the process goes back to S134 to end the rotation operation. By contrast, if the cross key 24*a* is held down longer than a predetermined period of time, for example, three seconds, the process proceeds to the next step, i.e., S137 (S136) (see FIGS. 24(*a*) and 24(*c*)). Subsequently, the rotation rate parameter is automatically set to "Fast", which is a high rotation rate, so as to increase the rotation rate for the file bundles displayed in the form of a thumbnail ring, and then the process goes back to S134 to end the rotation operation at a high rotation rate (S137).

Embodiment 6

Figure 25:
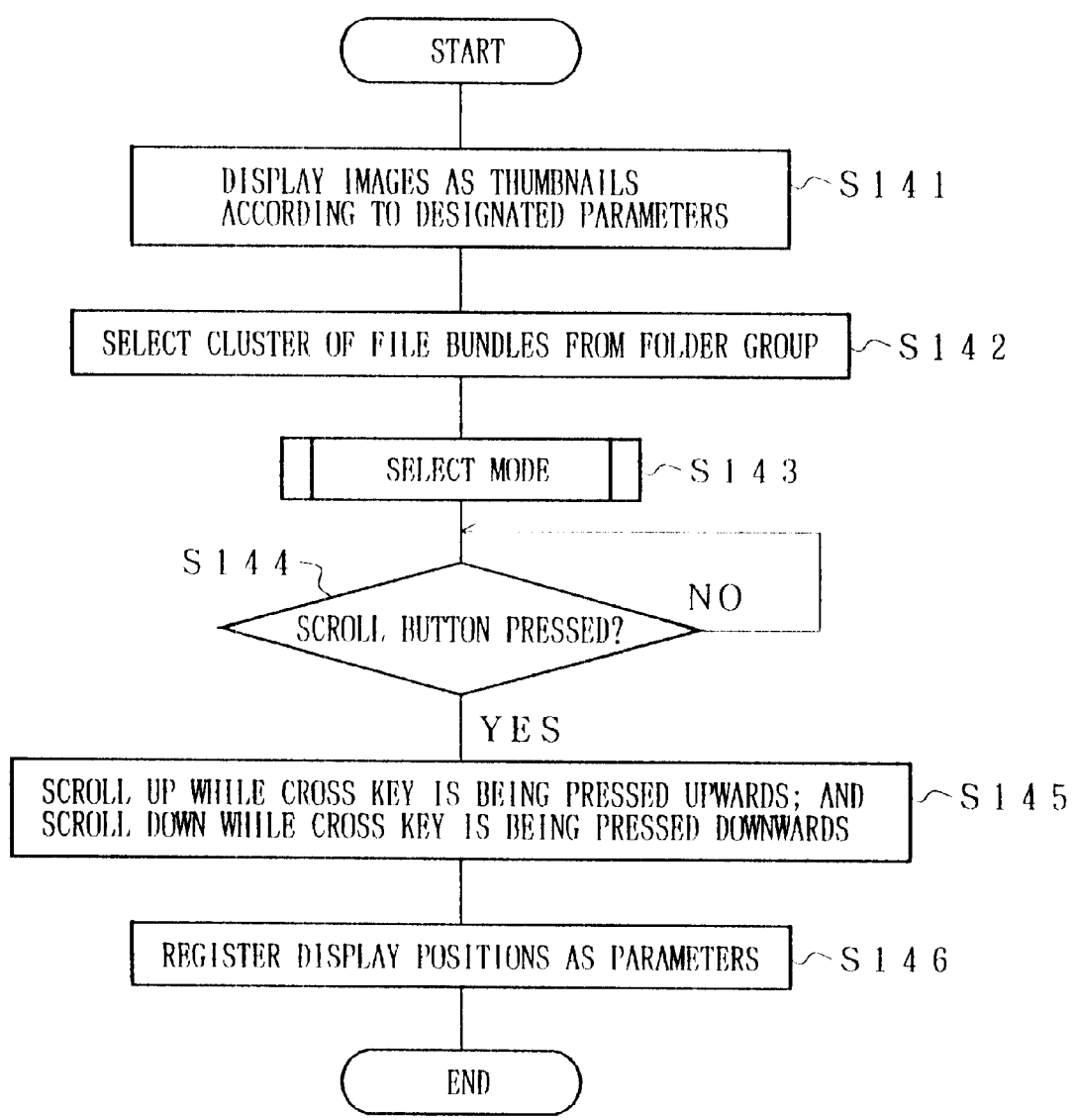
FIG. 25 is a flow chart showing procedures for the aforementioned information managing device to specify the display position of a cluster of file bundles.
Figure 27:
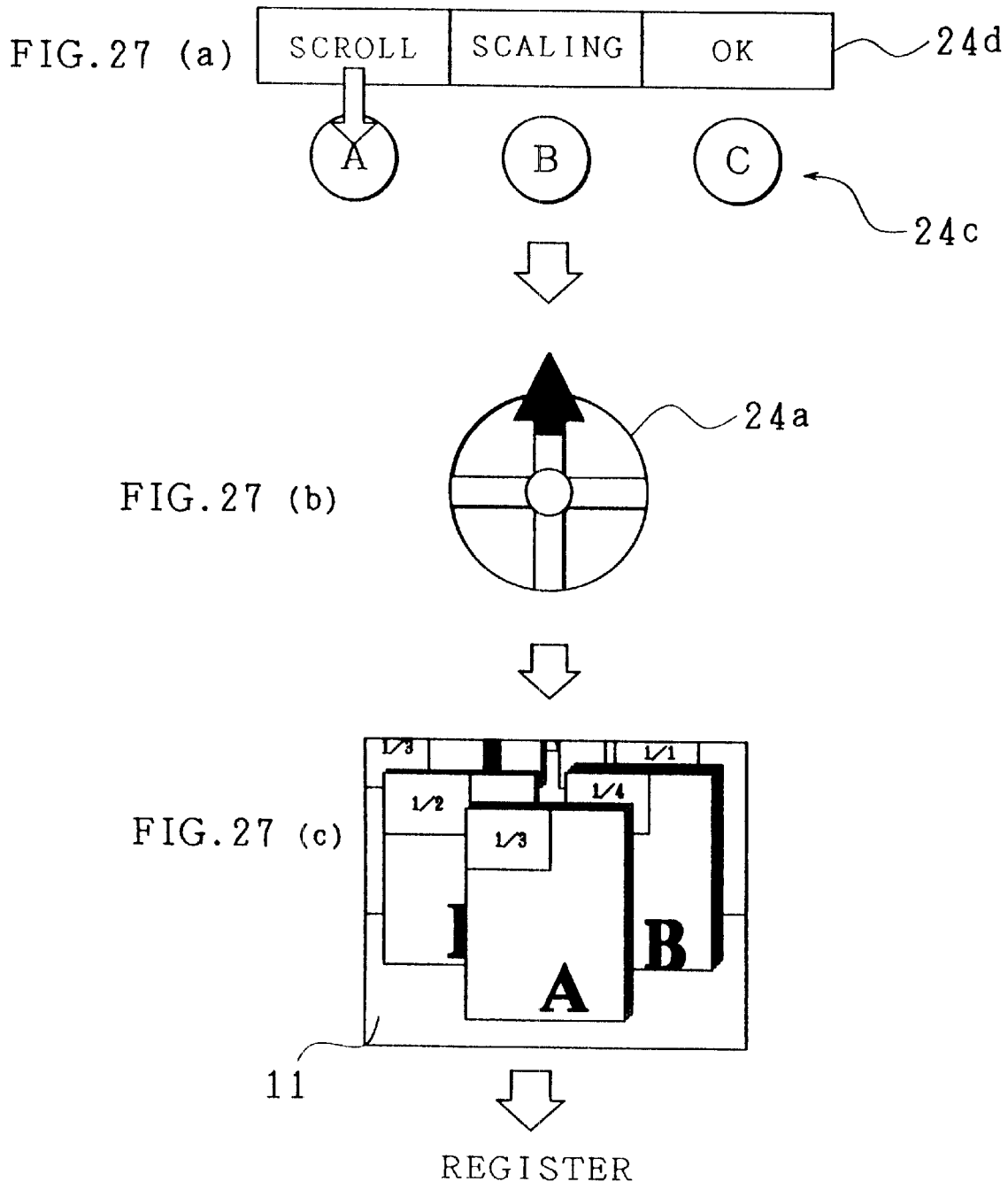
FIG. 27($a$) to FIG. 27($c$) are explanatory drawings explaining an example of succeeding operations to specify the aforementioned display position.

Referring to FIG. 25 to FIG. 27, the following description will explain the operations of embodiment 6 in accordance with the present invention.

As shown in the flow chart in FIG. 25, after a folder group display is selected, a registered folder group is displayed in the form of a thumbnail ring according to the image size and image position settings specified last time and also according to a set of rules (parameters) registered in advance by the user (S141) (see FIG. 26(*a*)). A cluster of the file bundles is selected from the displayed folder group in response to a designation by the user, and displayed in the form of a thumbnail ring according to a registered set of rules including the image size and image display position settings specified last time (S142) (see FIG. 26(*b*)).

Subsequently, the mode A is selected at the display key section 24*d* through the mode switching key 24*b* (see FIG. 14) (S143) (see FIG. 26(*c*) and FIG. 27(*a*)). The device stands by until a scroll command is entered by the user pressing the A button of the command keys 24*c* in accordance with the display key section 24*d* on the operation panel 24 set to the mode A. If the A button is pressed, the device is set to a scroll mode (S144).

In a case where the device is set to a scroll mode, if the top portion of the cross key 24*a* is pressed, the images displayed in the form of thumbnails are moved upwards on the display screen of the LCD 11 in accordance with the period of time during which the cross key 24*a* is held down (see FIGS. 27(*b*) and 27(*c*)). By contrast, if the bottom portion of the cross key 24*a* is pressed, the images displayed in the form of thumbnails are moved downwards in accordance with the period of time during which the cross key 24*a* is held down (S145). When another operation is carried out, the device deactivates the scroll mode, and registers the display positions of the images currently displayed as parameters to end the process (Sl46).

Embodiment 7

Referring to FIG. 28 to FIG. 31, the following description will explain the operations of embodiment 7 in accordance with the present invention.

Figure 28:
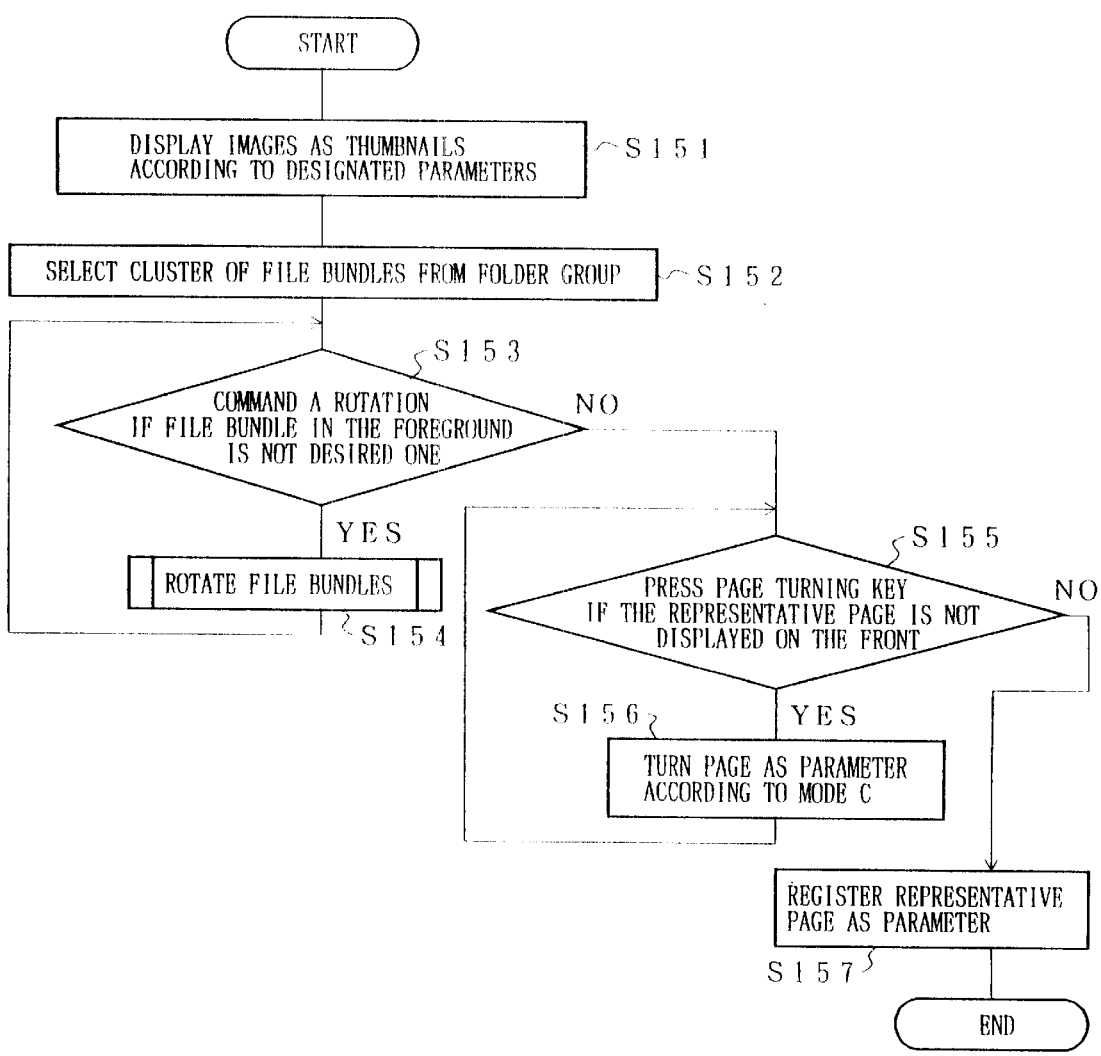
FIG. 28 is a flow chart showing procedures for the aforementioned information managing device to specify the front page of the cluster of file bundles displayed in the form of a ring.
Figure 29:
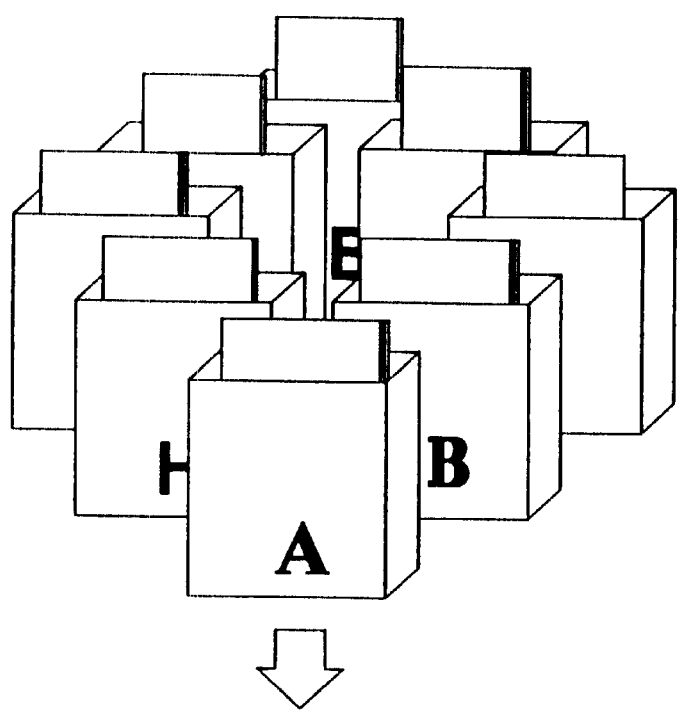
FIG. 29($a$) to FIG. 29($c$) are explanatory drawings showing an example of operations of procedures to specify the aforementioned front page.
Figure 29:
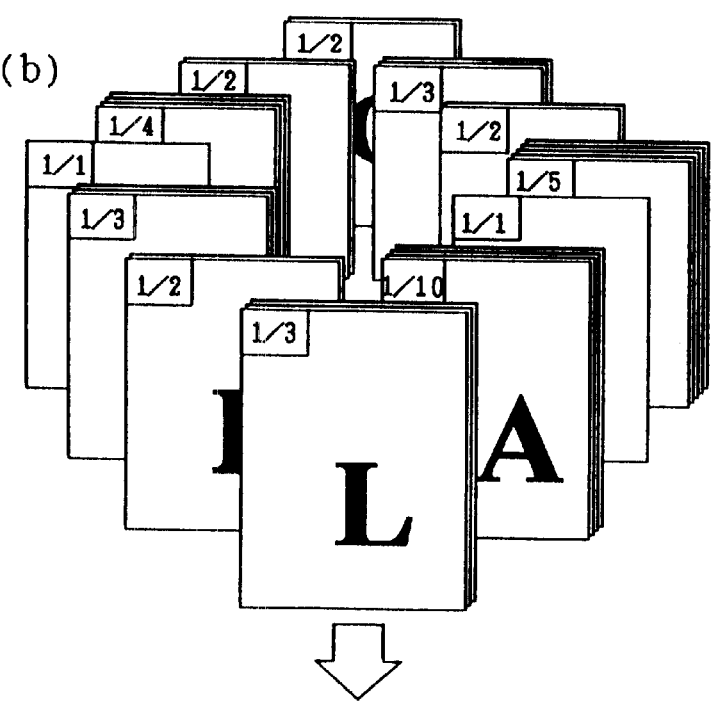
Figure 29:
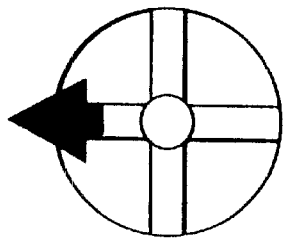

As shown in the flow chart in FIG. 28, after a folder group display is selected, a registered folder group is displayed in the form of a thumbnail ring according to a set of rules (parameters) registered in advance by the user (S151) (see FIG. 29(*a*)). A cluster of the file bundles is recalled from the displayed folder group in response to a designation with, for example, the pen 41, and displayed in the form of a thumbnail ring according to a registered set of rules. (S152) (see FIG. 29(*b*)).

Thereafter, the user judges whether the file bundle displayed on the front is the desired file bundle (S153). If the file bundle displayed on the front is not the desired file bundle, as mentioned earlier, the display of the cluster of the file bundles is rotated anticlockwise or clockwise in response to a rotation command entered through the operation of the cross key 24*a* (see FIG. 29(*c*)) (S154), and the process goes back to S153 (see FIG. 30(*a*)).

Figure 30:
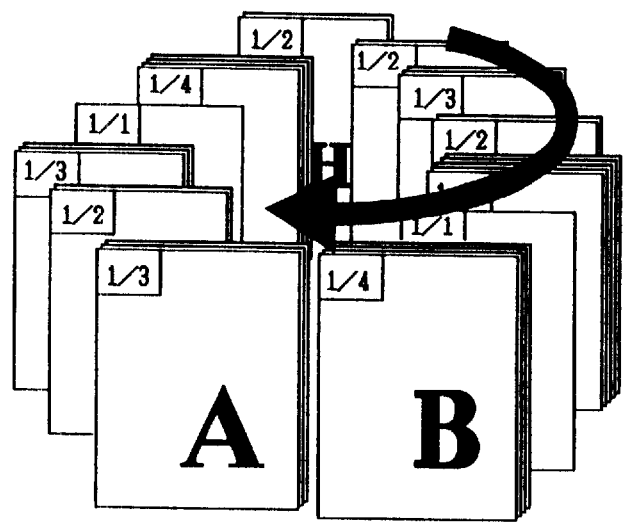
FIG. 30($a$) to FIG. 30($c$) are explanatory drawings showing an example of succeeding operations of procedures to specify the aforementioned front page.
Figure 30:
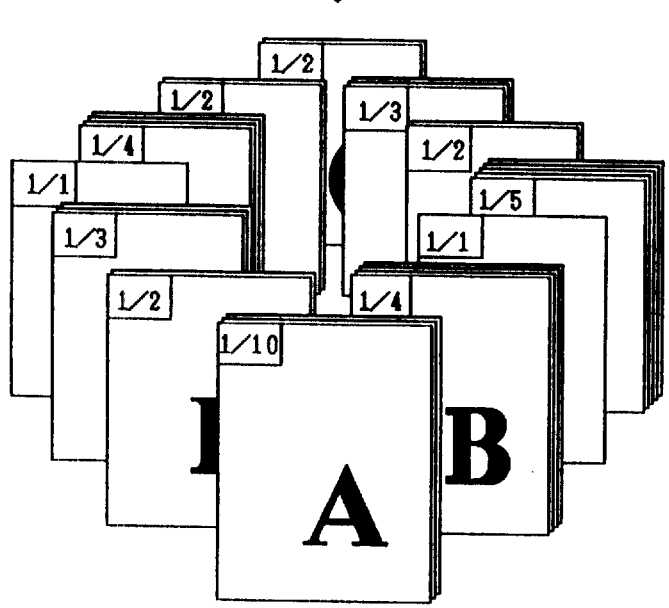
Figure 30:
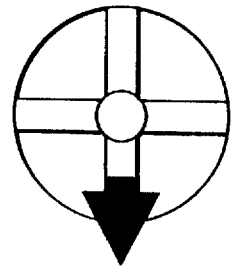

By contrast, if the file bundle displayed on the front is the desired file bundle, the user judges whether the front page of the file bundle is the representative page (S155) (see FIG. 30(*b*)). If the front page of the file bundle is not the representative page, the value of the page turning parameter designated in the mode C is recalled through the mode switching key, and the front page of the file bundle is switched according to the parameter in response to a page turning command entered through operation of the cross key (either the top or the bottom portion) (see FIG. 30(*c*) and FIG. 31(*a*)), and the process goes back to S155 (S156).

Figure 31:
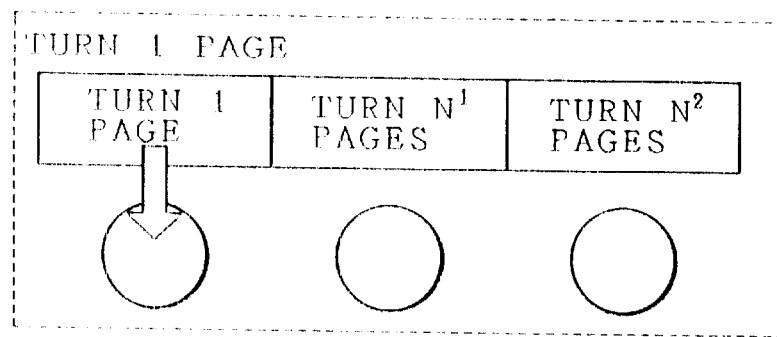
FIG. 31(a) and FIG. 31(b) are explanatory drawings showing an example of further succeeding operations of procedures to specify the aforementioned front page.
Figure 31:
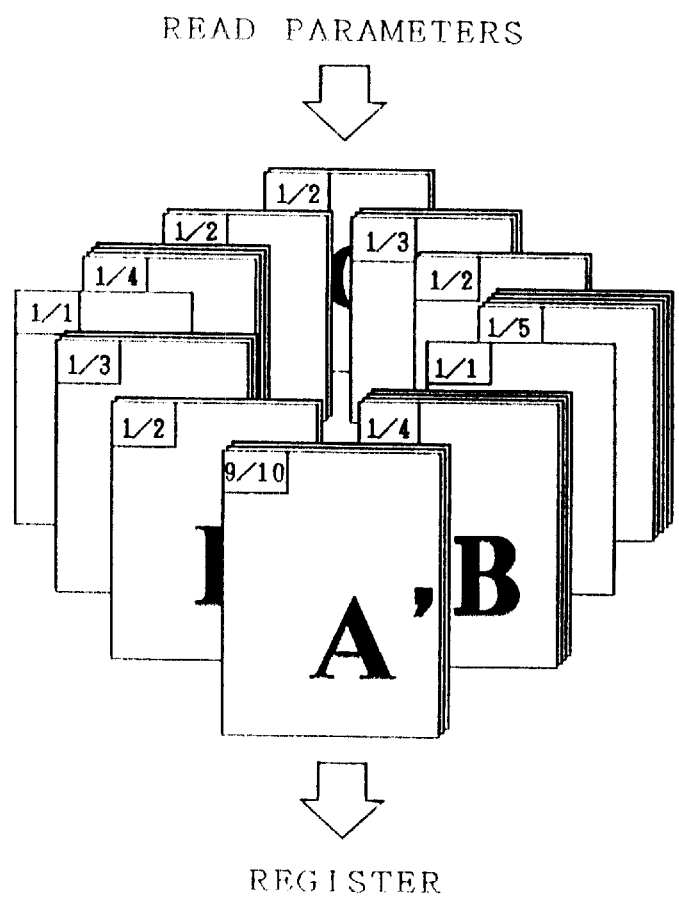

If the front page of the file bundle is the representative page, no switching is done; when another operation is carried out, the device registers the image of the front page that is currently displayed as parameters for the representative page to end the process (S157) (see FIG. 31(*b*)).

Alternatively, a further configuration may be incorporated as mentioned earlier in order to allow the rotation, page turning, and other rates for the ring-form thumbnail display to increase according to the period of time during which the cross key 24*a* is pressed and held down: the timer setting mode is turned on, the rotation rate, page turning, and other parameters are set to "Slow", the period of time during which the cross key 24*a* is held down is counted, and if three or more seconds has elapsed, the rotation rate and page turning rate parameters are automatically set to "Fast", which is a high rotation rate and a high page turning rate.

Now, referring to FIG. 32 to FIG. 39, the following description will explain, as embodiments 8 to 15, various search methods executable by an information managing device in accordance with the present invention.

Embodiment 8

Figure 32:
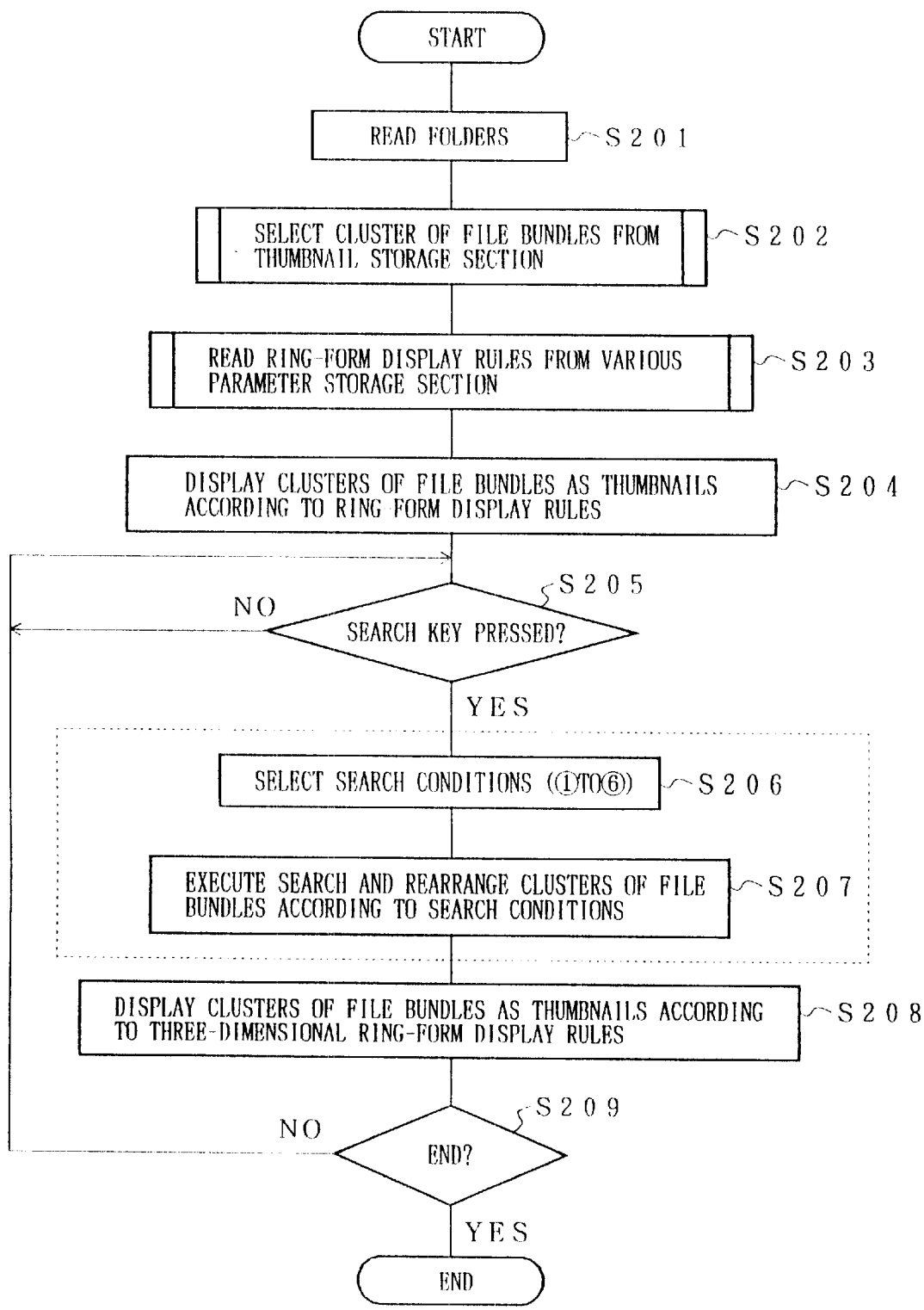
FIG. 32 is a flow chart showing procedures for the aforementioned information managing device to conduct searches under different search conditions.

In embodiment 8 in accordance with the present invention pertaining to an information managing device in accordance with the present invention, first, as shown in the flow chart in FIG. 32, as mentioned earlier, a folder is selected and read (S201). Subsequently, the image data of the clusters of file bundles (thumbnail file) corresponding to a folder is read from the thumbnail storage section 52 (S202).

Here, the set of rules (settings) for a ring-form display is read from the various parameter storage section 17 (S202), and the clusters of file bundles are displayed in the form of three-dimensional thumbnail rings according to the set of rules (settings) for the clusters of file bundles and the ring-form display as mentioned above (S204).

In this manner, in order to search the clusters of file bundles displayed in the form of three-dimensional thumbnail rings for the desired cluster of file bundles, a search key (not shown) is pressed according to one of the later-mentioned search methods ① to ⑥. If the search key is not pressed, the aforementioned display state is maintained (S205)

Next, the following description will explain common operations among the search methods ① to ⑥. First, in order to search for the desired cluster of file bundles, in present embodiment 8, search conditions are selected with, for example, the operation panel 24 and the pen 41 from the search conditions ① to ⑥ (S206). Subsequently, a search is conducted according to the search conditions selected in S206, and the clusters of file bundles that are currently displayed are arranged in a new sequence (S207).

The clusters of file bundles arranged in a new sequence in S207 are displayed on the LCD 11 by the image processing section 15 so as to partially overlap each other in the form of three-dimensional rings (S208). In this manner, a series of search operations S206 to S208 are completed.

If a search needs to be conducted on the same clusters of file bundles under different conditions, the process returns to S205 so that the device stands by, waiting for the pressing of the search key. If other clusters of file bundles are recalled, the search process is ended <End> (S209), and new clusters of file bundles are read <Start>.

Figure 33:
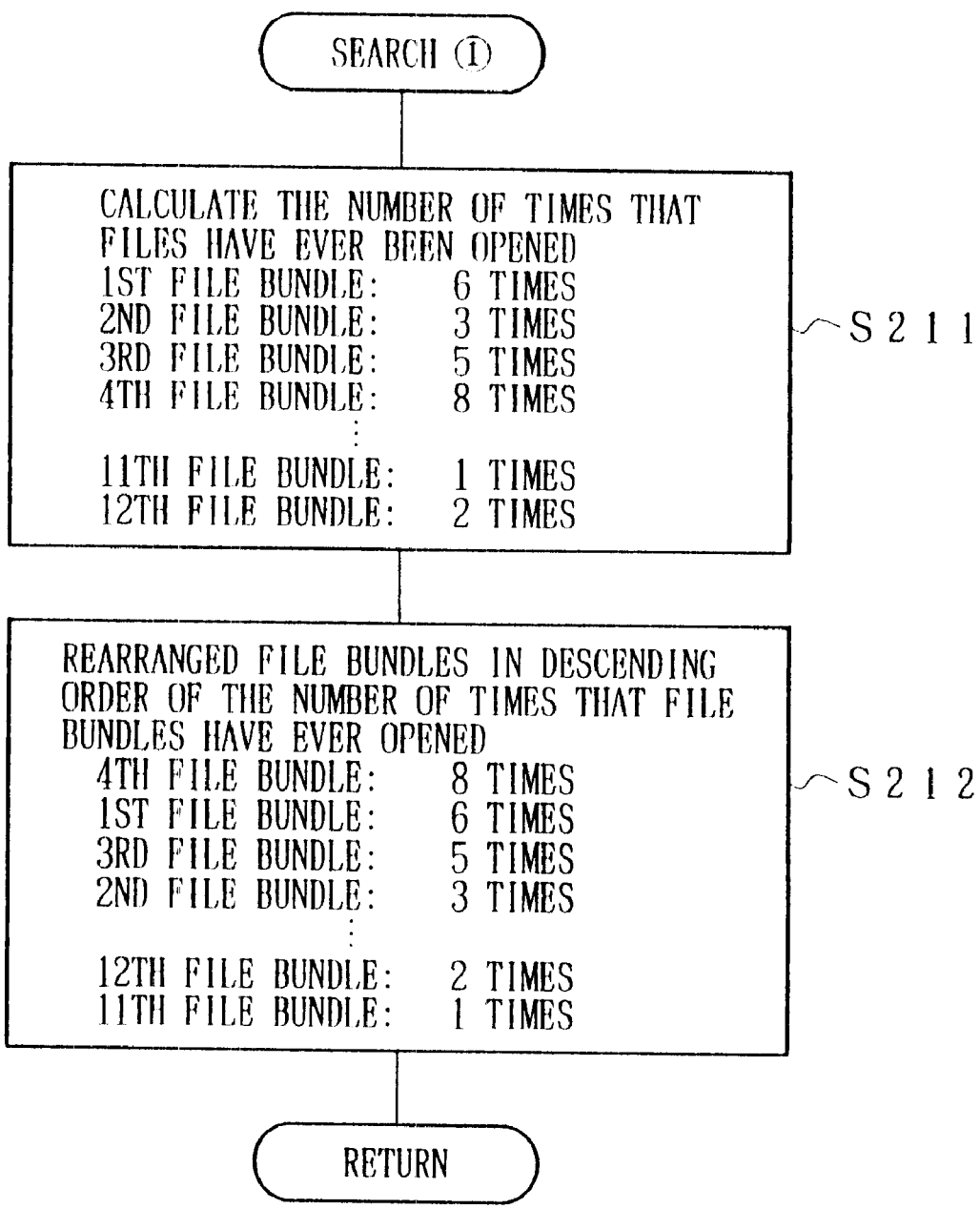
FIG. 33 is a flow chart showing procedures to rearrange the cluster of file bundles according to the number of times opened (the number of times searched for) under the aforementioned search conditions.

FIG. 33 is for explaining search operations using the number of times that a file bundle has ever been opened as the search conditions (conditions ①). Under search conditions ⑥, based on the number of times that the image file of a predetermined file bundle has ever been opened, a search is conducted so as to automatically rearrange the thumbnail images stored in the thumbnail storage section 52 and display the thumbnail images on the display screen so as to partially overlap each other in the form of a three-dimensional ring.

The number of times that the predetermined file bundle has ever been opened is counted and stored as a supplement in the various parameter storage section 17, and the number is calculated on the currently displayed cluster of file bundles by the calculation section 18. In the example shown in FIG. 33, the first file bundle has been opened six times, has been opened 6 times, the second file bundle has been opened thrice, the third file bundle has been opened five times, the fourth file bundle has been opened eight times, and so on, while the eleventh file bundle has been opened once, and the twelfth file bundle has been opened twice (S211).

As shown in FIG. 33, based on the number of times obtained in S211, the file bundles are rearranged in descending order of the number of times that the file bundles have ever been opened. In the example shown in FIG. 33, the fourth file bundle has been opened eight times, the first file bundle has been opened six times, the third file bundle has been opened five times, the second file bundle has been opened thrice, and so on, while the twelfth file bundle has been opened twice, and the eleventh file bundle has been opened once. If it is found that a plurality of file bundles have ever been opened for the same number of times, the file bundle that has been opened most recently is given a priority and placed in front (S212).

Figure 34:
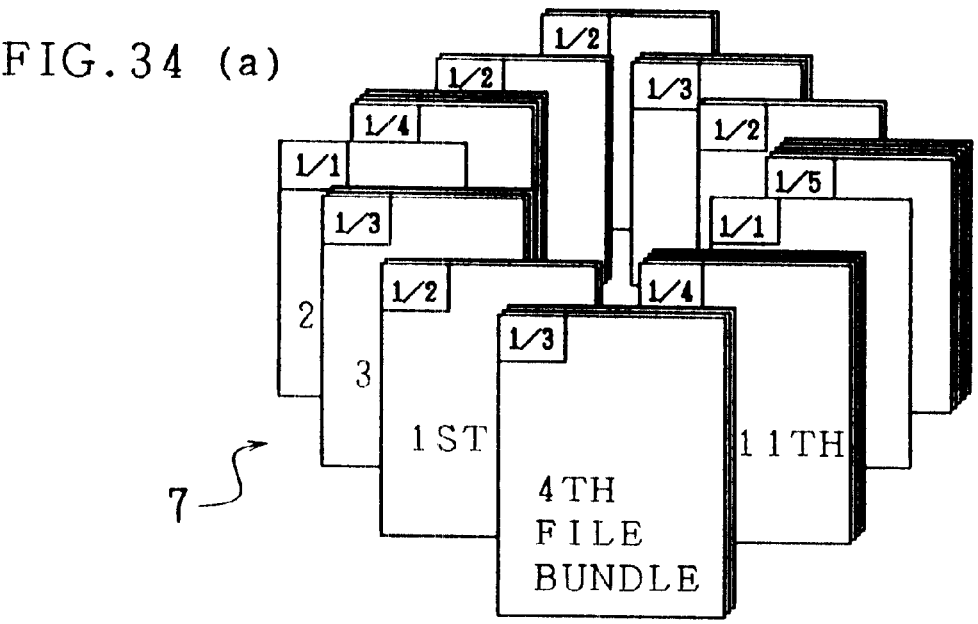
FIG. 34(a) is an explanatory drawing showing the cluster of file bundles displayed after the aforementioned rearrangement, involving an even number of clusters of file bundles.
FIG. 34(b) is an explanatory-drawing showing the cluster of file bundles displayed after the aforementioned rearrangement, involving an odd number of clusters of file bundles.
Figure 34:
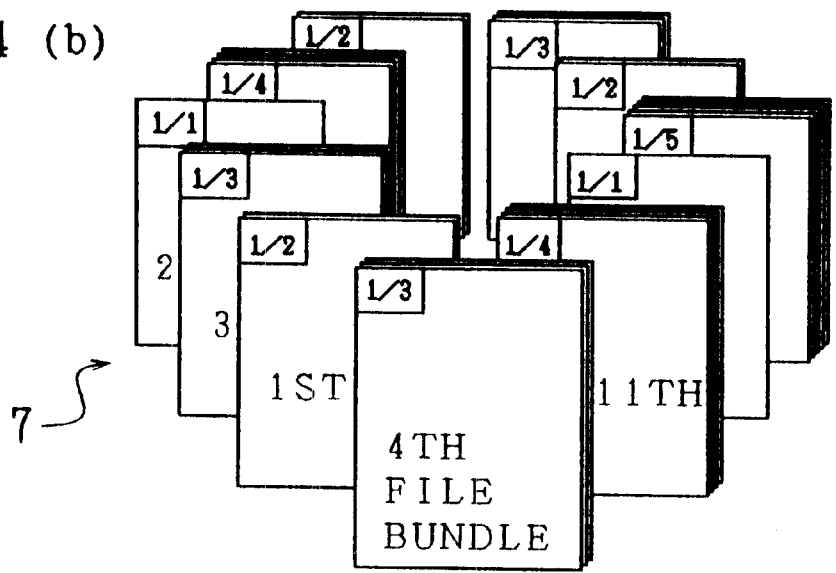
Figure 35:
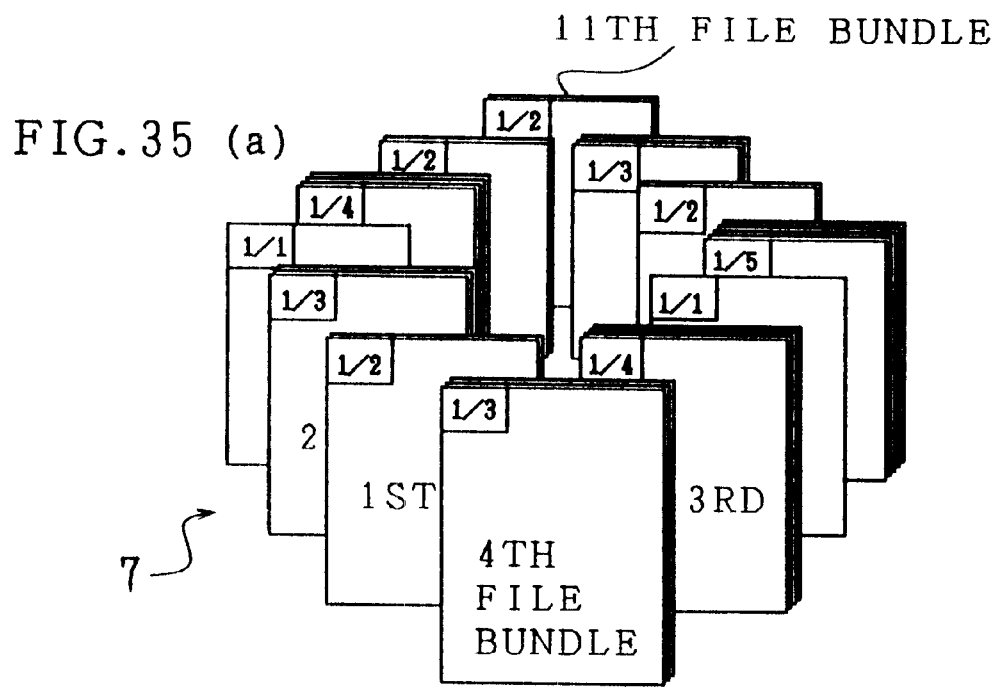
FIG. 35(a) is an explanatory drawing showing another cluster of file bundles displayed after the aforementioned rearrangement, involving an even number of clusters of file bundles.
FIG. 35(b) is an explanatory drawing showing another cluster of file bundles displayed after the aforementioned rearrangement, involving an odd number of clusters of file bundles.
Figure 35:
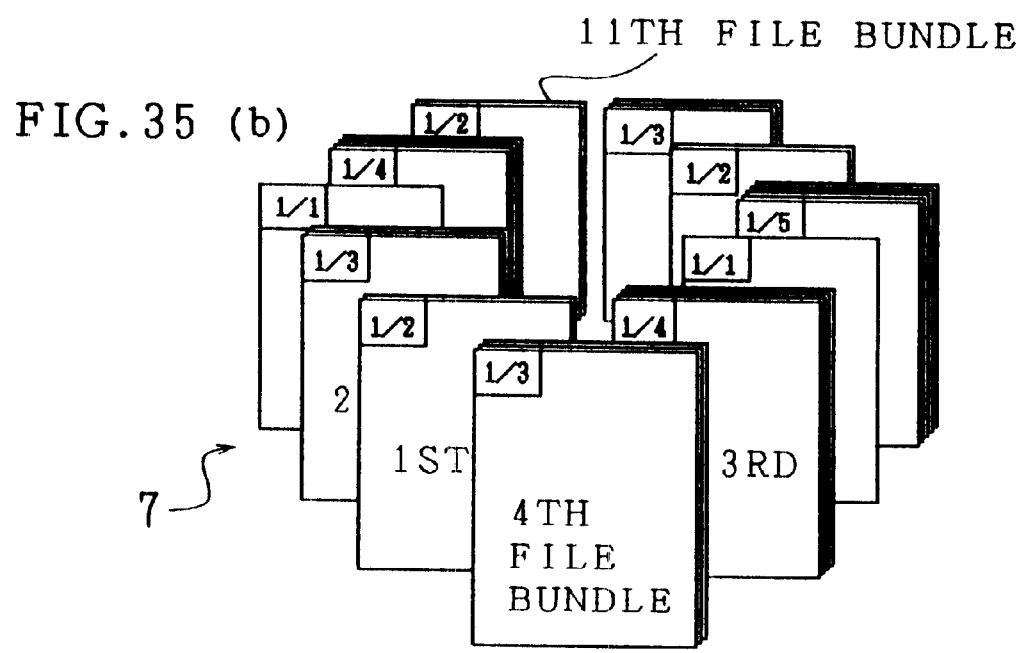

To display the cluster of the file bundles rearranged in this manner so as to partially overlap each other in the form of three-dimensional rings, the process returns to aforementioned S208 (see FIG. 32). The file bundles are displayed as shown in FIG. 34(*a*), FIG. 34(*b*), FIG. 35(*a*), or FIG. 35(*b*). In FIG. 34(*a*) and FIG. 34(*b*), the file bundles are displayed in the form of a ring sequentially in the clockwise direction in descending order of the number of times that the file bundles have ever been opened. In FIG. 35(*a*) and FIG. 35(*b*), the file bundles are displayed in the form of a ring sequentially from the foreground towards the back row in descending order of the number of times that the file bundles have ever been opened.

Embodiment 9

Now, the following description will explain two sets of rules (1) and (2) that forms a part of the rules (parameters) for the ring-form display as present embodiment 9. FIG. 34(a) and FIG. 34(b) are for explaining the set of rules (1) for the ring-form display, whereby the cluster of the file bundles displayed in the form of a three-dimensional thumbnail ring is rearranged, as a result of a search, sequentially either anticlockwise or clockwise from the front row. FIG. 34(a) and FIG. 34(b) show examples in which the cluster of file bundles rearranged according to the number of times that the folder bundles have ever been opened is displayed according to the set of rules (1) for a ring-form display: specifically, the folder bundles are arranged sequentially clockwise so that the fourth file bundle is positioned in the front row, the first file bundle is positioned diagonally behind the left of the fourth file bundle, then the third file bundle is positioned diagonally behind the left to the first file bundle, and the eleventh file bundle, which has been opened the smallest number of times, is positioned diagonally behind the right of the fourth file bundle. In an anticlockwise arrangement, the folder bundles are arranged in the reverse sequence of the clockwise arrangement.

The cluster of file bundles arranged according to the set of rules (1) for a ring-form display is displayed so as to partially overlap each other in the form of a three-dimensional ring, using the scaled-down thumbnail files corresponding to the respective image files. FIG. 34(a) shows a case where there are an even number of file bundles in the cluster of file bundles, while FIG. 34(b) shows a case where there are an odd number of file bundles in the cluster of file bundles.

FIG. 35(a) and FIG. 35(b) are for explaining the set of rules (2) among the sets of rules for a ring-form display recalled from the various parameter storage section 17, whereby the cluster of the file bundles displayed in the form of a three-dimensional thumbnail ring is rearranged, as a result of a search, sequentially from the foreground towards the back row alternately in the right and left. FIG. 35(a) and FIG. 35(b) show examples in which the cluster of file bundles rearranged according to the number of times that the folder bundles have ever been opened is displayed according to the set of rules (2) for a ring-form display: specifically, the folder bundles are sequentially arranged alternately (namely, first left, then right, and again left) from the foreground towards the back, so that the fourth file bundle is positioned in the foreground, the first file bundle is positioned diagonally behind the left of the fourth file bundle, the third file bundle is positioned diagonally behind the right of the fourth file bundle, the second file bundle is diagonally behind the left of the first file bundle, and the eleventh file bundle, which has been opened the smallest number of times, is positioned far back. Alternatively, the folder bundles may be arranged in the reverse sequence of the above arrangement (namely, first right, then left, and again right).

The cluster of file bundles arranged according to the set of rules (2) for a ring-form display is displayed so as to partially overlap each other in the form of a three-dimensional ring, using the scaled-down thumbnail files corresponding to the respective image files. FIG. 35(a) shows a case where there are an even number of file bundles in the cluster of file bundles, while FIG. 35(b) shows a case where there are an odd number of file bundles in the cluster of file bundles.

Embodiment 10

Now, the following description will explain embodiment 10. In present embodiment 10, the file bundle on the display screen is provided at the upper portion thereof with a header section (not shown). By inputting characters and symbols as a header section with the pen 41, any characters and symbols can be registered as a header. The header inputted through the tablet 42 with the pen 41 of the aforementioned input section 4 is stored in the keyword storage section 63 in association with a file bundle.

In a partially-overlapping three-dimensional ring-form display, the aforementioned header is displayed in a size that enables the user to recognise, in other words, look and identify, the header regardless of whether the header is in the foreground or far back. Since the header allows the user to look and easily identify the properties and contents of the file bundle, a search and a sorting can be easily conducted by means of the header.

Embodiment 11

Now, the following description will explain embodiment 11. In present embodiment 11, a search is conducted on the cluster of file bundles under such search conditions (conditions ②) that enables a series of operations to pick up only those file bundles having a header described in embodiment 10 above in the header section, to create a cluster that includes only file bundles having a header, and to display the file bundles in the cluster so as to partially overlap each other in the form of a three-dimensional ring.

Figure 36:
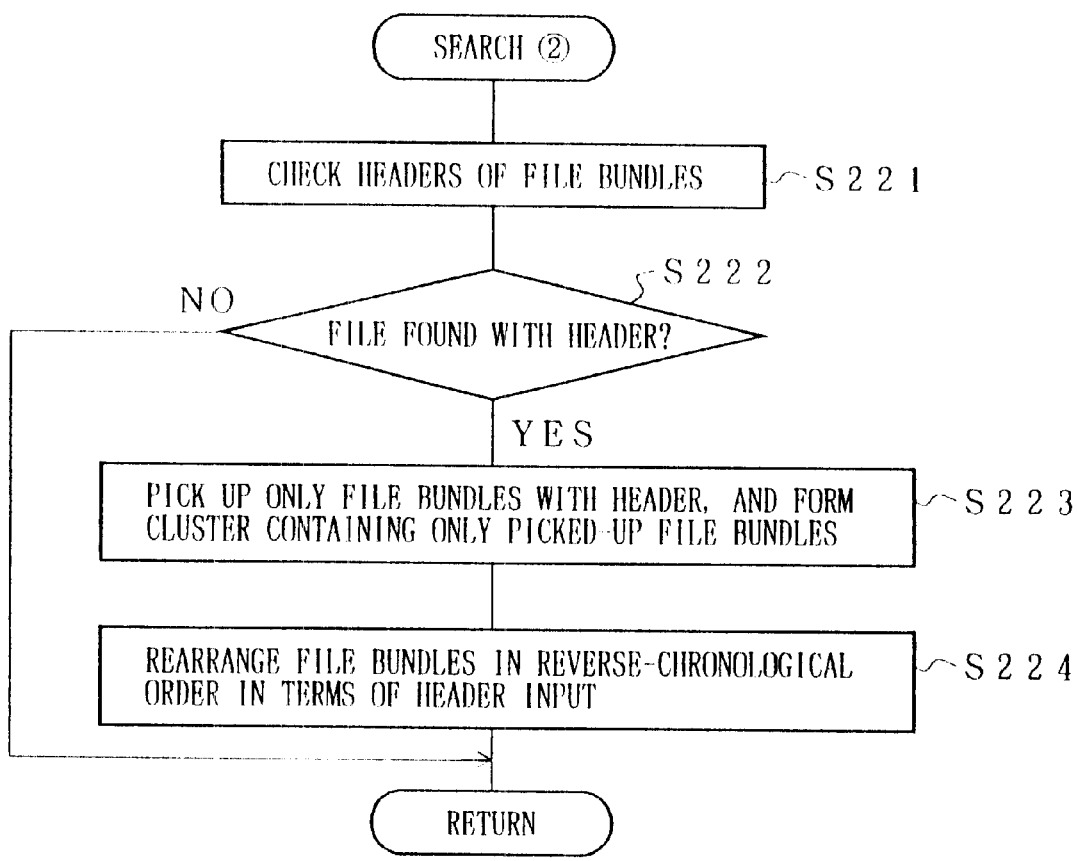
FIG. 36 is a flow chart showing a rearrangement of the cluster of file bundles under another of the aforementioned search conditions.

Referring to the flow chart shown in FIG. 36, the following description will explain the above-mentioned operations. First, the headers stored in the keyword storage section 63 for the respective associated file bundles are displayed and checked (S221). If there is no file bundle having a header, the search using headers as the search conditions is ended, and the process returns (S222). If there is one or more file bundles having a header, the file bundles having a header are picked up to create a cluster containing only those picked-up file bundles (S223).

The input date and time of the headers stored in the keyword storage section 63 for the respective associated file bundles in the formed cluster of file bundles are checked so as to rearrange the file bundles sequentially in reverse-chronological order in terms of the header input (S224). Thereafter, the process jumps to S208 (see FIG. 32) described in embodiment 8 above, and hence the folder bundles are displayed so as to partially overlap each other in the form of three-dimensional rings.

Note that although in embodiment 11 above an example was taken where a search was conducted for file bundles having a header, it is also possible, on the other way round, to create a cluster containing only those file bundles having no header and display those file bundles without a header so as to partially overlap each other in the form of a three-dimensional ring.

Embodiment 12

In embodiment 11 above, the header that is stored in the keyword storage section 63 in association with a file bundle can be displayed in reverse tone. The display can be switched between reverse and non-reverse displays. By using reversed and non-reversed headers, from the cluster of file bundles having a header, only reversed headers or non-reversed headers can be searched for through the cluster, picked up, and displayed in the form of a three-dimensional thumbnail ring.

Figure 37:
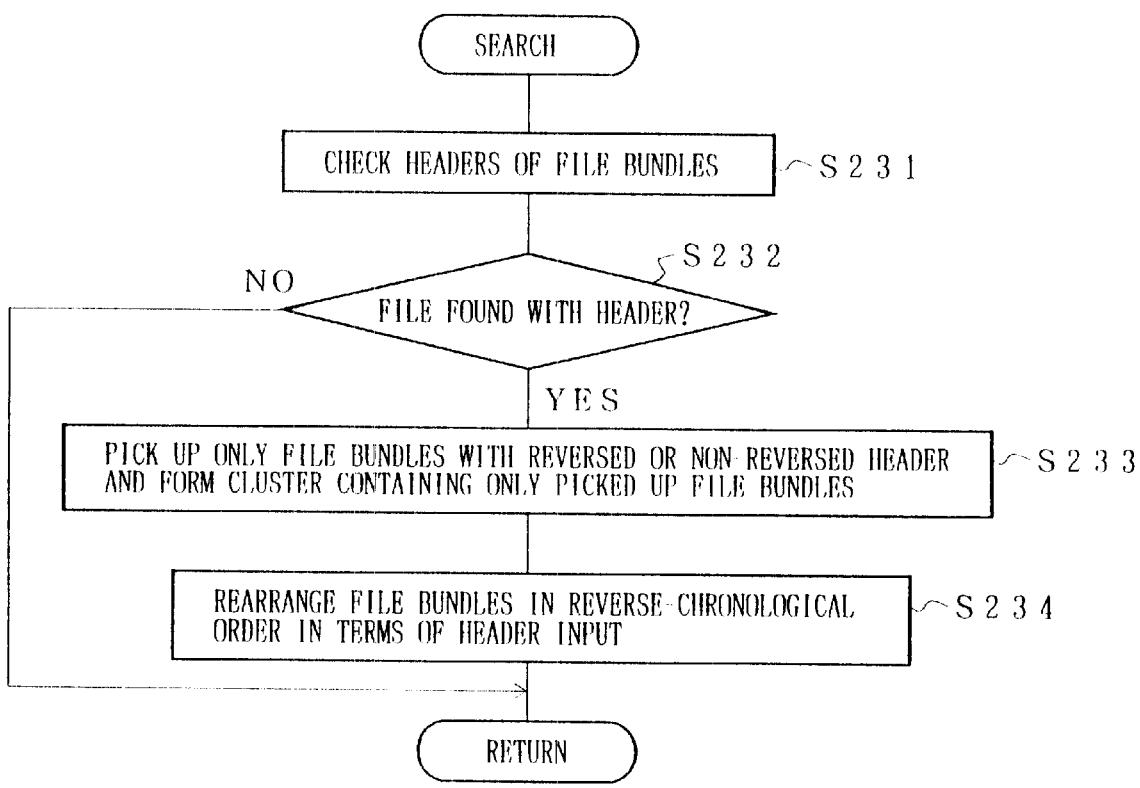
FIG. 37 is a flow chart showing a rearrangement of the cluster of file bundles under still another of the aforementioned search conditions.

The flow chart shown in FIG. 37 explains reversed header display used as the search conditions (conditions ③), which enables a series of operations to search the cluster of file bundles for only those file bundles having a reversed header, to create a cluster of only those file bundles having a reversed header, and to display the file bundles so as to partially overlap each other in the form of three-dimensional rings. The search is substantially the same as embodiment 11 above except the additional conditions with respect to reversed and non-reversed headers.

First, the headers that are stored in the keyword storage section 63 in association with file bundles are checked (S231). If there is no file bundle having a reversed header, the search using reversed headers as the search conditions is ended, and the process returns (S232). If there is one or more file bundles having a reversed header, the file bundles having a reversed header are picked up to create a cluster containing only those picked-up file bundles (S233). The input date and time of the headers stored in the keyword storage section 63 for the respective associated file bundles in the formed cluster of file bundles are checked so as to rearrange the file bundles sequentially in reverse-chronological order in terms of the header input (S234). Thereafter, the process jumps to S208 (see FIG. 32) described in embodiment 8 above, and hence the folder bundles are displayed so as to partially overlap each other in the form of a three-dimensional ring.

Note that although in embodiment 12 above an example was taken where a search was conducted for file bundles having a reversed header, it is also possible, on the other way round, to create a cluster containing only those file bundles having a non-reversed header and display the file bundles so as to partially overlap each other in the form of three-dimensional rings.

Embodiment 13

Figure 38:
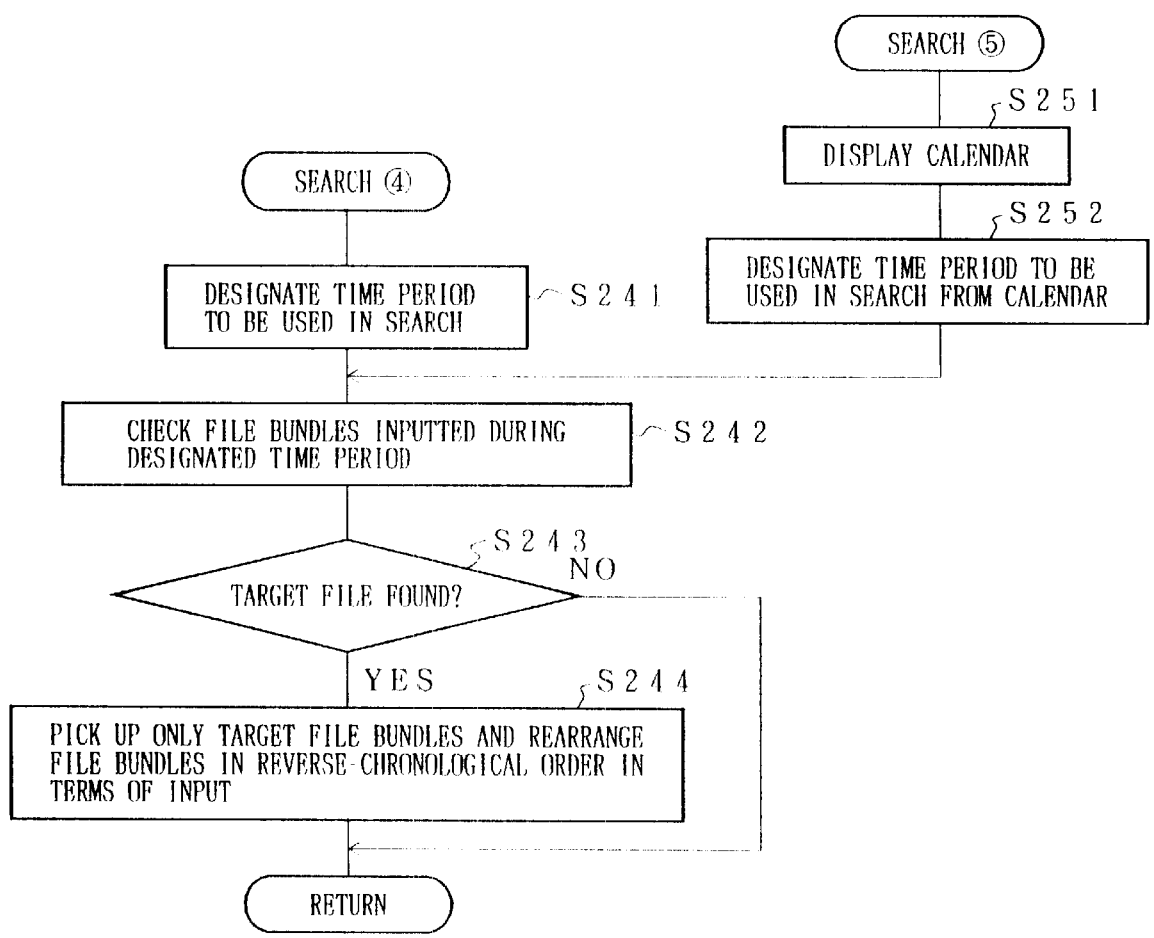
FIG. 38 is a flow chart showing a rearrangement of the cluster of file bundles under even another of the aforementioned search conditions.

The flow chart shown in FIG. 38 explains a designated period of time used as the search conditions (conditions ④) that enables a series of operations to search the cluster of file bundles for only those file bundles inputted during a designated period of time, to create a cluster of only those file bundles inputted during the designated period of time, and to display the file bundles so as to partially overlap each other in the form of a three-dimensional ring.

The date and time monitor 45, for monitoring the input date and time, of the input section 4 provides each of the file bundles with date and time information that is stored in the various parameter storage section 17 in association with the file bundle. If a search is conducted by means of input date and time, first, a period of time is designated with the pen 41, the operation panel 24, or other devices to be used in a search (S241).

The date and time information that is stored in the various parameter storage section 17 in association with the file bundles is checked for file bundles inputted during the period of time designated in S241 (S242). If the result of S242 shows that there is no such a file bundle, the search is ended and the process returns. If there are such file bundles, the file bundles are rearranged sequentially in reverse-chronological order in terms of input (S244). Thereafter, the process jumps to S208 (see FIG. 32) described in embodiment 8 to display the file bundles so as to partially overlap each other in the form of a three-dimensional ring.

Embodiment 14

Furthermore, an information managing device in accordance with the present invention has calendar display capabilities to display a calendar on the LCD 11 showing, for example, dates and days of the week in the past, present, and future to enable a designation of the date or the day of the week with the pen 41. By means of the calendar display capabilities, the user can easily designate the search range in embodiment 13 above. Various kinds of data to display the calendar is stored in the image storage section 51 or in the keyword storage section 63.

The flow chart shown in FIG. 38 explains a designated period of time used as the search conditions (conditions ⑤) that enables a series of operations using the calendar capabilities to search the cluster of file bundles for only those file bundles inputted during a designated period of time, to create a cluster of only those file bundles inputted during the designated period of time, and to display the file bundles so as to partially overlap each other in the form of a three-dimensional ring.

First, as shown in FIG. 38, the calendar is recalled from, for example, the keyword storage section 63 and displayed on the LCD 11 (S251). The day of the week, date, etc. are designated in the displayed calendar to be used in a search (S252). Subsequent operations are the same as those in S242 and the succeeding steps of embodiment 13 above, and therefore the process jumps to S242. In other words, the date and time information that is stored in the various parameter storage section 17 in association with the file bundles is checked for file bundles inputted during the period of time designated in S252 (S242). If the result of S242 shows that there is no such a file bundle, the search is ended and the process returns. If there are such file bundles, the file bundles are rearranged sequentially in reverse-chronological order in terms of input (S244). Thereafter, the process jumps to S208 (see FIG. 32) described in embodiment 8 to display the file bundles so as to partially overlap each other in the form of a three-dimensional ring.

Embodiment 15

In the present embodiment, an explanation will be given on a search based on the markings of file bundles displayed on the display screen. First, the file bundle recalled from the image storage section 51 is given a marking section where a marking is manually written with the pen 41 on the display screen of the LCD 11. Since the handwritten marking is stored in the keyword storage section 63 in association with a file bundle, a marking denoting a relative importance of the file bundle can be added thereto. Consequently, in the present embodiment, by-means of the markings, the image files can be easily searched for and sorted out by a search through the file bundles.

Figure 39:
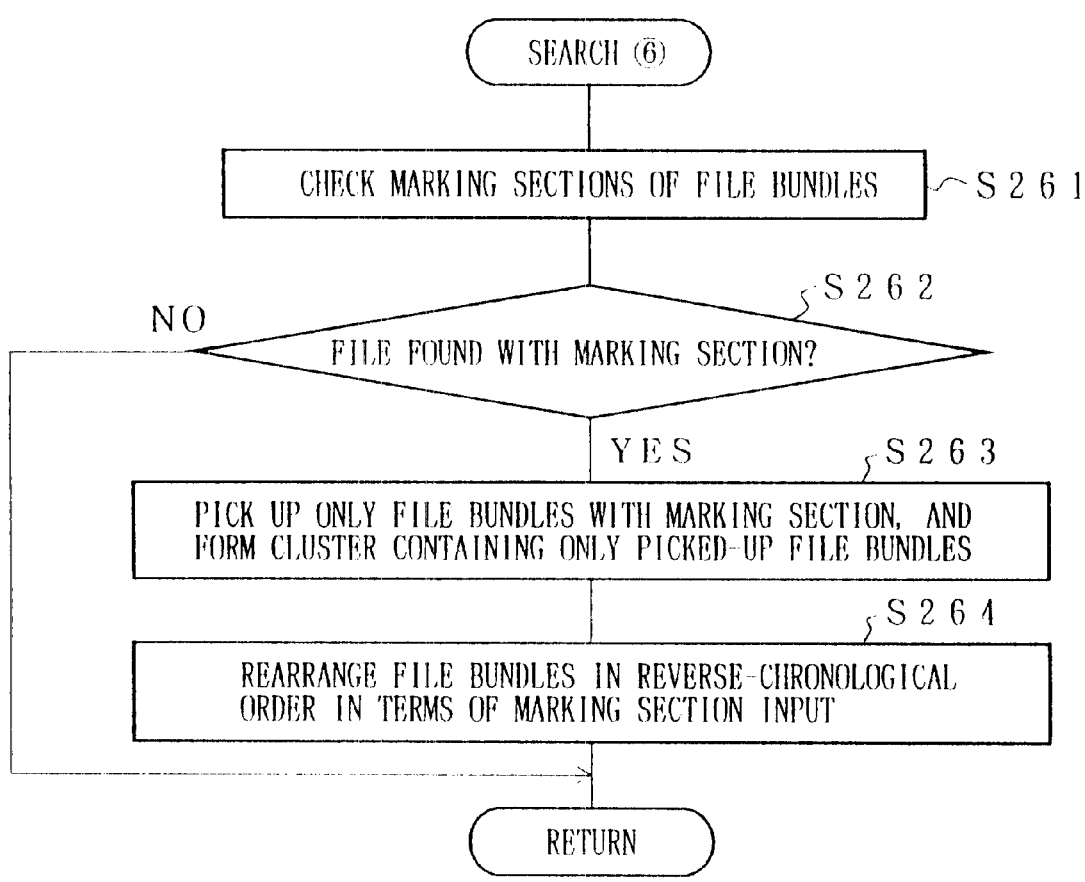
FIG. 39 is a flow chart showing a rearrangement of the cluster of file bundles under still another of the aforementioned search conditions.

The flow chart shown in FIG. 39 explains handwritten markings used as the search conditions (conditions ⑥) that enables a series of operations to search the cluster of file bundles for only those file bundles having a marking in the marking section thereof, to create a cluster of only those file bundles having a marking, and to display the file bundles so as to partially overlap each other in the form of three-dimensional rings.

As shown in FIG. 39, the marking sections that are stored in the keyword storage section 63 in association with file bundles are checked (S261). Subsequently, it is judged whether or not the marking sections have a marking (S262). Here, if there is no file bundle having a marking, the search using markings as the search conditions is ended and the process returns. If there is at least one file bundle having a marking, those file bundles having a marking are picked up to create a cluster of only those picked-up file bundles (S263).

Next, the input date and time of the markings that are stored in the keyword storage section 63 in association with the file bundles in the formed cluster of file bundles is checked to rearrange the file bundles sequentially in reverse-chronological order in terms of marking input (S264). Thereafter, the process jumps to S208 (see FIG. 32) described in embodiment 8 to display the file bundles so as to partially overlap each other in the form of three-dimensional rings.

Note that although in embodiment 15 above an example was taken where a search was conducted for file bundles having a marking, it is also possible, on the other way round, to create a cluster containing only those file bundles having no marking and display the file bundles so as to partially overlap each other in the form of a three-dimensional ring.

Embodiment 16

In present embodiment 16, an explanation will be given on the input method of a title character row used for searches. First, the flow chart shown in FIG. 40 shows operation procedures to input a title character row used for searches.

Figure 40:
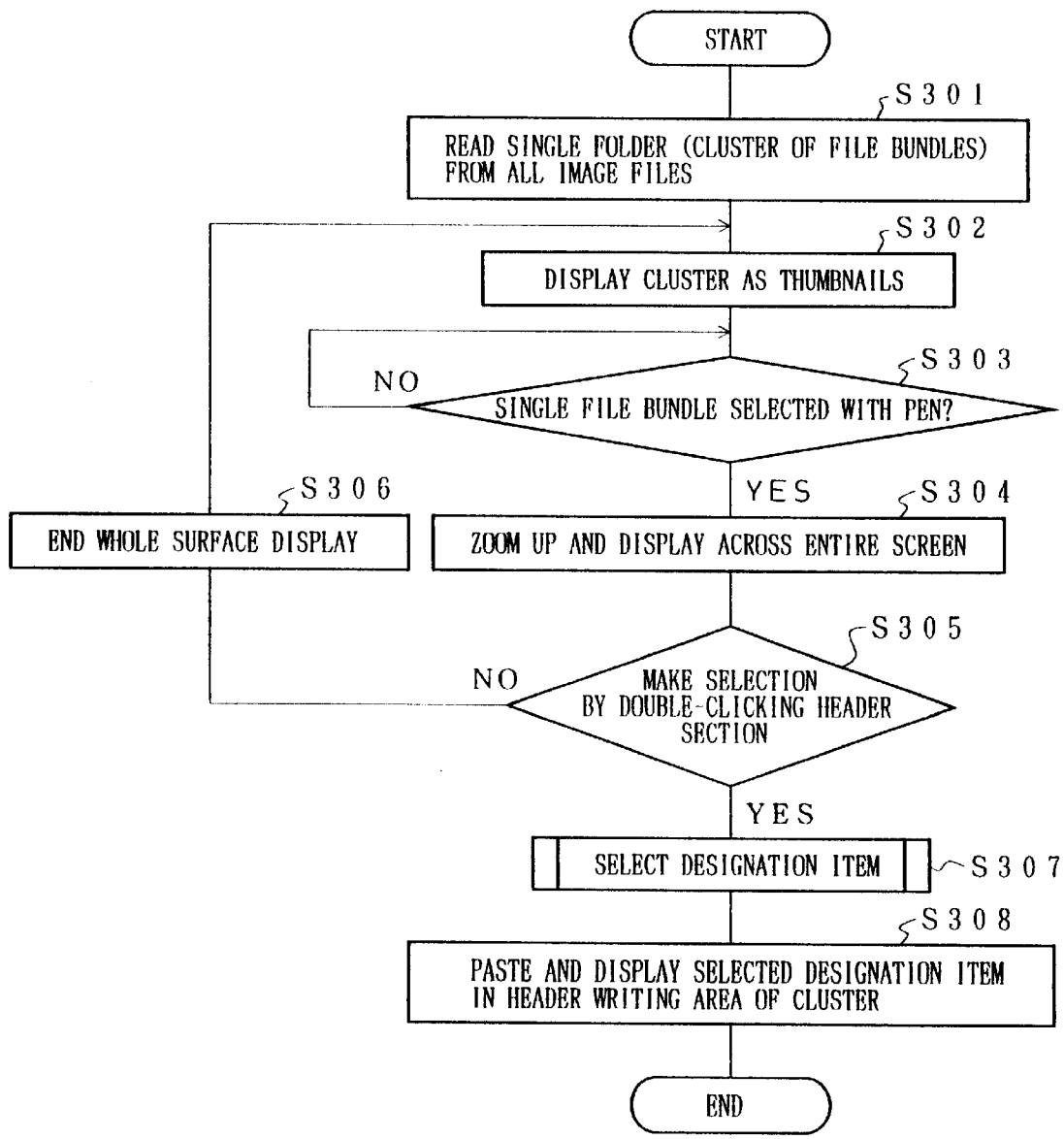
FIG. 40 is a flow chart showing procedures for the aforementioned information managing device to allow the user to input a search designation item.

First, as shown in FIG. 40, a single folder (a cluster of file bundles) is read from all the image files stored in the image storage section 51 in response to a command entered with the pen 41 through a menu bar, a tool bar, or the like displayed on the top part of the LCD 11 (S301). A set of rules to display the cluster in the form of a ring is read from the various parameter storage section 17, and the read cluster is displayed in the form of a thumbnail ring according to the set of rules (S302).

A single file bundle is selected from the displayed cluster of file bundles with the pen 41 (S303) (see FIG. 41(a)), the selected file bundle is, for example, scaled up, and the original document image of an image file, such as the original document bundle associated with the file bundles, is displayed across the whole part of the display screen of the LCD 11 (S304). The process goes through a perpetual loop, i.e., the device stands by, until a single file bundle is selected. However, if a different function is activated in the stand-by state, the device ends the thumbnail-form display and goes out of the stand-by state.

Next, the header section provided on the display screen is selected by double clicking it while the original document image is being displayed across the whole part of the screen. Hence, a selection menu (pop-up menu) 47 showing designation items (properties of image files) stored in the various parameter storage section 17 is displayed on the screen of the LCD 11, superimposed by the image synthesizing section 16 on the displayed original document image (S305) (see FIG. 41(b)).

Here, if the original document image on the display screen is not the desired one, a mode D is activated with the mode switching key 24b and the screen switch button of the display key section 24d is turned on with the command keys 24c (see FIG. 14). This operation switches the display from the whole surface display to the original ring-form display (S306).

Next, a designation item is selected from the pull-up selection menu 47 shown in FIG. 41(b) (S307). Note that details of the designation items will be mentioned later. As the selection of a designation item is completed, the selected designation item is pasted in header section areas of the cluster of file bundles, and a display operation is executed (S308). This procedure completes the principal operations regarding title character row input of an information managing device of present embodiment 16.

Figure 41:
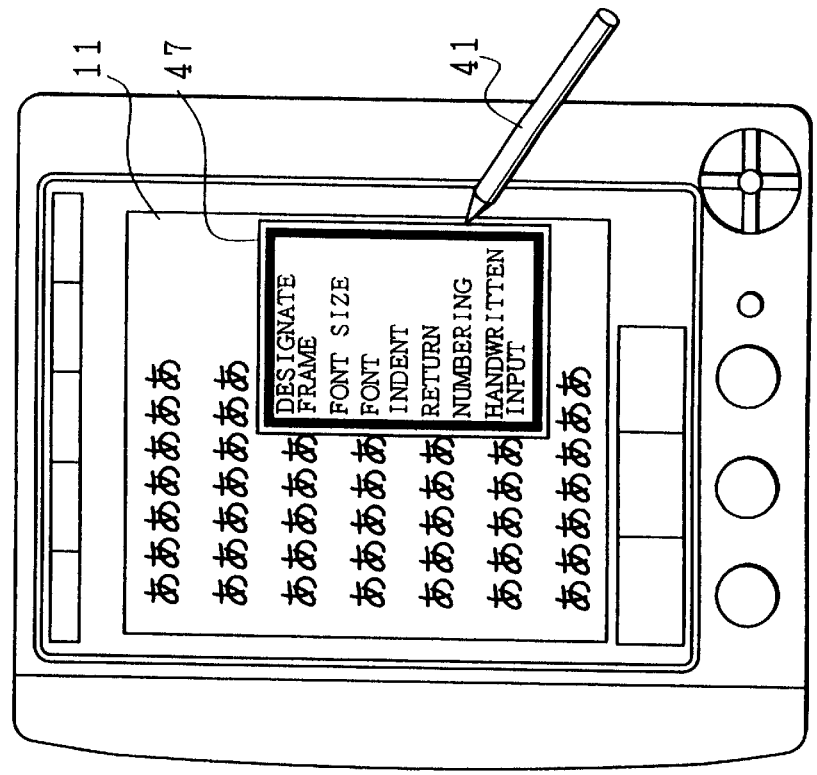
FIG. 41(a) is an explanatory drawing showing a display screen before specification of a search designation item on the aforementioned information managing device.
FIG. 41(b) is an explanatory drawing showing a display screen recalling a selection menu in specification of a search designation item on the aforementioned information managing device.
Figure 41:
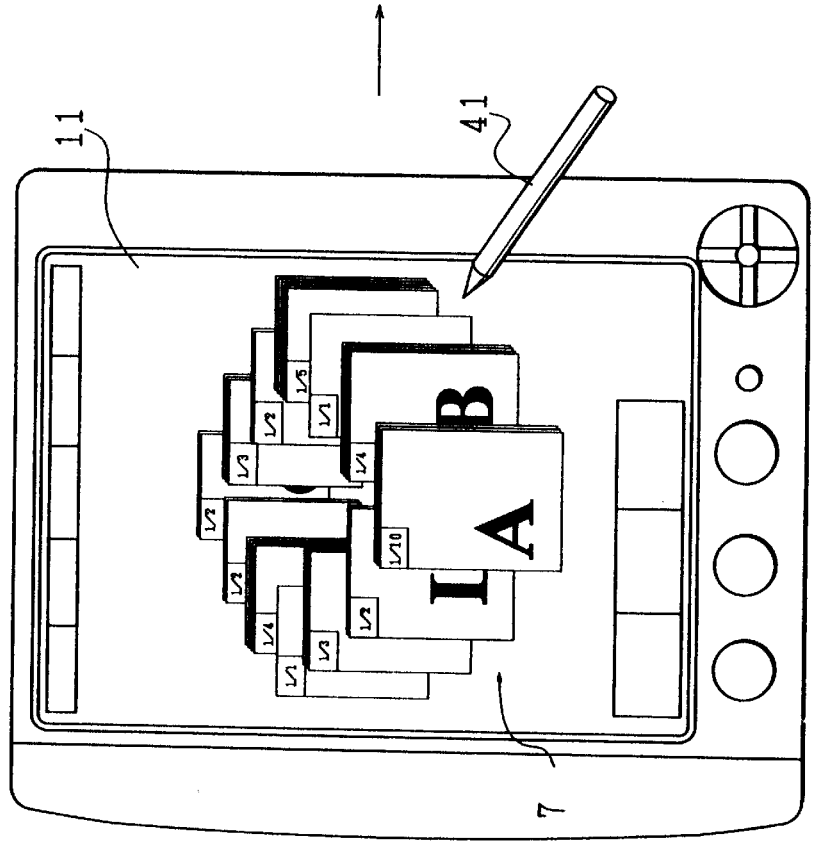
Figure 42:
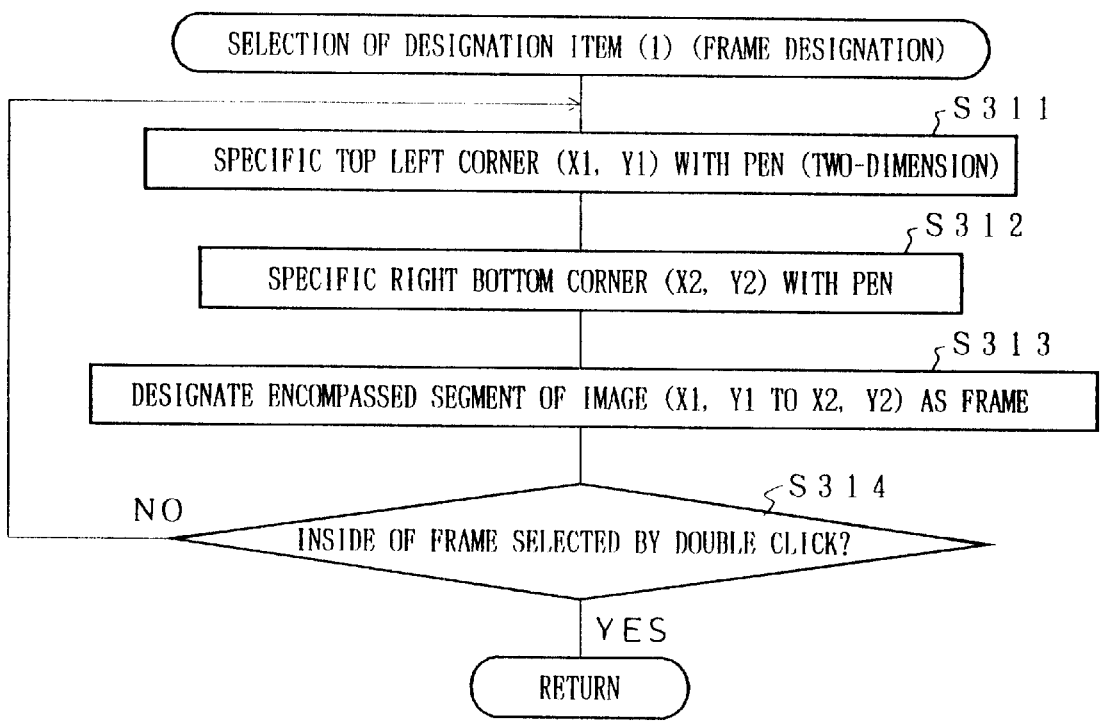
FIG. 42 is a flow chart showing specification procedures to designate a frame in the aforementioned selection menu.

Now, referring to FIG. 42, the following description will explain in detail designation of a frame as an example of ways to select designation items. First, from the pull-up selection menu 47, "Designate Frame" is selected with the pen 41 (see FIG. 41(b)). Subsequently, a frame is drawn to encompass a character row(s) to be designated, by specifying, with the pen 41, the top left corner (X1, Y1) of the frame on the original document screen displayed in a scaled-up form (S311), and then specifying the bottom right corner (X2, Y2) with the pen 41 (S312). Hence, the encompassed area on the display image, (X1, Y1 to X2, Y2) is designated as a frame (S313).

Thereafter, by double clicking inside the designated frame with the pen 41, a specification of the designation item(s) is completed (S314). After completing the specification of the designation item, as mentioned above, the item is pasted in the header section of the cluster and a display operation is executed.

Here, if the designation item is not the one desired by the user, the specification of the designation item is canceled by clicking outside the frame with the pen 41, and started again by specifying the top left corner (X1, Y1) in the screen displayed in a scaled-up form.

Hence, in present embodiment 16, when title characters are inputted during a document registration, simply by designating a frame with the pen 41, the character row(s) in the frame is(are) automatically identified and displayed in the header section area of the cluster as the title desired by the user. Therefore, designation of titles is easily made, and sorting of image files is facilitated.

Embodiment 17

Figure 43:
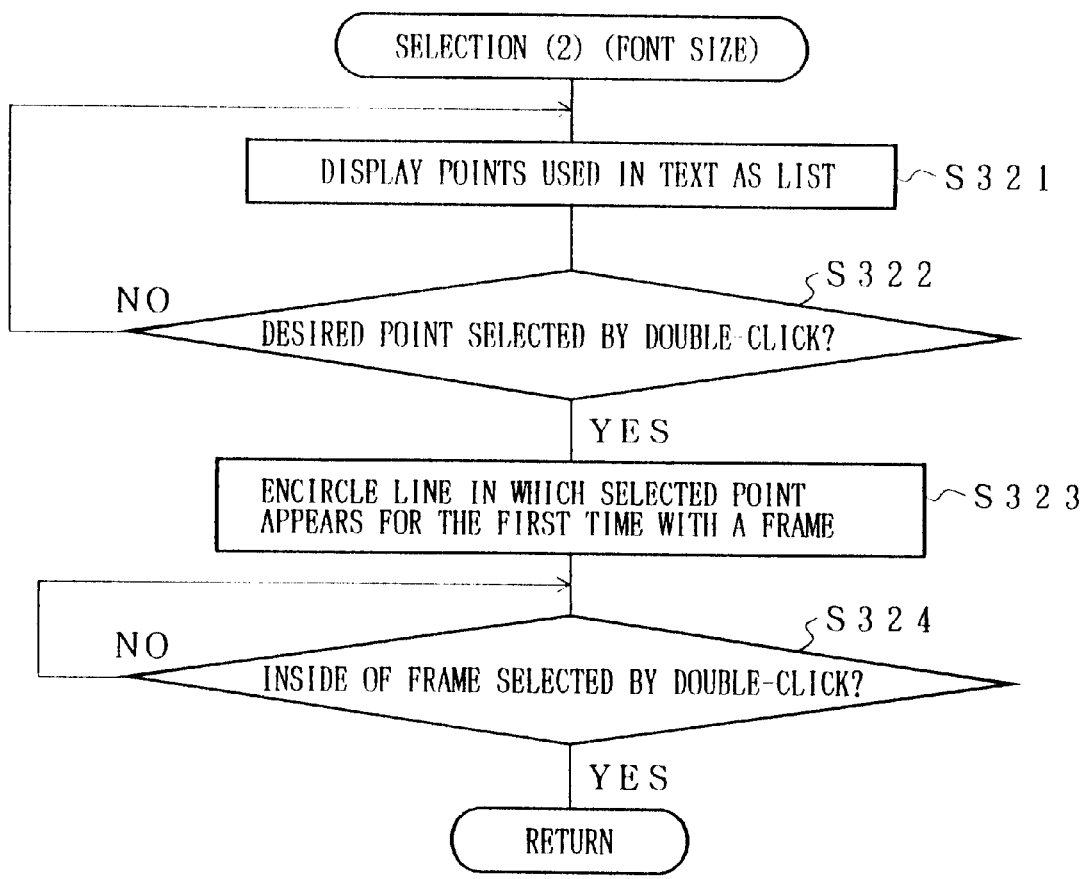
FIG. 43 is a flow chart showing specification procedures to designate a character size in the aforementioned selection menu.

Now, Referring to FIG. 43, the following description will explain another embodiment of the above-mentioned specification of a designation item: namely, a font size. First, from the pull-up selection menu 47 showing designation items, "Font size" is selected (see FIG. 41(b)) with the pen 41. As "Font size" is selected, a list is displayed about character points used in the text of an original document image (S321).

Subsequently, a certain font size is selected by double-clicking on the list with the pen 41. Here, the list of points used stays on screen until a designation item is selected (S322).

The line in which the selected point appears for the first time in the text is displayed while being encircled by a frame (S323). Next, the inside of a certain frame is selected with the pen 41, the selected character row is processed, for example, the character row is cut short to a predetermined number of characters, and the inside of the frame is double-clicked (S324). After completing the specification of the designation item, as previously mentioned, the designation item is pasted in the header section area of the cluster, and a display operation is executed.

In this manner, in present embodiment 17, by designating the font size with the pen 41 when the title characters are inputted during a text registration, the character rows including characters of the designated size are recalled, and the user may designate a desired title from the character rows, and the desired title is displayed in the header writing area of the cluster. Therefore, title designation is facilitated, and hence image file sorting is also facilitated.

Embodiment 18

Figure 44:
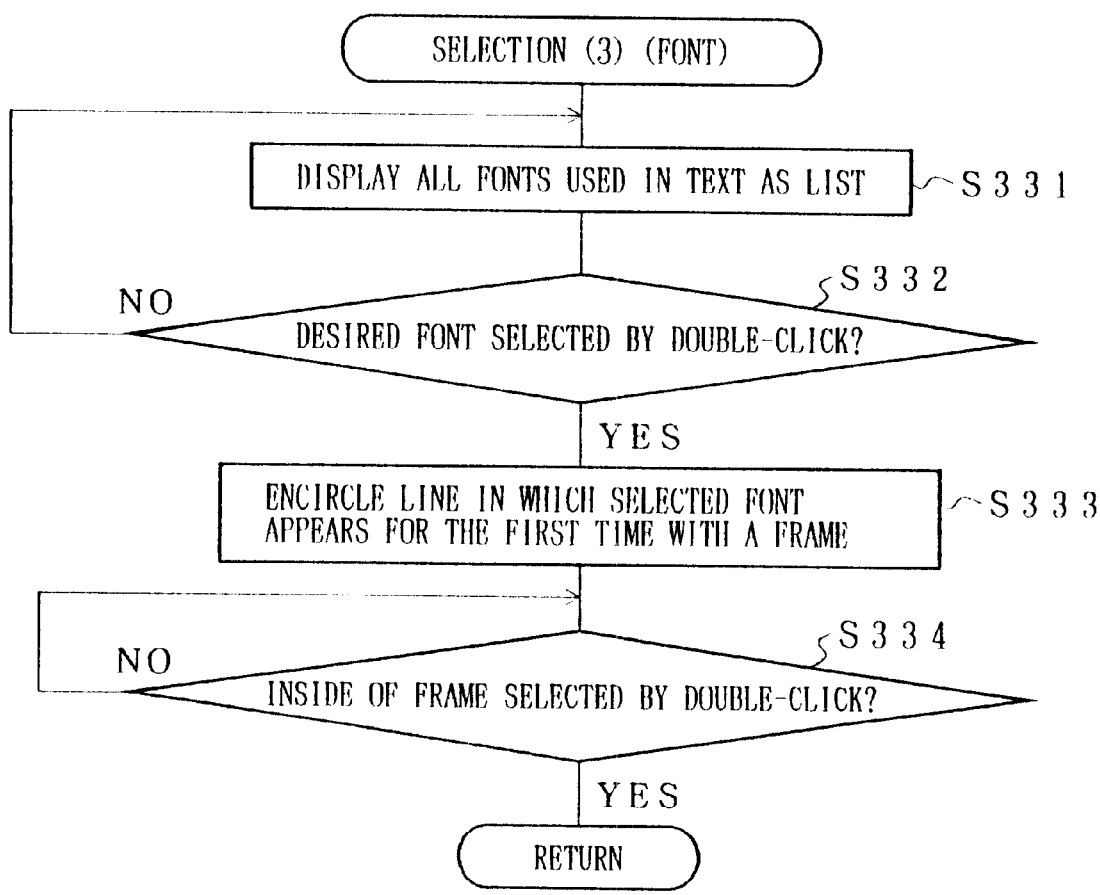
FIG. 44 is a flow chart showing specification procedures to designate a character font in the aforementioned selection menu.

Now, referring to FIG. 44, the following description will explain even another embodiment of the above-mentioned specification of a designation item: namely, character font. First, from the pull-up selection menu 47 showing designation items, "Font" is selected (see FIG. 41(*b*)) with the pen 41. As "Font" is selected, a list is displayed about character fonts used in the text of an original document image (S331).

Thereafter, a character font is selected by double-clicking in the list display with the pen 41. Here, the list display of character fonts used stays on screen until a designation item is selected (S332).

As a selection is made, the line in which the selected font appears for the first time in the text is displayed while being encircled by a frame (S333). Next, the inside of a certain (desired) frame is selected with the pen 41, the selected character row is processed, for example, the character row is cut short to a predetermined number of characters, and the inside of the frame is double-clicked (S334) . After completing the specification of the designation item, as mentioned above, the designation item is pasted in the header section area of the cluster, and a display operation is executed.

In this manner, in present embodiment 18, by designating the character font with the pen 41 when the title characters are inputted during a text registration, the character rows including characters of the designated font are read, and the user designates a desired title from the character rows, and the desired title is displayed in the header writing area of the cluster. Therefore, title designation is facilitated, and hence image file sorting is also facilitated.

Embodiment 19

Figure 45:
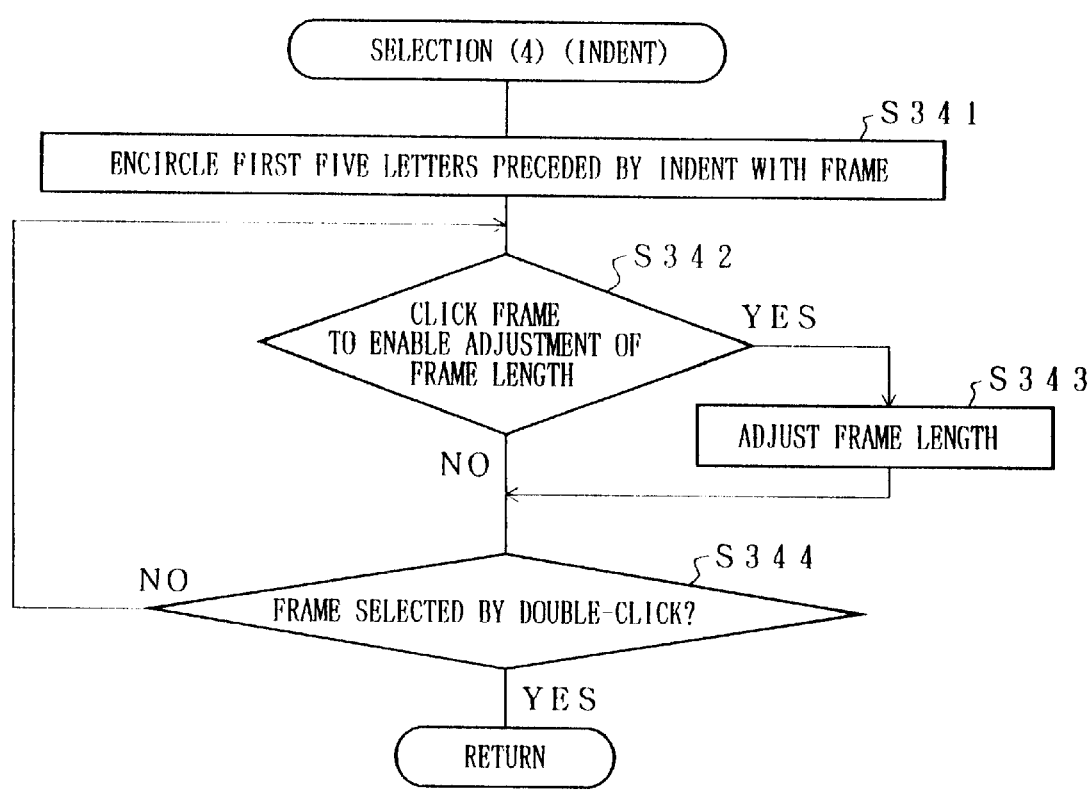
FIG. 45 is a flow chart showing specification procedures to designate an indent in the aforementioned selection menu.

Now, referring to FIG. 45, the following description will explain a further embodiment of the above-mentioned specification of a designation item: namely, a single indent. First, from the pull-up selection menu 47 showing designation items, "Indent" is selected (see FIG. 41(*b*)) with the pen 41. As "Indent" is selected, the indented portions in the original document image of the original document, for example, five characters preceded by an indent, are displayed while being encircled by frames (S341).

Thereafter, a desired frame is clicked with the pen 41 (S342). As a result, the length of the frame becomes adjustable, allowing the user to adjust the length of the frame with the pen 41 so that the character row is identifiable as a title (S343). After the completion of the adjustment, the adjusted frame is selected by double-clicking it with the pen 41 (S344).

If the selected area differs from what the user desires, the frame is canceled by clicking outside the adjusted frame with the pen 41 to allow the user to specify the selection area again. After completing the specification of the designation item, as mentioned above, the designation item is pasted in the header section area of the cluster, and a display operation is executed.

In this manner, in present embodiment 19, by designating "Indent" with the pen 41 when the title characters are inputted during a text registration, indented character rows are read, and the user designates a desired title from the character rows, and the desired title is displayed in the header writing area of the cluster. Therefore, title designation is facilitated, and hence image file sorting is also facilitated.

Embodiment 20

Figure 46:
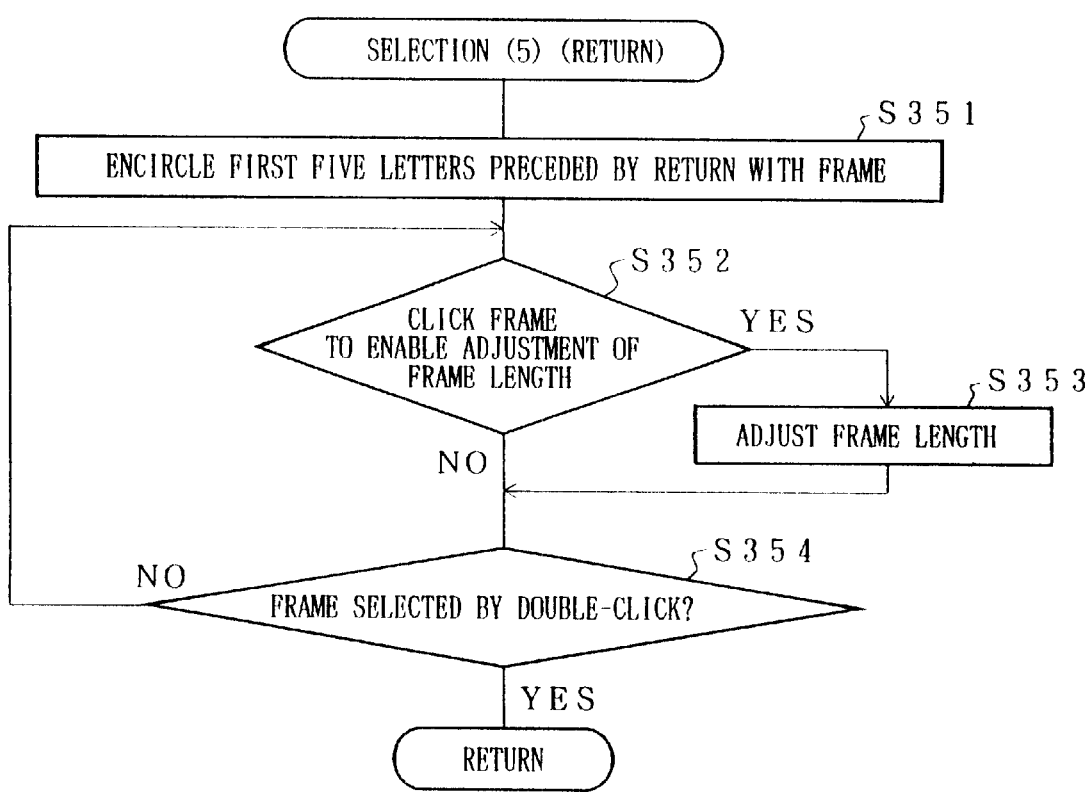
FIG. 46 is a flow chart showing specification procedures to designate a return in the aforementioned selection menu.

Now, referring to FIG. 46, the following description will explain a further embodiment of the above-mentioned specification of a designation item: namely, a single return. First, from the pull-up selection menu 47 showing designation items, "Return" is selected (see FIG. 41(*b*)) with the pen 41. As "Return" is selected, the returned portions in the original document image of the original document, for example, five characters preceded by a return, are displayed while being encircled by frames (S351).

Thereafter, a desired frame is clicked with the pen 41 (S352). As a result, the length of the frame becomes adjustable, allowing the user to adjust the length of the frame with the pen 41 so that the character row is identifiable as a title (S353). After the completion of the adjustment, the adjusted frame is selected by double-clicking it with the pen 41 (S354).

Here, if the selected area differs from what the user desires, the frame is canceled by clicking outside the adjusted frame with the pen 41, and the lines immediately following the returned portions, for example, first five characters in those lines, are displayed while being encircled by frames (S351) , to allow the user to specify the selected area again. After completing the specification of the designation item, as mentioned above, the designation item is pasted in the header section area of the cluster, and a display operation is executed.

In this manner, in present embodiment 20, by designating "Return" with the pen 41 when the title characters are inputted during a text registration, the lines immediately following the returned character lines are recalled, the user designates a desired title from the character rows, and the desired title is displayed in the header writing area of the cluster. Therefore, title designation is facilitated, and hence image file sorting is also facilitated.

Embodiment 21

Figure 47:
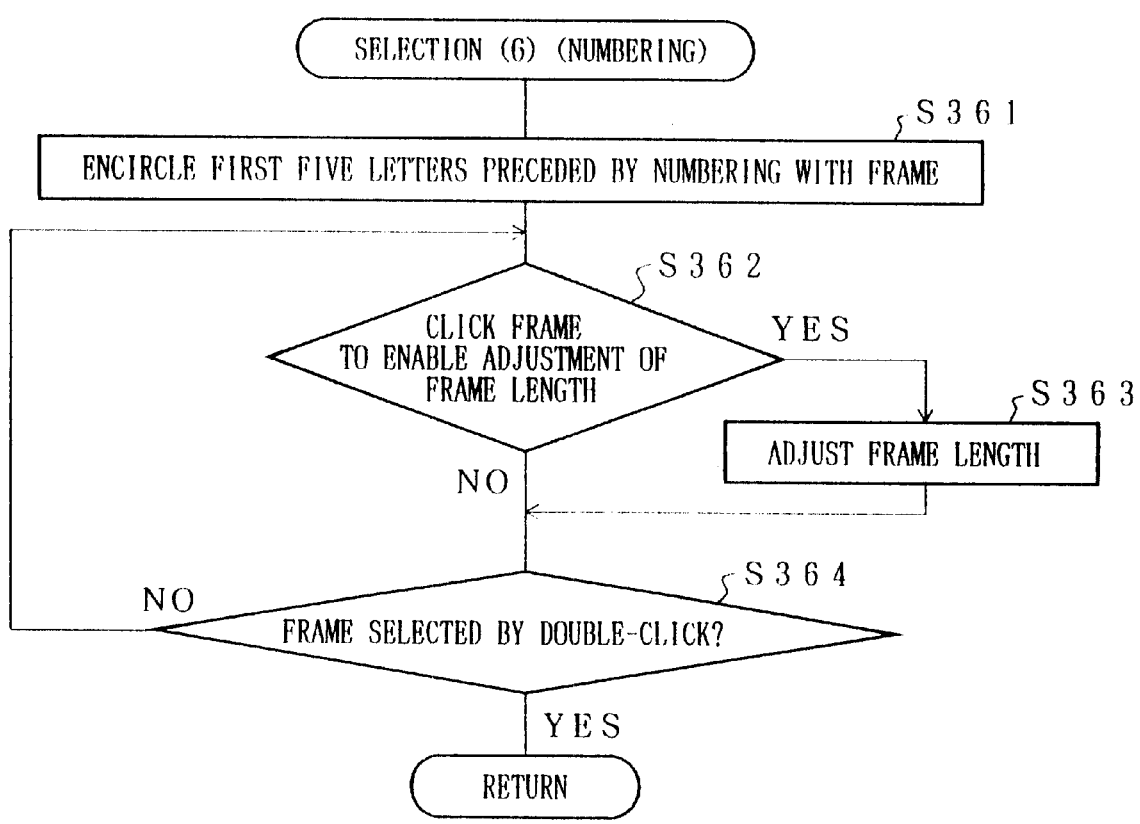
FIG. 47 is a flow chart showing specification procedures to designate a numbering in the aforementioned selection menu.

Now, referring to FIG. 47, the following description will explain another embodiment of the above-mentioned specification of a designation item: namely, numbering. First, from the pull-up selection menu 47 showing designation items, "Numbering" is selected (see FIG. 41(*b*)) with the pen 41. As "Numbering" is selected, the numbered portions in the text of the original document, for example, first five characters of the number portions, are displayed while being encircled by frames (S361).

Thereafter, a desired frame is clicked with the pen 41 (S362). As a result, the length of the frame becomes adjustable, allowing the user to adjust the length of the frame with the pen 41 so that the character row is identifiable as a title (S363). After the completion of the adjustment, the adjusted frame is selected by double-clicking it with the pen 41 (S364).

Here, if the selected area differs from what the user desires, the frame is canceled by clicking outside the adjusted frame with the pen 41, and the lines immediately following the numbered portions, for example, first five characters in those lines, are displayed while being encircled by frames (S361), to allow the user to specify the selected area again. After completing the specification of the designation item, as mentioned above, the designation item is pasted in the header section area of the cluster, and a display operation is executed.

In this manner, in present embodiment 21, by designating "Numbering" with the pen 41 when the title characters are inputted during a text registration, the character rows in the numbered lines are recalled, the user designates a desired title from the character rows, and the desired title is displayed in the header writing area of the cluster. Therefore, title designation is facilitated, and hence image file sorting is also facilitated.

Embodiment 22

Figure 48:
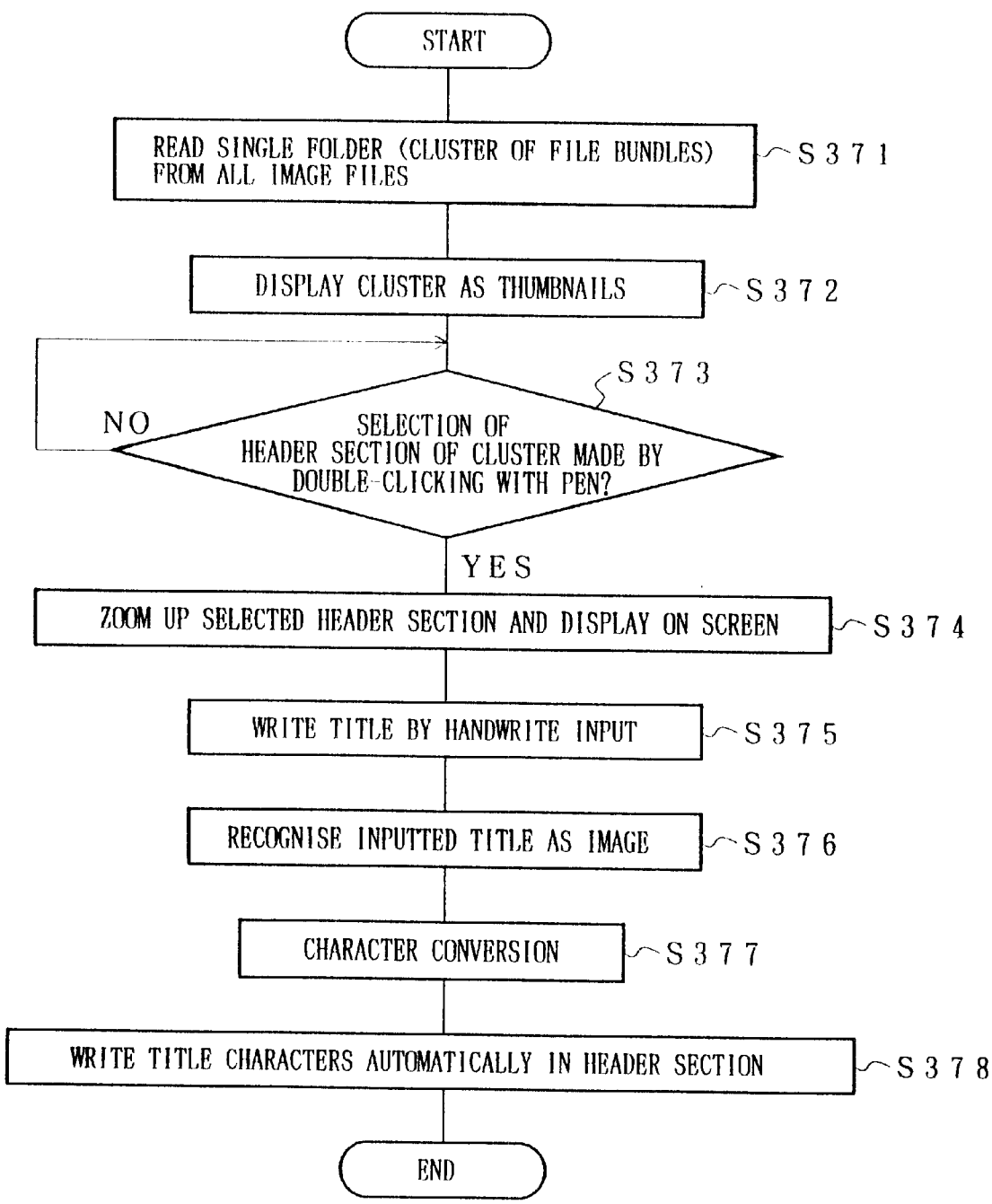
FIG. 48 is a flow chart showing specification procedures to allow the user to input a designation item in the aforementioned specification.

Next, referring to FIG. 48, the following description will explain in detail a still further embodiment of the above-mentioned specification of a designation item: namely, a user input by a single pen input, etc. First, from all the image files, a single folder (a cluster of file bundles) is read (S371). Subsequently, the set of rules to display the cluster in the form of a ring is read from the various parameter storage section 17, and the cluster is displayed in the form of a thumbnail ring (S372). A header section of the cluster is selected by double clicking with the pen 41 (S373).

Here, if the selected item differs from what the user desires, by clicking outside the header section, the selection is canceled, and the cluster is displayed in the form of thumbnails, allowing the user to specify the designation item again.

Thereafter, in a similar manner to the foregoing, from the pull-up selection menu 47 showing designation items, "Handwritten Input" is selected on the display screen (see FIG. 41(*b*)) with the pen 41. As "Handwritten Input" is selected, the header section area is zoomed up and displayed on the display screen (S374).

As the header section area is displayed, a title is inputted in the form of handwritten characters in the header section area using the pen 41 (S375). After the input title is identified as an image (S376), the title is converted into characters (S377), the title characters converted into characters is written in the header section to complete the specification of the designation item (S378). After completing the specification of the designation item, as mentioned above, the designation item is pasted in the header section area of the cluster, and a display operation is executed.

In this manner, in present embodiment 22, by handwriting characters with the pen 41 and thus designating a title when the title characters are inputted during a text registration, the user designates a desired title according to the handwritten input character rows, and the desired title is displayed in the header writing area of the cluster. Therefore, title designation is facilitated, and hence image file sorting is also facilitated.

Note that although in embodiment 22 above an example was taken where the user inputted the title as handwritten characters using the pen 41, it is also possible for the user to input title characters in the header section by using a keyboard or by inputting an image through an external scanner.

Embodiment 23

Figure 49:
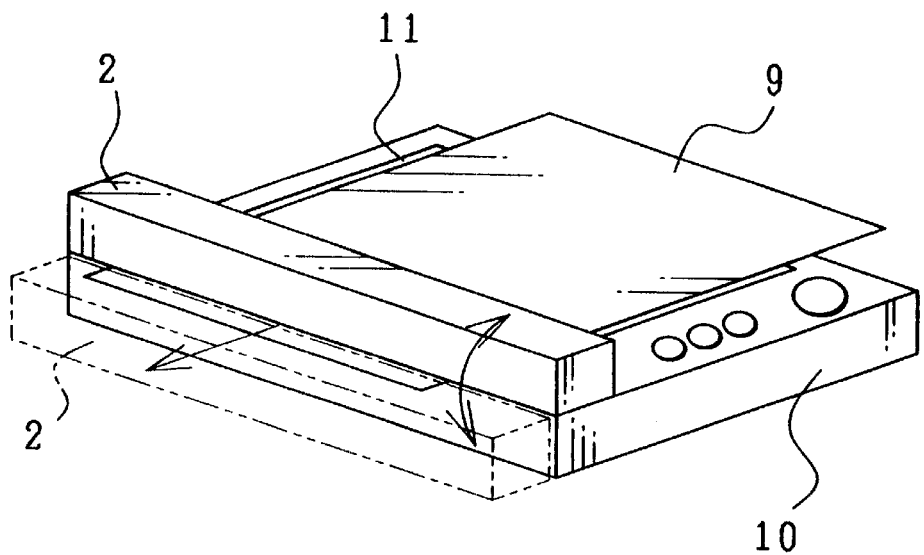
FIG. 49 is a perspective view showing the position of a hand scanner main body attached to another the information managing device in accordance with the present invention.

Now, referring to FIG. 49 to FIG. 53, the following description will explain a still further embodiment in accordance with the present invention. First, FIG. 49 shows, in an information-managing device in accordance with the present invention, a reading state of a sheet-like reflective original document.

Figure 50:
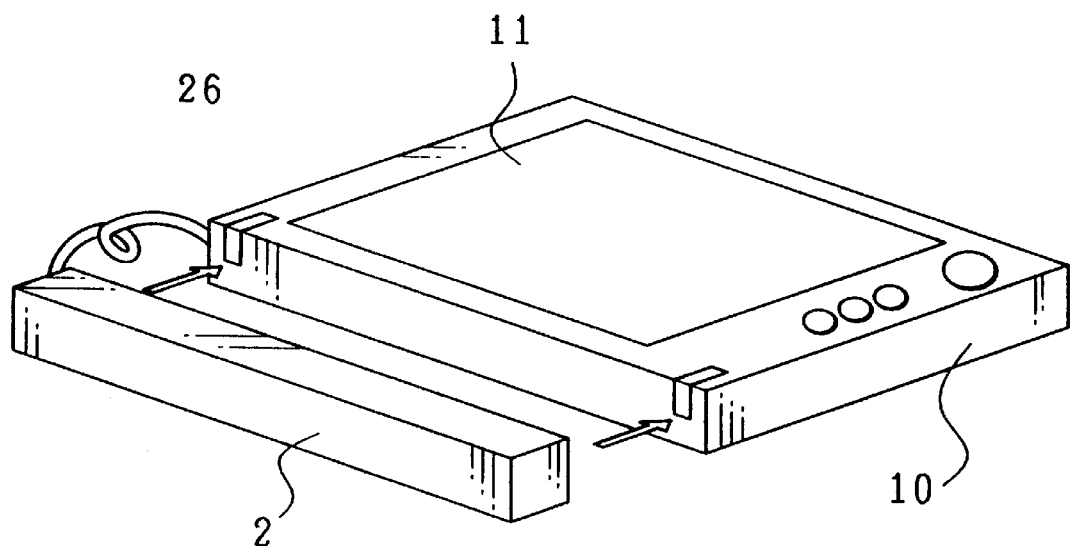
FIG. 50 is a perspective view showing the hand scanner main body attached to, and removed from, the aforementioned information managing device.

Typically, the hand scanner main body 2 shown in FIG. 2 as the first reader function section 2 is disposed parallel to the longer end of the device main body 10, and integrated thereto; however, when used to scan a document, the hand scanner main body 2 is connected to the device main body 10 by a connecting cable 26 that is pulled out of a corner housing the cable (see FIG. 50).

Figure 53:
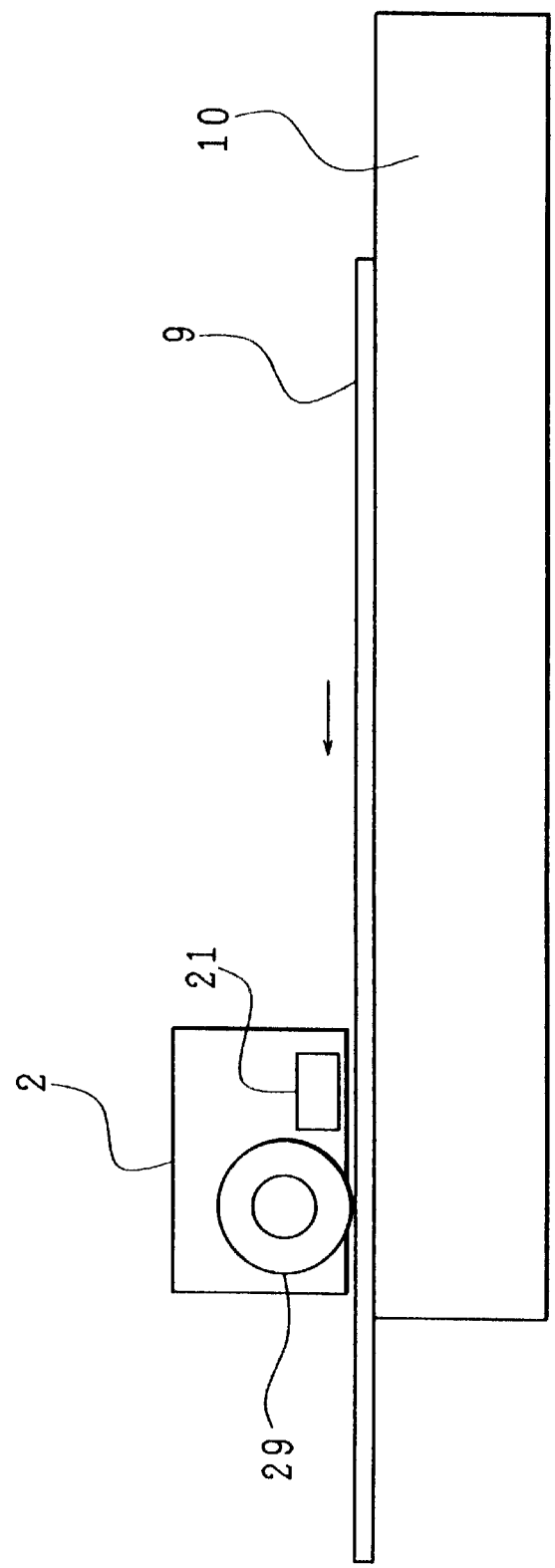
FIG. 53 is an explanatory drawing showing scanning of an original document taking place using the hand scanner main body attached to the aforementioned information managing device.

To scan a sheet-like original document 9, the hand scanner main body 2 is removed from the device main body 10, moved to a side of the top surface of the device main body 10 having the LCD 11 that forms the upper part of the longer end of the device main body 10, and disposed so that the light receiving surface of the CCD 21 of the hand scanner main body 2 faces the top surface of the device main body 10 (see FIG. 53).

Next, the scanned sheet-like original document 9 is placed so that the front side thereof on which characters and symbols are drawn faces up, i.e., so that the front side opposes the display screen of the LCD 11. Consequently, as the original document 9 is inserted into the original document insertion slit 27 of the hand scanner main body 2, and the drive motor 22 of the hand scanner main body 2 starts rotating by pressing a scanning start button of the device main body 10, the scanning of the sheet-like original document 9 is started, the original document 9 is transported horizontally by a transport section 29 along the top surface of the device main body 10 acting as an original document guide, and the front surface of the original document 9, on which images and characters are drawn, is optically scanned by the CCD 21.

FIG. 50 shows the attaching and removing of the hand scanner main body 2 to and from the device main body 10. Typically, the hand scanner main body 2 is disposed parallel to the longer end of the device main body 10; however, when used to scan a document, the connecting cable 26 is pulled out of a corner housing the cable, and the hand scanner main body 2 is disposed on the top surface of the device main body 10.

Furthermore, to scan a non sheet-like original document such as a book or a part of a larger-than-A4-sized original document such as a newspaper using the hand scanner main body 2, the hand scanner main body 2 is removed from the device main body 10, placed on the original document surface to be scanned. As the scanning start button provided to the scanner main body 2 is turned on, and the hand scanner main body 2 is moved along the front side of the original document, on which characters and symbols are drawn, to scan the aforementioned image. The scanned data is transmitted via the connecting cable 26 to the device main body 10 to be stored therein. Power is supplied to the hand scanner main body 2 via the connecting cable 26 from the device main body 10.

Figure 51:
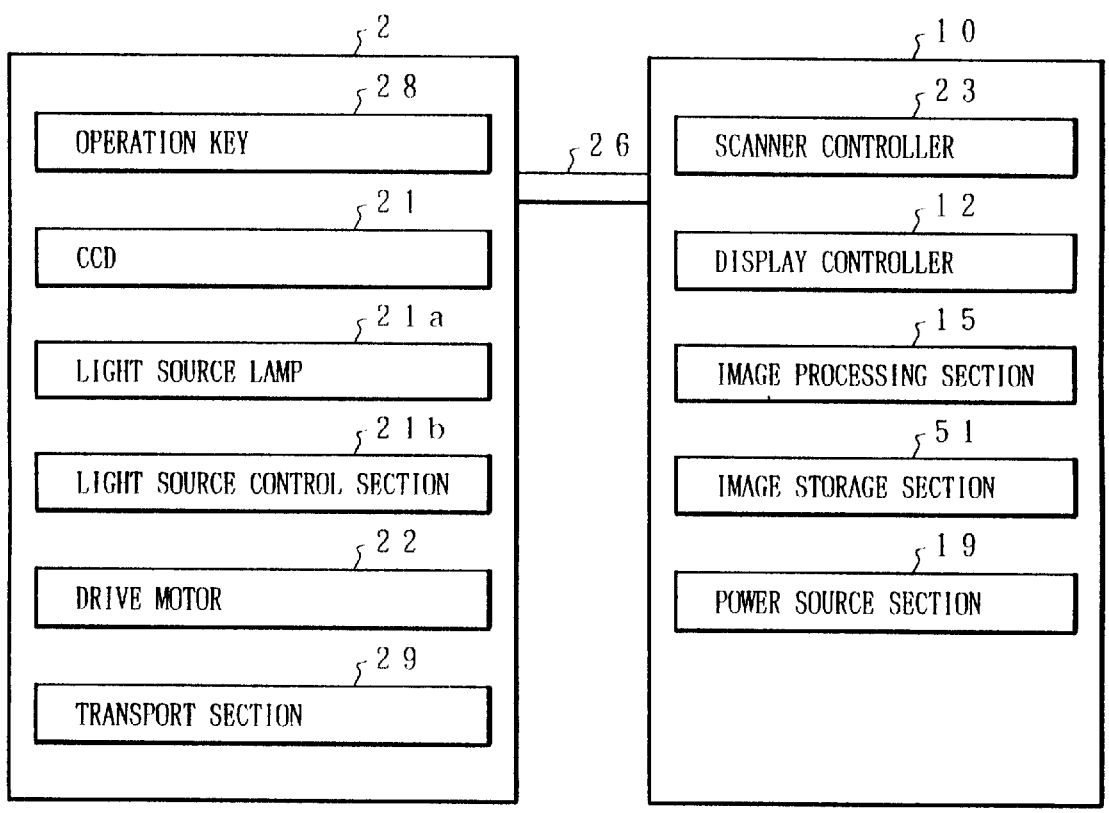
FIG. 51 is a block diagram showing an arrangement of the hand scanner main body and the device main body of the aforementioned information managing device.
Figure 52:
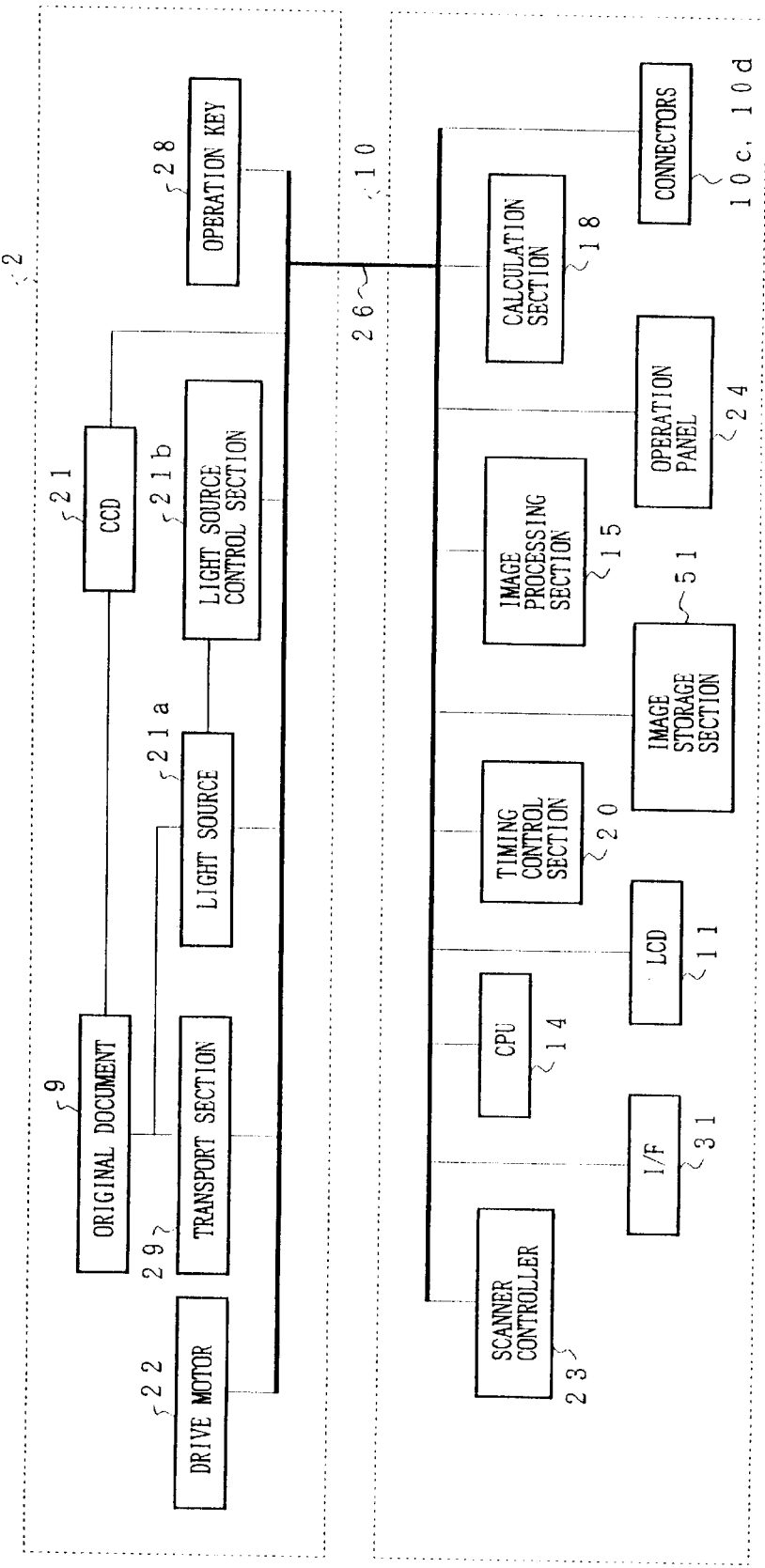
FIG. 52 is a block diagram showing further in detail the arrangement of the hand scanner main body and the device main body of the aforementioned information managing device.

FIG. 51 and FIG. 52 show a hand scanner function of the information managing device. The hand scanner main body 2 is structured of an operation key 28 for giving a command to start scanning operations, a CCD 21, a light source 21*a* such as an LED, a light source control section 21*b*, the drive motor 22, and the transport section 29 for transporting the original document 9.

Meanwhile, the device main body 10 is structured of a scanner controller 23, a display controller 12, an image processing section 15, an image storage section 51, and a power source 19; the hand scanner main body 2 and the device main body 10 are connected to each other via the connecting cable 26 and operate as a scanner for optically scanning an original document, etc.

FIG. 52 shows a scanner function of a scanner device of the information managing device in accordance with the present invention. The hand scanner main body 2 includes a drive motor 22 and a transport section 29 for transporting the original document 9, a light source 21*a* for optically scanning the original document 9, a CCD 21 acting as a contact image sensor, a light source control section 21*b* provided to the CCD 21, and an operation key 28 for starting scanning.

The device main body 10, furthermore, is provided with a CPU 14, a timing control section 20 for performing scanning operations, an image processing section 15 for processing scanned image data, a scanner controller 23 having a conversion section for A/D converting optically scanned data, an I/F 31 for transmitting data to and from an external device such as a personal computer, an LCD 11 for displaying scanned data, and an image storage section 51 for storing scanned data.

The device main body 10, furthermore, incorporates an operation panel 24 for manipulating scanning operations, and the first and the second connecters 32 and 33 for offering a cable connection between the device main body 10 and a below-mentioned relay (not shown) when the device main body 10 incorporating the hand scanner main body 2 is erected in the relay and used as an external storage device and a scanner.

By installing the hand scanner main body 2 along with the device main body 10 having such electronic filing functions, the device main body 10 is given an integrated function, and can easily process information input that is essential, especially, to a portable electronic filing device.

Moreover, the hand scanner main body 2, being readily attached and removed, enables information to be easily scanned from a wider variety of original documents 9. FIG. 53 shows an original document transport and scanning mechanism when the original document 9 is being scanned using the scanner function of the information managing device.

Embodiment 24

Figure 54:
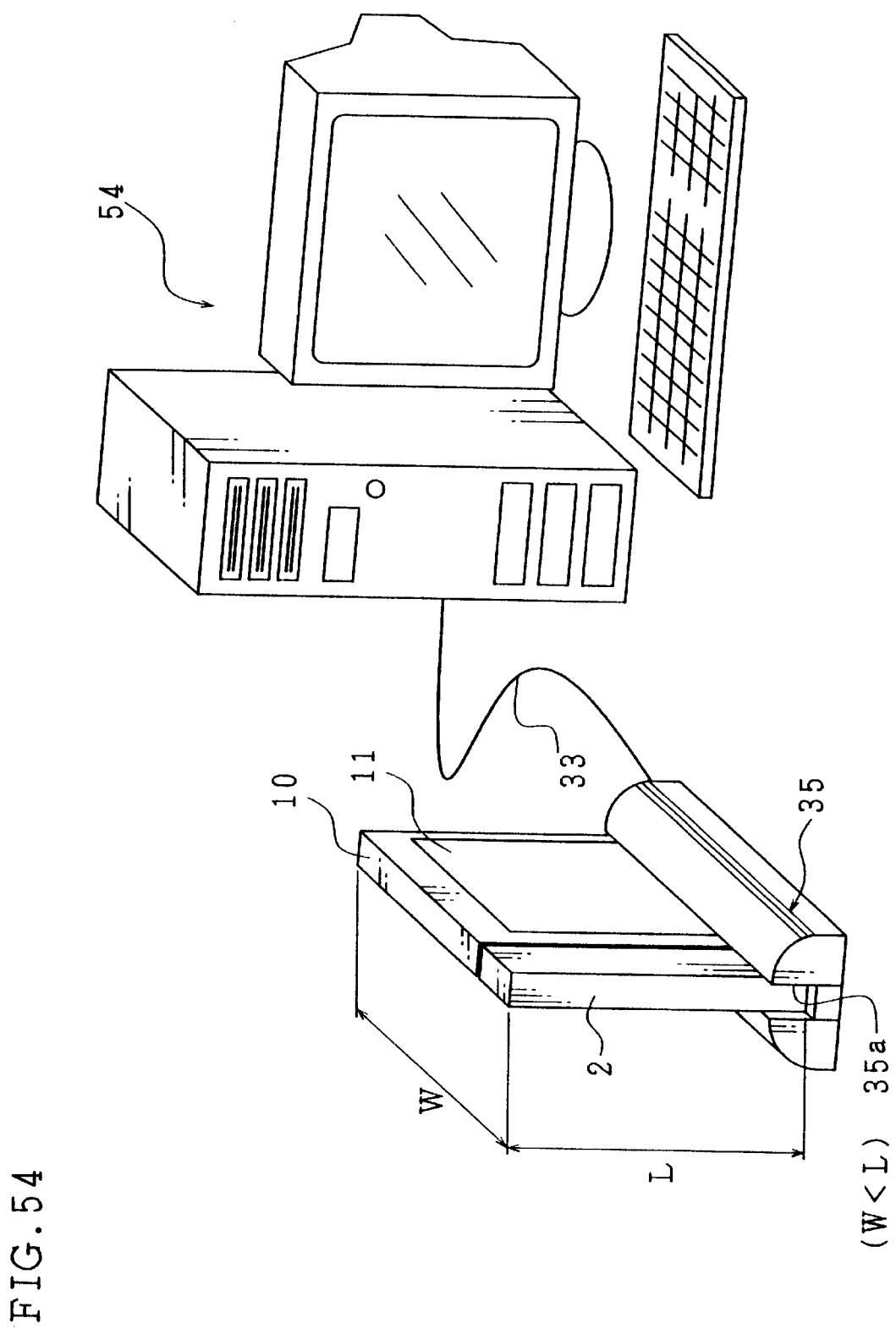
FIG. 54 is an explanatory drawing showing connection of the aforementioned information managing device used as an external storage of external information equipment for personal computers.
Figure 55:
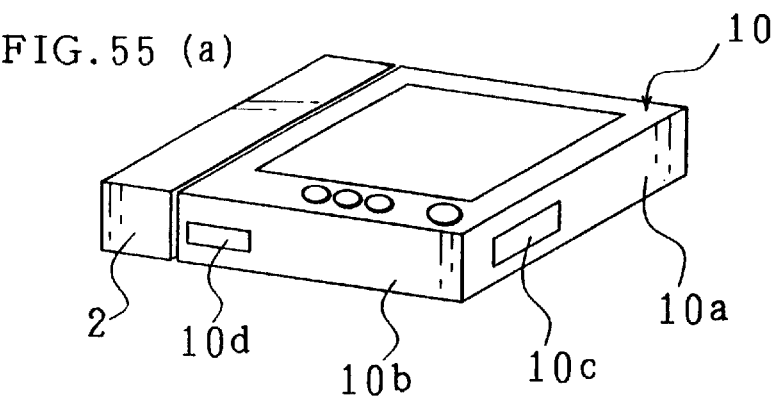
FIG. 55(a) is a perspective explanatory view showing locations of connectors for connecting the aforementioned information managing device used as an external storage or an external scanner.
FIG. 55(b) is a perspective view showing connection of the aforementioned information managing device used as an external storage.
FIG. 55(c) is a perspective view showing connection of the aforementioned information managing device used as an external scanner.
Figure 55:
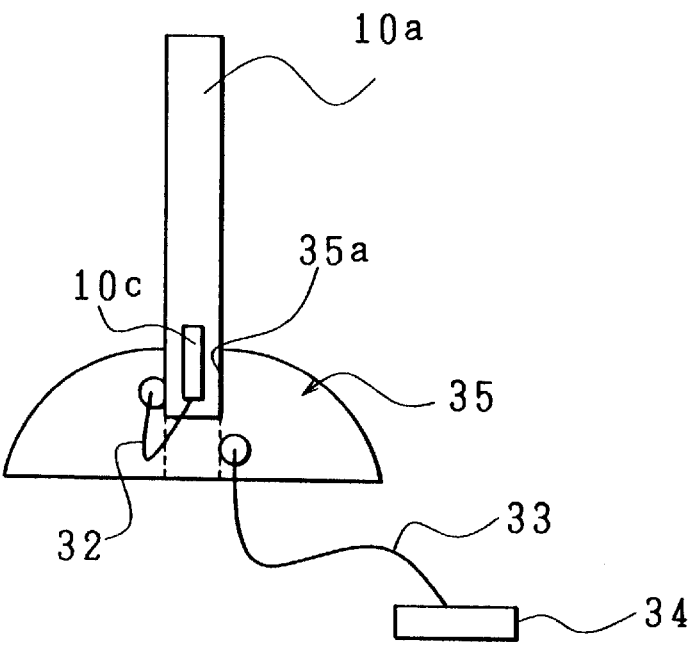
Figure 55:
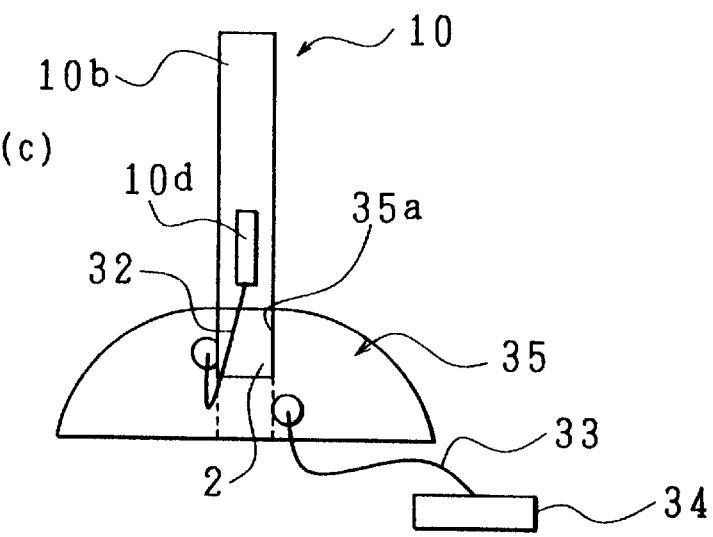

Referring to FIG. 54 and FIG. 55, the following description will explain a still further embodiment in accordance with the present invention. In the present embodiment, as shown in FIG. 54 and FIG. 55, an information managing device can be used as a hard disk, that is an external storage device of a personal computer 54.

Therefore, in the present embodiment, a relay 35 is provided to facilitate connection between the information managing device and external devices such as the personal computer 54. The relay 35 is provided with a groove-shaped cradle section 35a that extends along the centre of the relay 35 and opens upwards. The cradle section 35a is for holding the device main body 10 and the hand scanner main body 2 attached thereto in upright positions. Moreover, the cradle section 35a can be switched between its later-mentioned external scanner function and external storage device function according to whether the cradle function 35a is attached to a longer end 10a or a shorter end 1ob of the device main body 10. Therefore, the groove of the cradle section 35a have inner surfaces parallel to each other, and the inner surfaces are fabricated so as to sandwich the device main body 10 and the hand scanner main body 2 integrated thereto in a direction of the thickness thereof.

Typically, the information managing device is used alone. However, when used as an external hard disk that is a peripheral device of a personal computer, the information managing device can be used as an external storage device of a personal computer 54 and the like by inserting it in an upright position in the cradle section 35a formed along the separately provided relay 35 with the shorter end 1ob of the device main body 10 facing down (see FIG. 55(b)).

When the information managing device is used as an external storage device, first, the device main body 10 and the hand scanner main body 2 attached thereto are inserted in their upright positions in the cradle section 35a. Subsequently, the relay 35 is connected to the connecter 10c of the device main body 10 via the aforementioned connecting cable 32 that is pulled out of the relay 35, and the relay 35 is connected to the personal computer 54 via a cable, specifically, via the connecting cable 33.

As a result, with the information managing device, store areas in the information managing device, for example, in the image storage section 51 and the thumbnail storage section 52, can be used as storage areas of an external hard disk.

In the present invention, the information managing device can be used as an external hard disk that is a peripheral device of the personal computer 54, and thereby eliminates the need for a dedicated external hard disk. Moreover, since the device main body 10 can be held in its upright position by the relay 35, the information managing device requires less installation space (space on a work desk) for the device main body 10.

Embodiment 25

Figure 56:
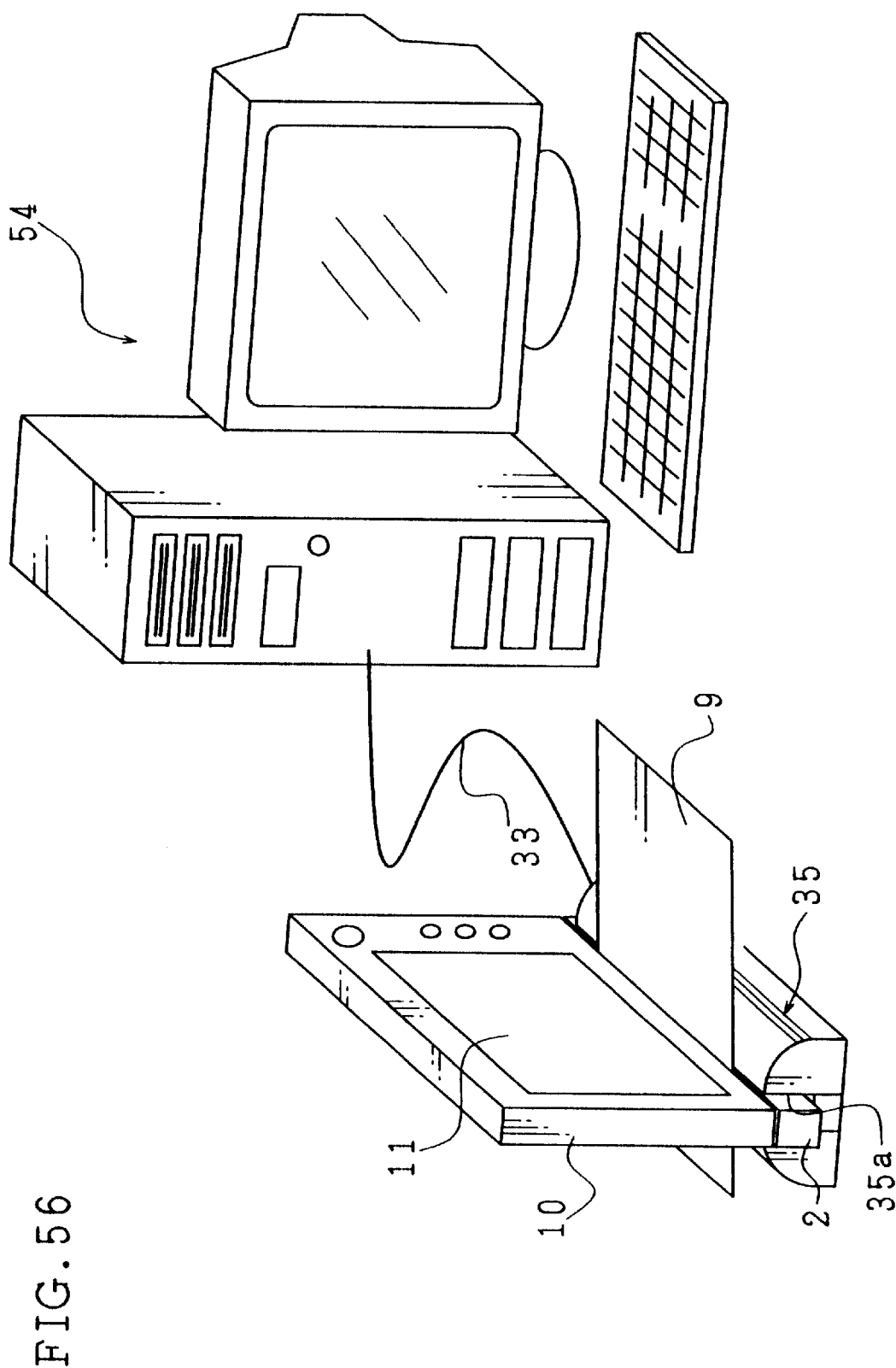
FIG. 56 is an explanatory drawing showing the aforementioned information managing device used as an external scanner of external information equipment for personal computers.
Figure 57:
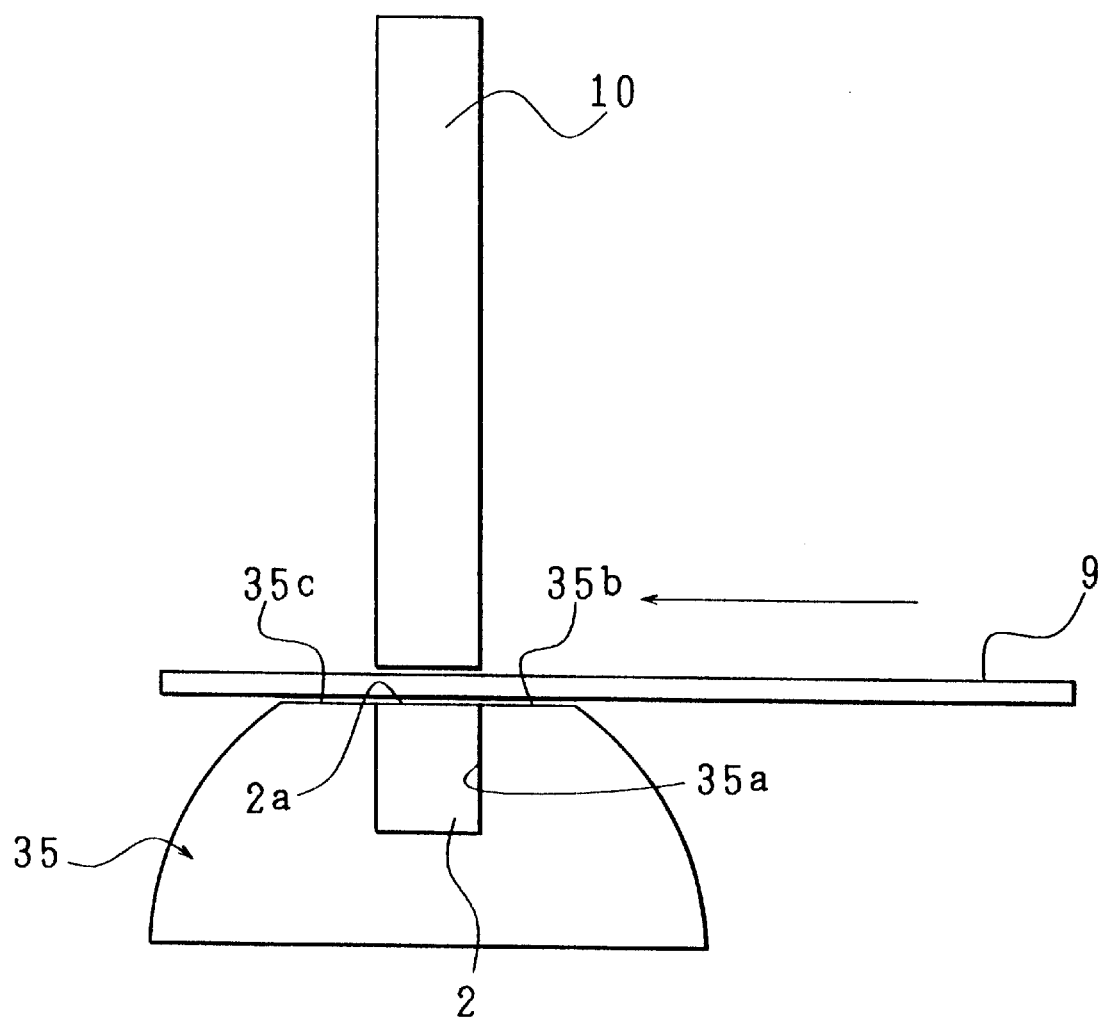
FIG. 57 is an explanatory drawing showing a sheet guide section of a relay when the aforementioned information managing device is used as a scanner.

In the present embodiment, referring to FIG. 55 to FIG. 57, the following description will explain the information managing device being used as an external scanner acting as an external input device for the personal computer 54, etc.

First, as shown in FIG. 55(c) and FIG. 56, the device main body 10 and the hand scanner main body 2 attached thereto are inserted in the cradle section 35a and erected in their upright positions in the relay 35, in a manner such that the hand scanner main body 2 slides into the cradle section 35a with the longer end of the hand scanner main body 2 facing down. Here, the shape of the groove of the cradle section 35a is specified so that the scanning surface of the hand scanner main body 2 and the top opening of the cradle section 35a form a substantially flush plane.

Next, the relay 35 is connected to the connecter 10d of the device main body 10 by the connecting cable 32 that is pulled out of the relay 35. Furthermore, by connecting the relay 35 to the personal computer 54 via the connecting cable 33, the information managing device can be used as an external scanner having an input function.

Responding to a command to place the original document 9 in position fed from the personal computer 54, or a command to place the original document 9 in position made through a key operation on the device main body 10, the scanned original document 9 is moved along the original document guide formed by the top of the relay 35 and the hand scanner main body 2, and inserted into an original document insertion opening of the hand scanner main body 2, with the front side of the document on which characters and symbols are drawn facing down. Subsequently, responding to a scanning command sent from the personal computer 54, or a scanning starting command made through a key operation on the device main body 10, optical scanning of the original document 9 is started, the original document 9 is transported, and the entire information on the front side of the original document 9 is scanned.

In this manner, in the information managing device, by providing the relay 35, the scanner function of the information managing device can be used as an scanner that is a peripheral device of the personal computer 54, and the personal computer 54 becomes no longer needs a dedicated scanner. Moreover, since the device main body 10 to which the hand scanner main body 2 is integrated is provided in its upright position, the information managing device requires less installation space (space on a work desk) for the device main body 10.

Embodiment 26

In the present embodiment, referring to FIG. 57, an explanation will be given on a structure of the relay 35 that enables stable transport of the original document 9 when the information managing device is used as an external scanner. Specifically, when the device main body 10 to which the hand scanner main body 2 is integrated is attached so that the aforementioned hand scanner main body 2 is inserted in the cradle section 35a, an input side guide surface 35b and an output side guide surface 35c are formed on the top surface of the relay 35 so as to form a substantially flush plane with the scanning surface 2a of the hand scanner main body 2.

As a result, when the device main body 10 is attached in its upright position to the relay 35 and used as an external scanner of the personal computer 54, the original document 9 is inserted into the original document insertion opening of the hand scanner main body 2, and the original document 9 is transported, as well as scanned, by the hand scanner main body 2, since the input side guide surface 35b and output side guide surface 35c are provided so as to form a substantially flush plane with the scanning surface 2a, the aforementioned original document 9 can be transported in a stable manner. Such a simple configuration of the input side guide surface 35b and the output side guide surface 35c can improve the scanner function of the information managing device easily and at low costs.

Embodiment 27

In the present embodiment, as mentioned above, the CPU 14 that is thumbnail display means is specified to arrange the images of the cluster of file bundles that is an at-a-glance view of thumbnail files so as to partially overlap each other in the form of a three-dimensional ring, for example, as shown in FIG. 58(a). Furthermore, in order to easily distinguish between the file bundles corresponding to mutually different kinds of image files on the display screen, the CPU 14 can provide the images of the aforementioned file bundles with display portions 7b that are markings to distinguish those differences, for example, as shown in FIG. 58(b).

The cluster of file bundles (or folder group) arranged in the form of a ring is rotated at a constant rate on the display screen, and when a desired file bundle comes in the foreground, the contents of that file bundle can be identified to some extent by scanning characters and logos drawn on the front page of the file bundle in the foreground.

However, the information obtained from the aforementioned file bundle displayed in the foreground in the form of a ring is only part of the information of the file bundle, and needless to say, it is impossible in some cases to know for sure if that file bundle is the desired file bundle. In such a case, the user can know for sure whether or not that file bundle is the desired file bundle by reading the logo of the aforementioned file bundle displayed in the foreground in the form of a ring, thereby making a guess about the desired file bundle to some extent, opening the file bundle, hence recalling the image file corresponding to the file bundle, and confirming the contents.

Here, if the opened file bundle is not the desired file bundle, the user closes the file bundle, and opens another file bundle. With the information managing device of present embodiment 27, file bundles that have been opened once (already-read files) are distinguished from those that have not read yet (yet-to-be read files) to allow the user to see and easily identify the file bundles that are yet to be read.

For these purposes, as shown in FIG. 58(b), the information managing device can provide the already-read file with a display portion 7b such as a marking, for example, on the top right corner of, for example, the file bundle. Note that if the marking colour is only switched between black and white, only two kinds of files, such as already-read files and yet-to-be-read files, can be distinguished; however, if the markings are displayed in colour or as logos, more kinds of files can be distinguished, allowing the user to hierarchically distinguishing the files according to the number of times that the files have been opened, the priorities of the files, etc.

Moreover, in an information processing device and the like, in many cases, there are stored files that must be worked on within certain timeframes, or must be reviewed every predetermined period of time. Therefore, by designating a desired date and time to the aforementioned file bundle displayed in the form of a ring, that file bundle is displayed in the foreground at the designated date and time, or can be otherwise distinguished from the other file bundles on the display screen, for example, by using the aforementioned display portion 7b. As a result, with the aforementioned information managing device, the user can more surely work on the file bundle to which a timeframe is designated.

Embodiment 28

Present embodiment 28 in accordance with the present invention has a function to automatically sort files by designation items and to display them in the form of rings. Incidentally, when there are a large number of image files to be managed, and a whole cluster of file bundles corresponding to the image files needs to be displayed, it will be a troublesome task for the user to find out the image file via a desire file bundle.

To avoid such a situation, the aforementioned file bundles are grouped into a plurality of groups under predetermined conditions, for example, the number of times that the files were read, the dates and times of creation of the files, and other conditions, before being displayed.

Figure 59:
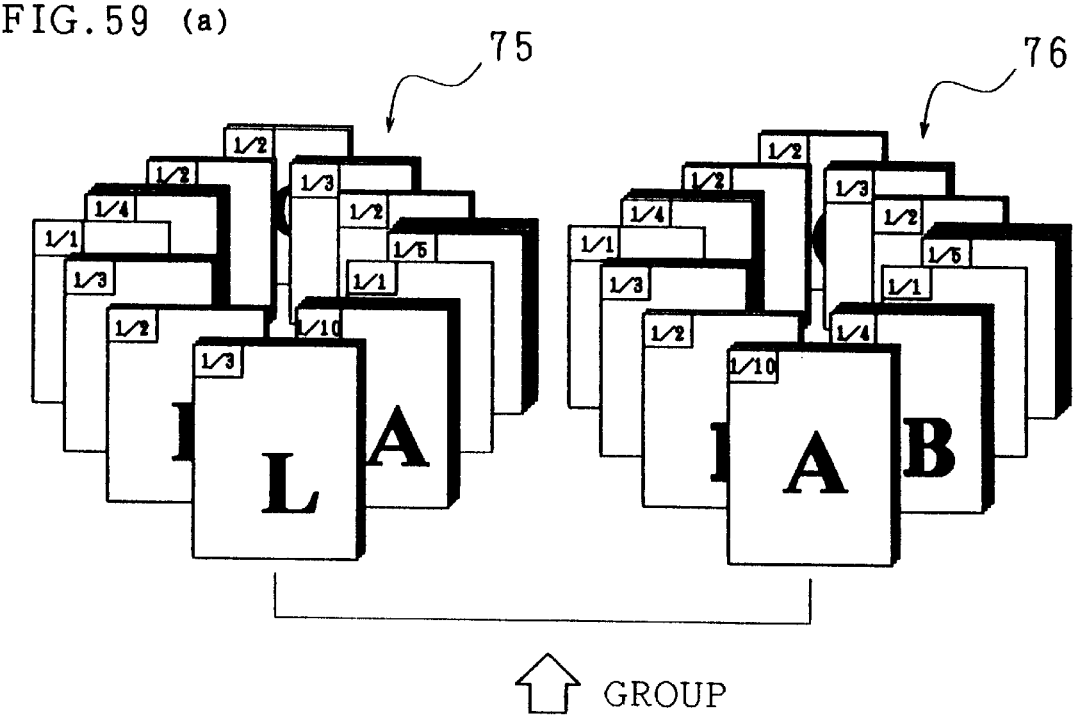
FIG. 59(a) and FIG. 59(b) are explanatory drawings showing the aforementioned cluster of file bundles grouped and synthesized according to the display portions.
Figure 59:
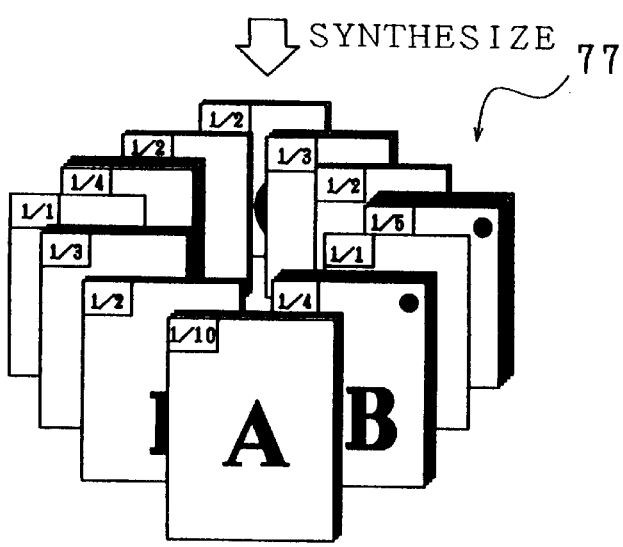

Here, for example, as shown in FIGS. 59(a) and 59(b), in a display state where the file bundles are grouped into a first ring-form display image 75 and a second ring-form display image 76 by the number of times that the files were read, if the user wants to find files that were created within a predetermined period of time, designating the period brings up those files having such a date and time of creation from the aforementioned first ring-form display image 75 and the second ring-form display image 76 and synthesizes a new third ring-form display image 77. In the other way round, the third ring-form display image 77 can be grouped, in response to a command, into the first ring-form display image 75 and the second ring-form display image 76 before being displayed.

Moreover, in many cases, among the image files managed by the information managing device, there are more than one image files that have substantially the same contents. In the above-mentioned synthesize process, if all of those similar image files are converted into image data and displayed as file bundles in the form of a ring, there is too much image data that needs to be displayed, making it difficult to search for a desired image file and causing other inconveniences.

Such inconveniences are avoidable by deleting unnecessary image data; for example, when there are more than one image files bearing the same name, but different dates and times of creation, only the image file bearing the newest date and time is added to the file bundle that is image data for the ring-form display, and the image files bearing older creation dates and times are removed from the ring-form display. However, only the image data for the ring-form display is deleted; the file as such is not deleted.

Figure 60:
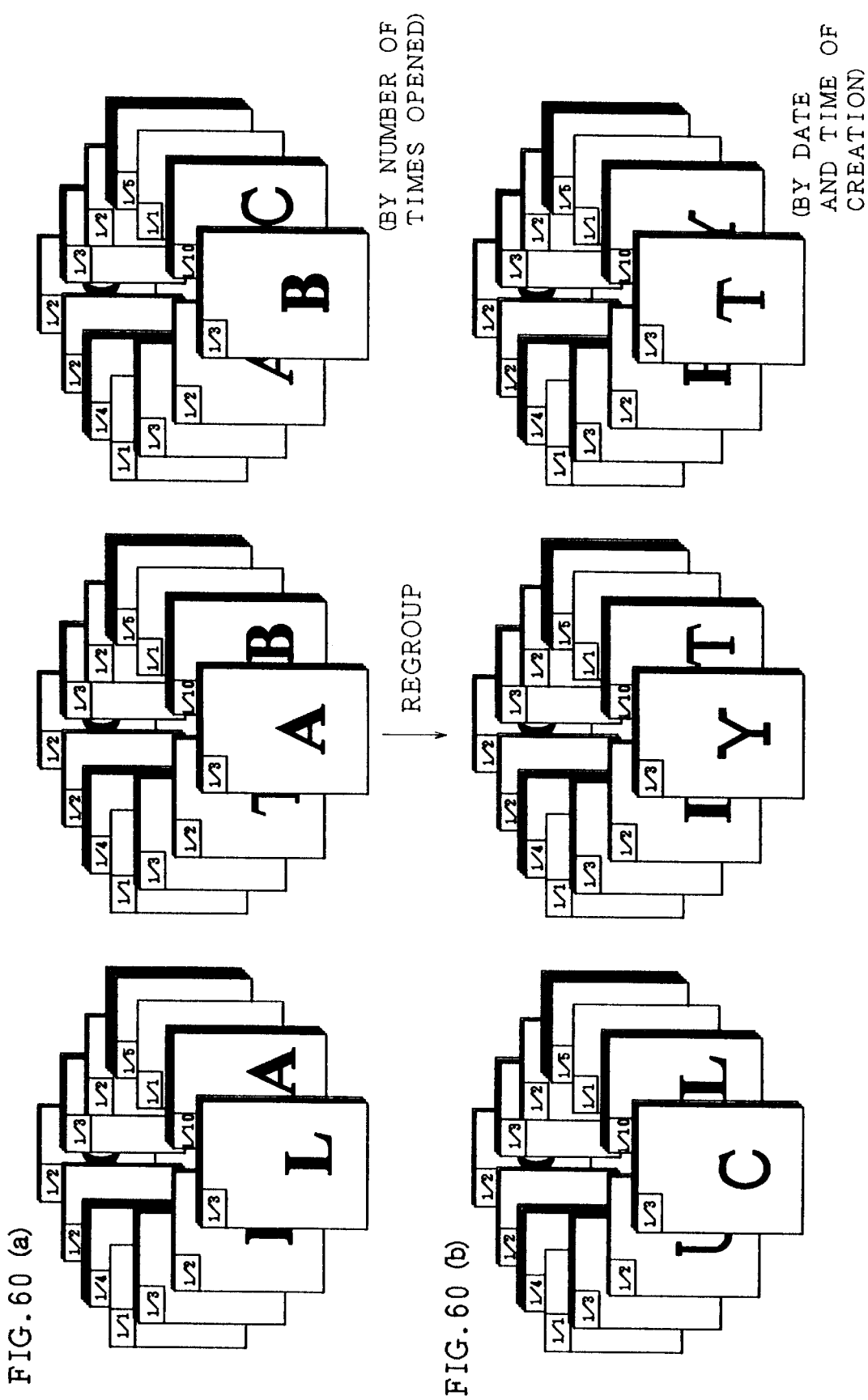
FIG. 60(a) and FIG. 60(b) are explanatory drawings showing the aforementioned information managing device displaying clusters of file bundles and switching the display of the clusters according to the number of times and date and time of creation.
Figure 61:
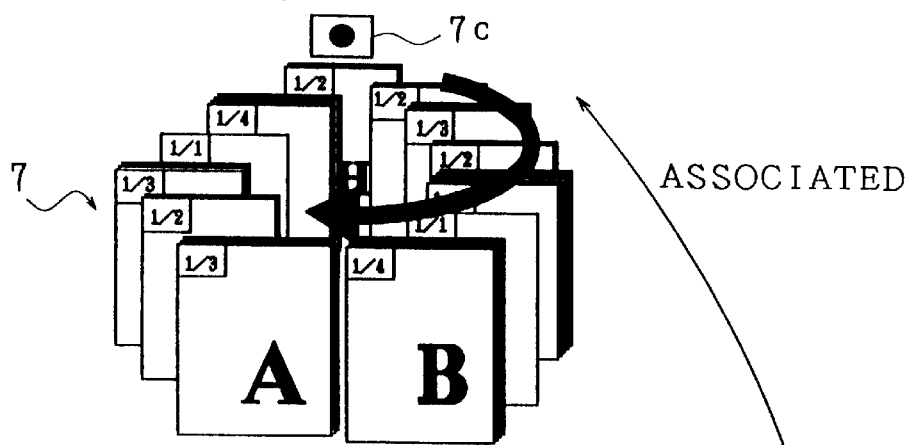
FIG. 61(a) to FIG. 61(e) are explanatory drawings showing association markings each provided above a cluster of file bundles on the display screen of the aforementioned information managing device.
Figure 61:
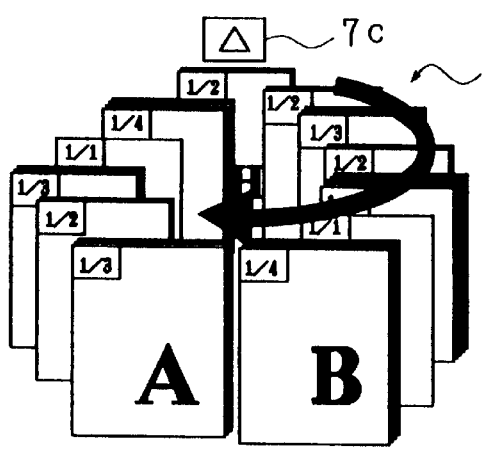
Figure 61:
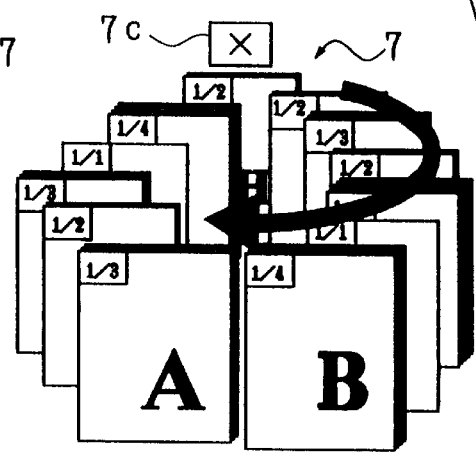
Figure 61:
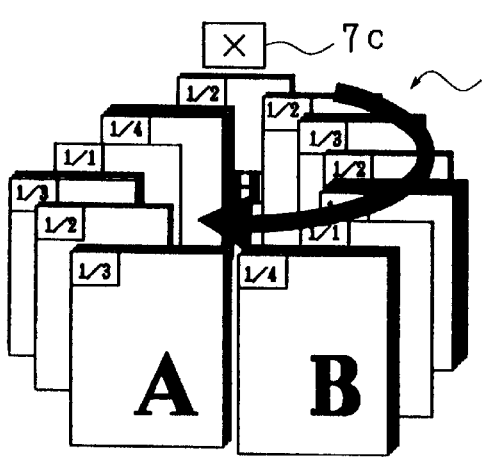
Figure 61:
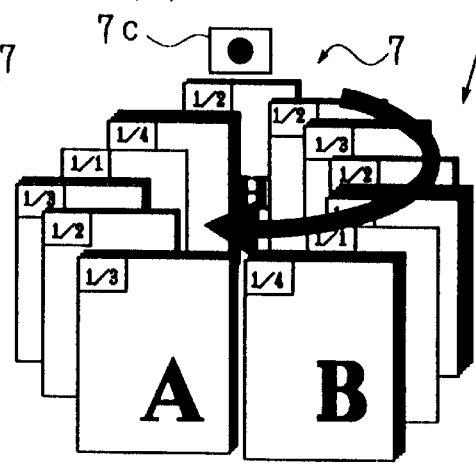

If such grouping and synthesizing of a ring-form display are executed at the same time, for example, as shown in FIGS. 60(a) and 60(b), the above-mentioned method enables the clusters of file bundles displayed in the form of rings by, for example, the number of times, to be grouped anew by date and time of creation in response to a designation made by the user through the operation panel 24.

Embodiment 29

In embodiment 29 in accordance with the present invention, as shown in FIG. 61(a) to FIG. 61(e), a plurality of ring-form displays are simultaneously displayed where association markings 7c representing references to, and differences from, other ring-form displays are displayed in the periphery of the ring-form display (note here that the plurality of ring-form displays are not necessarily grouped under any particular conditions, but each of the ring-form displays should be considered to represent a single folder).

Figure 62:
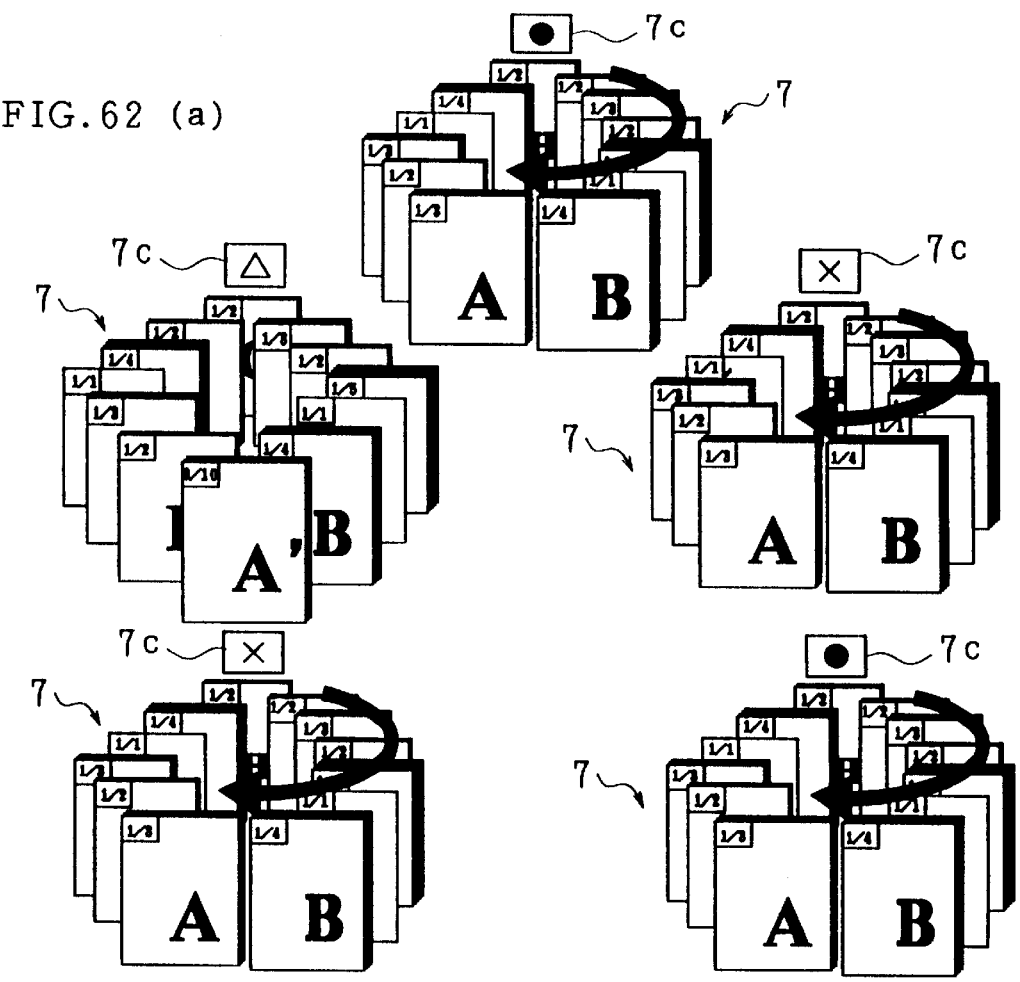
FIG. 62(a) and FIG. 62(b) are explanatory drawings showing selection of a cluster of file bundles from a plurality of clusters having aforementioned association markings according to the association markings.
Figure 62:
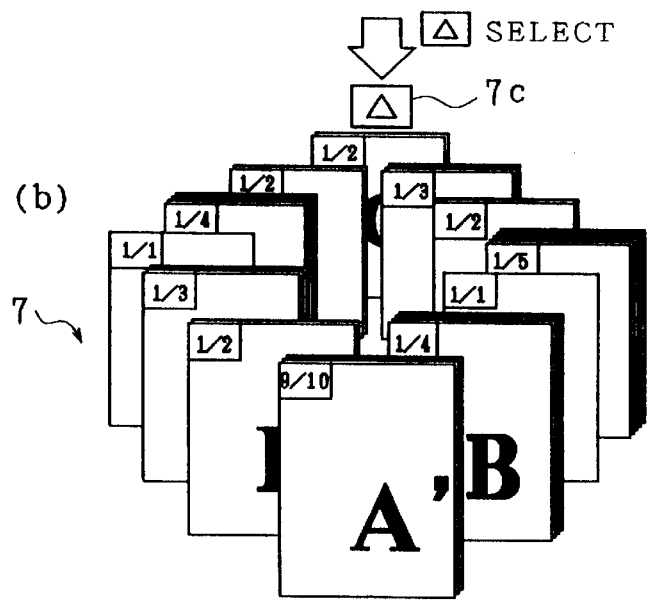
Figure 63:
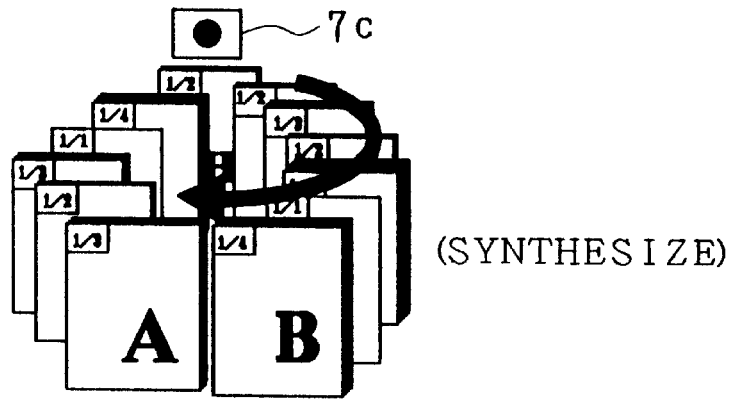
FIG. 63(a) and FIG. 63(b) are explanatory drawings showing a plurality of clusters of file bundles synthesize and grouped according to the aforementioned association markings.
Figure 63:
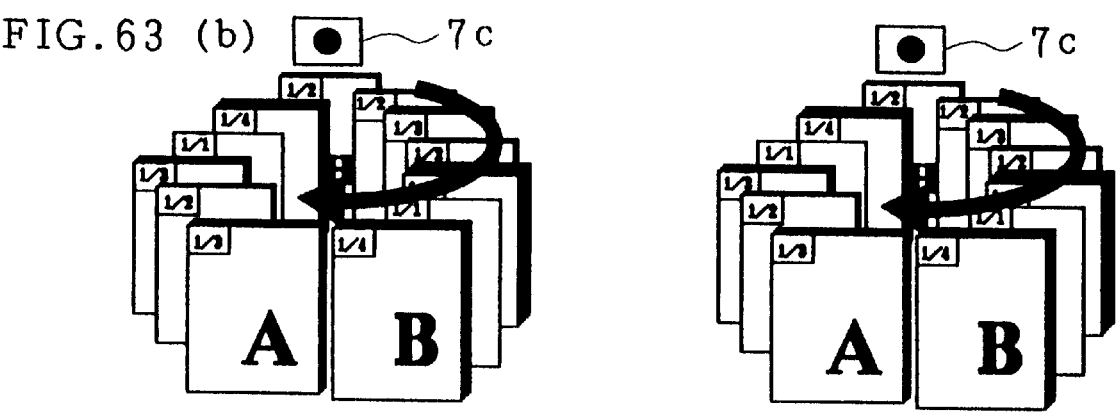

Moreover, if one of the association marking 7c is selected when a plurality of ring-form displays are simultaneously displayed in the above manner, according to the aforementioned method, all the ring-form display image data related with that association marking 7c can be synthesized into a single ring-form display and displayed as shown in FIGS. 62(a) and 62(b), or grouped and displayed, for example, as shown in FIGS. 63(a) and 63(b). Alternatively, other ring-form displays than those marked by the association markings 7c can be eliminated.

Figure 64:
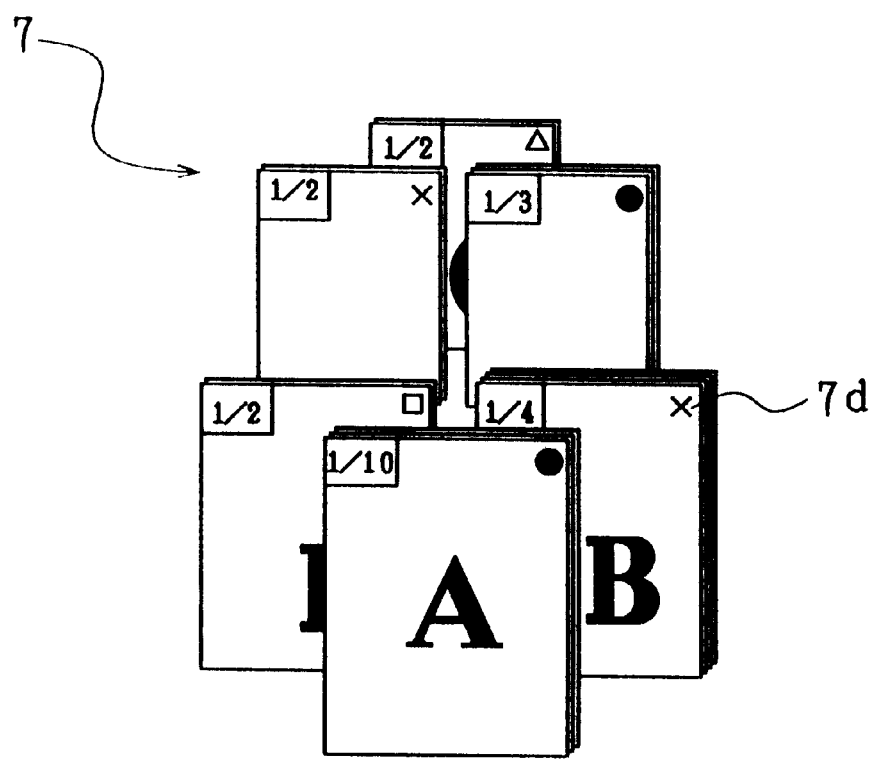
FIG. 64 is an explanatory drawing showing an example of the aforementioned association markings provided to the upper part of the display of the cluster of file bundles.

Note that an example was taken in the foregoing where the association marking 7c was displayed above the ring-form display; however, as shown in FIG. 64, an association marking 7d can be provided, for example, at the top right corner of the file bundle image.

Embodiment 30

In embodiment 30 in accordance with the present invention, as shown in FIGS. 65(a) and 65(b), the cluster of file bundles arranged and displayed in the form of a ring are rotated at a constant rate on the display screen. The CPU 14 detects whether or not the specified position in rotation of the file bundle designated according to a desired designation of, for example, the aforementioned association marking 7c, title characters, or header, is the foreground, i.e., the front row (aforementioned position a), and the cluster of file bundles temporarily stops its rotational movement when the aforementioned file bundle moves into the foreground, allowing the user to easily see and identify the contents.

Embodiment 31

Figure 66:
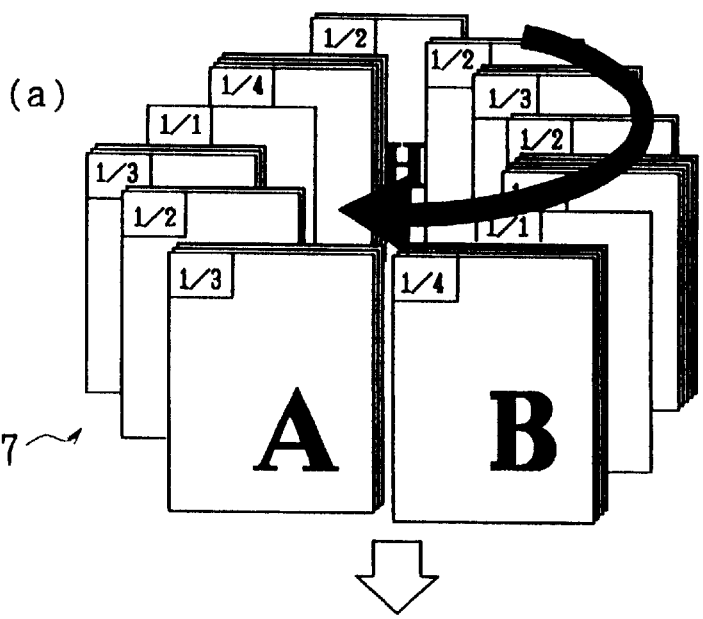
FIG. 66(a) to FIG. 66(c) are explanatory drawings showing the aforementioned information managing device storing and displaying file bundles deleted from the displayed cluster of file bundles according to the search time and other criteria.
Figure 66:
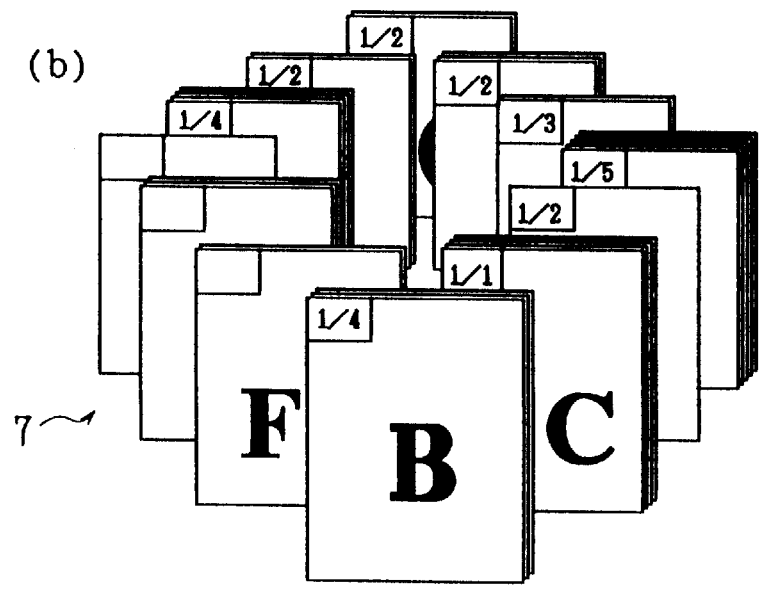
Figure 66:
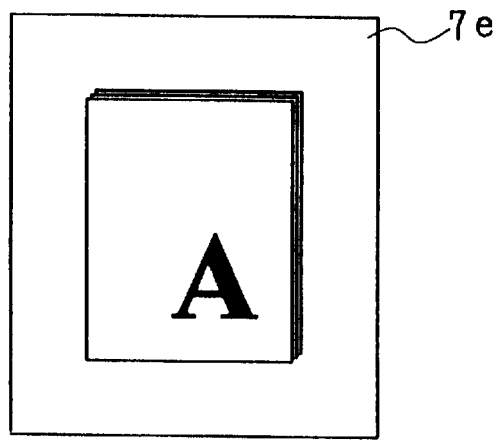

In embodiment 31 in accordance with the present invention, for example, as shown in FIG. 66(a), if the file bundle A has ever been searched for (in other words, if the file bundle A has been ever opened and the contents have been identified), the file bundle A is removed from the thumbnail file image 7 of the file bundles displayed in the form of a ring (hereinafter, will be referred to as the cluster of file bundles 7) as shown in FIG. 66(b), and displayed in a searched file display area 7e as shown in FIG. 66(c), by applying similar specifications as to the positions of the file bundles to those used in the foregoing to display the cluster of file bundles in the form of a ring. The aforementioned searched file display area 7e is specified so as to be displayed in the same screen as the aforementioned cluster of file bundles 7 displayed in the form of a ring.

In this manner, in the present embodiment, every time a new file bundle is searched, the file bundle is moved to the searched file display area 7e, and the remaining cluster of file bundles 7 are displayed in the form of a ring. Therefore, the number of file bundles in the cluster 7 displayed in the form of a ring is reduced. This results in enhanced user visual identification of the cluster of file bundles 7 displayed in the form of a ring and improved user search efficiency.

Moreover, in the present embodiment, the user can return any of the file bundles in the searched file display area 7e to the cluster of file bundles 7 displayed in the form of a ring by thus designating with the pen 41 and the like.

Embodiment 32

In embodiment 32 in accordance with the present invention, as a plurality of file bundles are removed from the cluster of file bundles 7 displayed in the form of a ring as shown in FIG. 67(a), and moved into the searched file display area 7e as shown in FIG. 67(b), the removed and then moved plurality of file bundles are displayed in the aforementioned searched file display area 7e in the form of a ring. The aforementioned clusters of file bundles are specified to be placed vertically adjacent to each other on the display screen.

Figure 68:
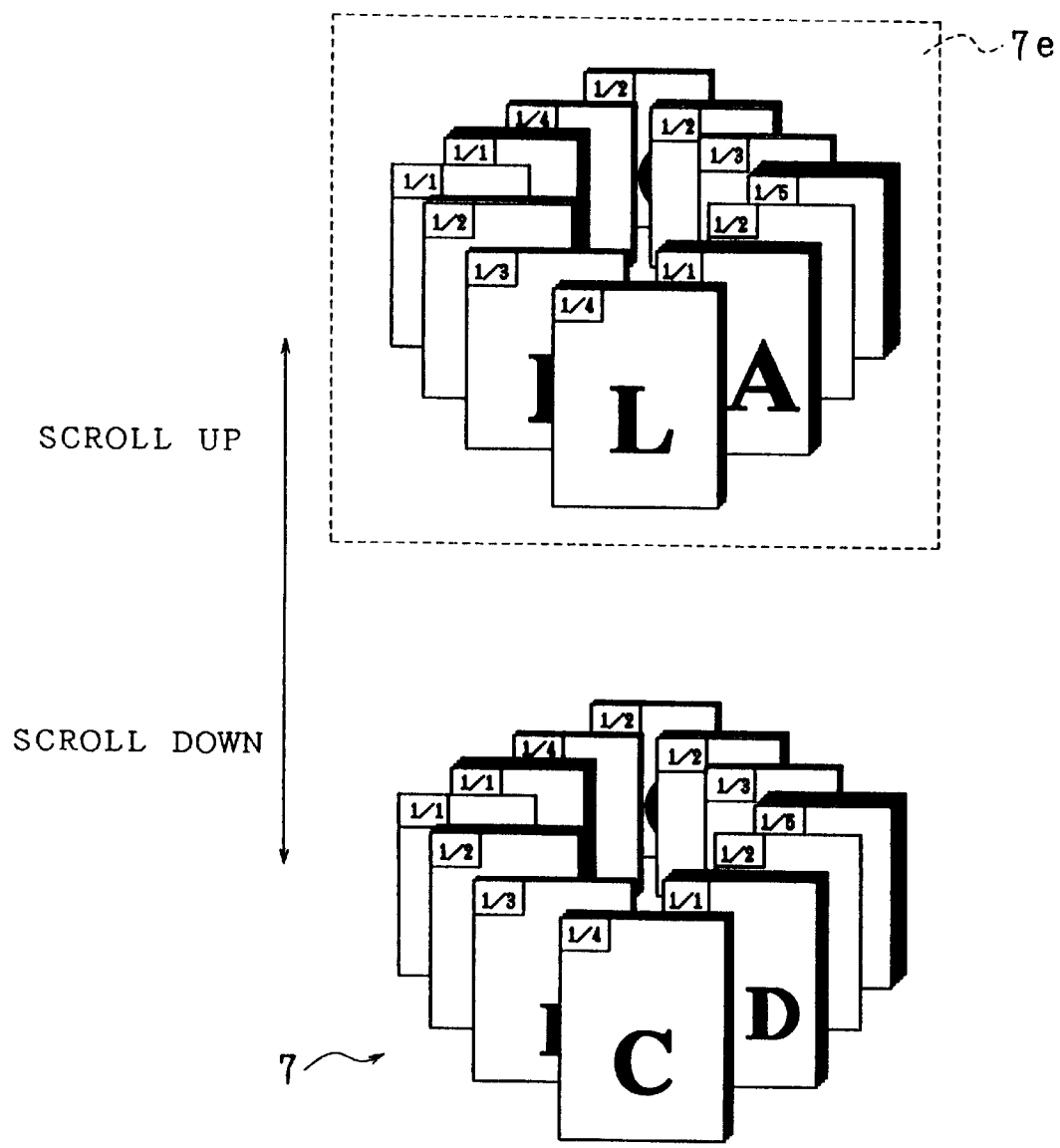
FIG. 68 is an explanatory drawing showing the aforementioned ring-form display being scrolled up and down.

Here, as shown in FIG. 68, the top and bottom clusters of file bundles can be replaced with each other by scroll-up and -down that moves, parallel to the Y-axis direction, the specifications of the positional co-ordinates rendered according to the aforementioned scheme of specifying file bundles to positional co-ordinates on the display screen in response to a command.

More specifically, as shown in FIG. 67(b), for example, given that the cluster of file bundles 7 before being removed is displayed at the top in the form of a ring, while the cluster of file bundles after being removed is displayed at the bottom in the form of a ring, scrolling up moves up the post-removal cluster of file bundles displayed at the bottom in the form of a ring, and causes the pre-removal cluster of file bundles 7 displayed in the form of a ring to gradually appear from the bottom of the display screen.

As a result, in the present embodiment, the clusters of file bundles displayed in the form of rings can swap their positions on the display screen. Note that scrolling down can cause the same position swapping.

Embodiment 33

Figure 69:
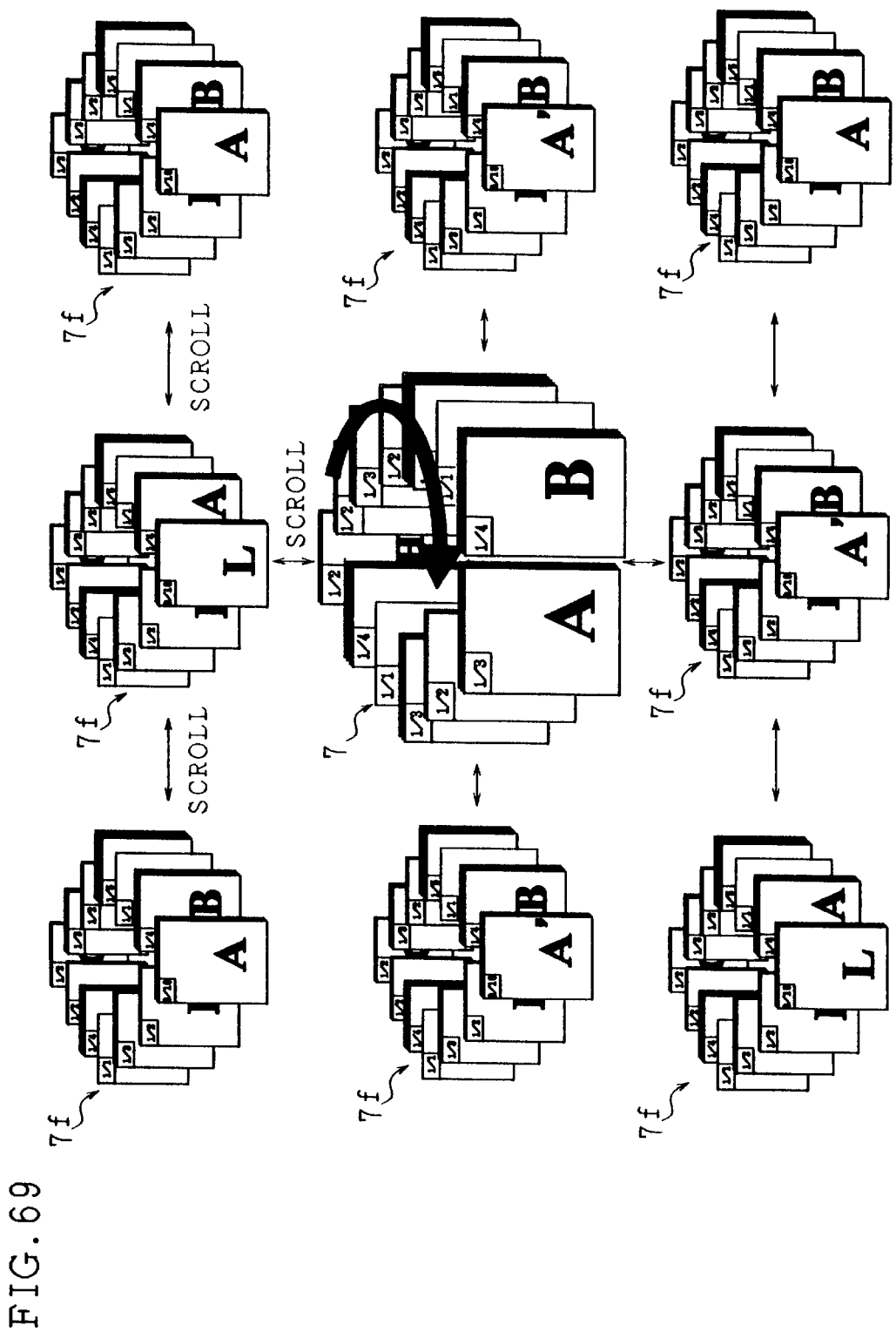
FIG. 69 is an explanatory drawing showing a plurality of aforementioned ring-form displays displayed side by side horizontally and vertically.

In embodiment 33 in accordance with the present invention, when there are a large number of file bundles to be managed, and all the file bundles are displayed as a single cluster, it will be a troublesome task for the user to find out the desired file bundle. To avoid such a situation, in embodiment 33 in accordance with the present invention, the aforementioned file bundles are grouped into a plurality of groups; for example, as shown in FIG. 69, the aforementioned plurality of groups of clusters of file bundles 7 and 7f are displayed in the form of rings in the same screen.

Here, for example, the cluster of file bundles 7 displayed in the form of a ring in the centre has a larger size than the other clusters of file bundles 7f displayed in the form of rings, so as to allow easy search of the cluster of file bundles displayed in the form of a ring in the centre for a desired file bundle.

When the user wants to conduct a search for a desired file bundle through the other clusters of file bundles 7f displayed in the form of rings, the clusters of file bundles 7 and 7f displayed in the form of rings are scrolled vertically or horizontally on the display screen so as to position the desired cluster of file bundles 7f displayed in the form of rings in the centre, substituting the cluster of file bundles 7 displayed in the form of a ring, by using the scheme described in aforementioned embodiment 32, for example, as shown in FIG. 70(a) to FIG. 70(c).

Figure 71:
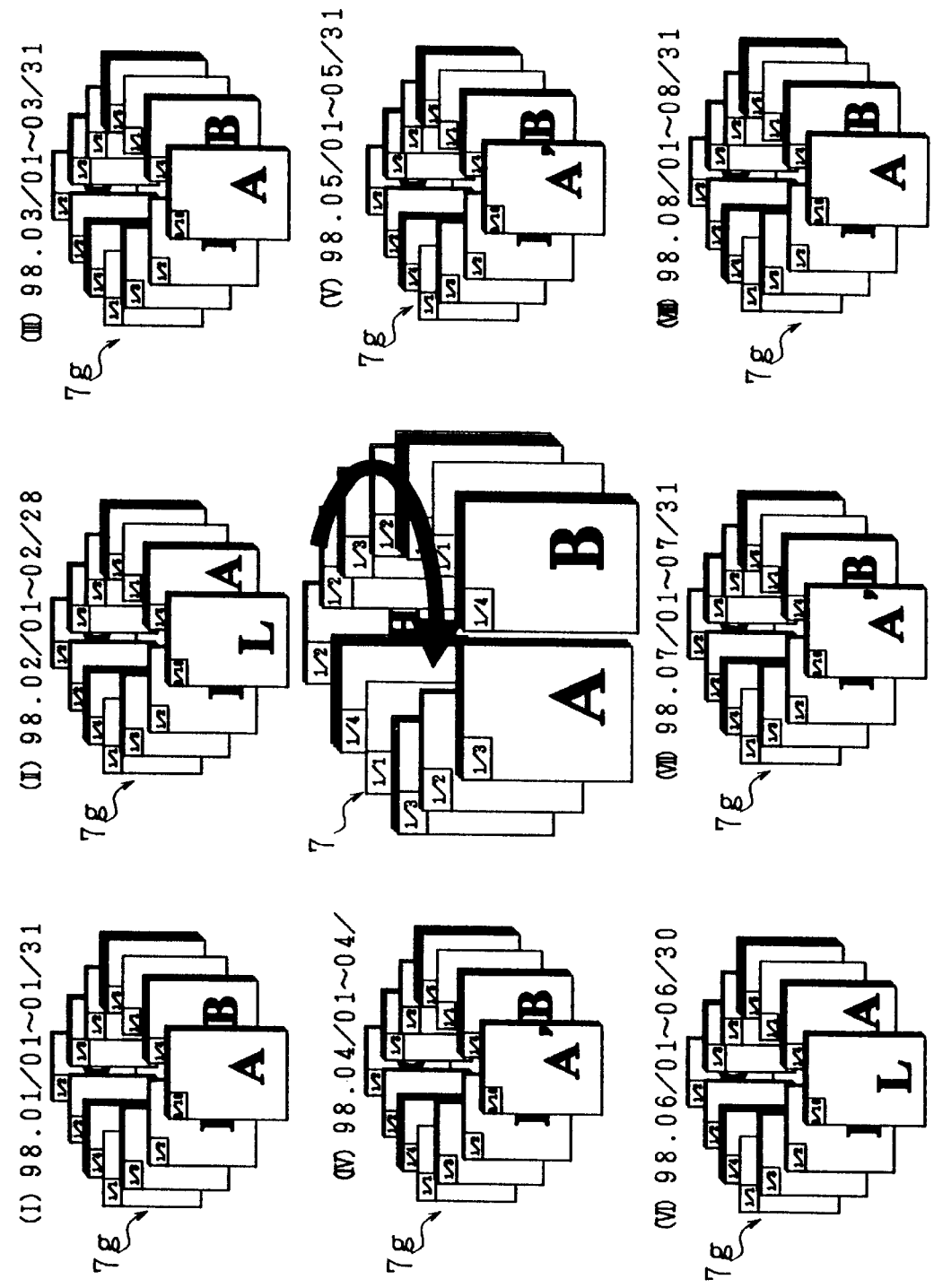
FIG. 71 is an explanatory drawing showing the aforementioned plurality of ring-form displays displayed in groups according to date and time of creation.

Moreover, when file bundles are to be managed by grouping them into a plurality of clusters of file bundles as above, having a criteria in the grouping facilitates a search for a target file bundle; for example, as shown in FIG. 71, the clusters of file bundles 7 and 7g displayed in the form of rings are grouped by date and time when the clusters 7 and 7g were inputted.

Figure 72:
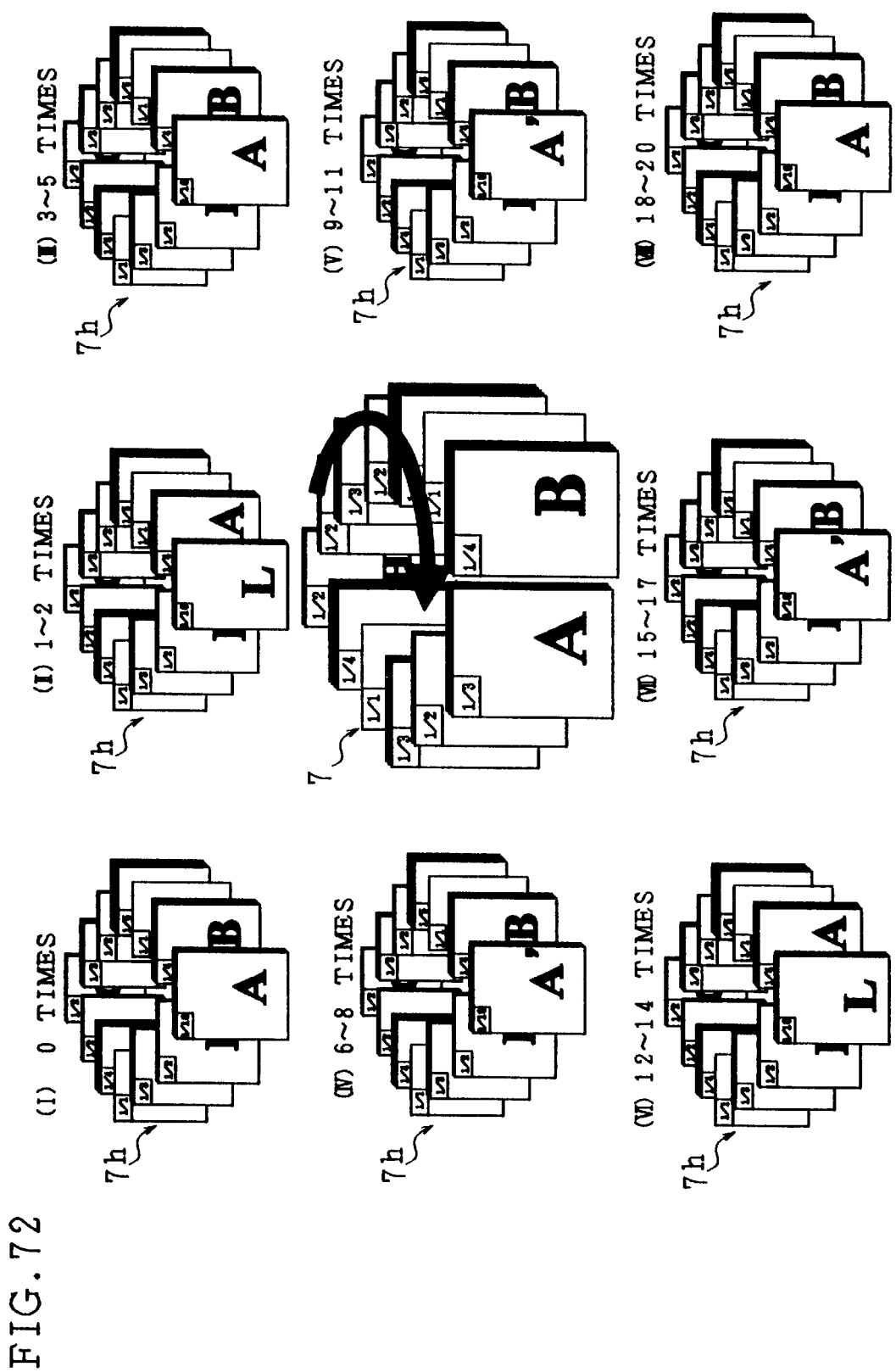

In such a case, the user can estimate to which cluster of file bundles displayed in the form of a ring the target file bundle belongs according to the input date and time of the target file bundle that is being searched for, and quickly find out the target file bundle. Moreover, the clusters of file bundles 7 and 7g displayed in the form of rings may be grouped according to, apart from input date and time of the file bundles, for example, the number of times that the file bundles have ever been read, that is, the number of times that the file bundles have ever been searched for as shown in FIG. 72.

Embodiment 34

As mentioned above, if all the file bundles ever created are to be displayed, there are too many file bundles to be managed, consequently, to the point where clusters of file bundles displayed in the form of rings are not capable of displaying even by grouping the clusters of file bundles into a plurality of groups as mentioned above.

To avoid such inconvenience from occurring, in embodiment 34 in accordance with the present invention, the file bundles that have not been searched for for a predetermined period of time (for example, the file bundle A in FIG. 73 (a)) are removed from the cluster of file bundles 7 displayed in the form of a ring as shown in FIG. 73(b) by counting, with the date and time monitor 45, the time, for example, since a predetermined date and time or since each of the file bundles was displayed on the display screen.

However, in such a case, the aforementioned file bundle is only removed from the cluster of file bundles 7 displayed in the from of a ring, and the image data of the file bundle as such is not deleted from the image storage section 51.

Note that although in aforementioned embodiments the file bundles were displayed while standing upright with their front sides looking toward the user, this is nothing but an example. The present invention is not limited to such a display; for example, as shown in FIG. 74(a) to FIG. 74(e), the file bundles may be displayed while being pasted on respective sides of a polyhedron or preferably a cube.

Such a polyhedron-form display enables a display involving more file bundles, enhanced visual identification, and increased search efficiency. Moreover, the clusters of file bundles 7h displayed in the form of polyhedrons may be displayed while being rotated in a similar manner to the foregoing as shown in FIG. 74(a), FIG. 74(b) and FIG. 74(c) in chronological order. Such a rotational display enables further increased search efficiency.

Furthermore, in the aforementioned polyhedron-form display, as shown in FIG. 74(a), FIG. 74(d), and FIG. 74(e), the polyhedron file bundles 7i as such may be rotated around the symmetry axis thereof to display the file bundles arranged on the sides of polyhedrons, thereby enabling further enhanced search efficiency.

Moreover, note that although in the aforementioned embodiments the cluster of file bundles 7 were displayed in the form of a ring, this is nothing but an example. The present invention is not limited to such a ring-form display; for example, the cluster of file bundles 7 may be displayed while being arranged so that each file bundle of the cluster of file bundles 7 diagonally overlaps the immediate front and back file bundle on the display screen, or in other words, so that at least a part of each file bundle can be seen and identified as shown in, for example, FIG. 75(a) to FIG. (c).

Figure 75C:
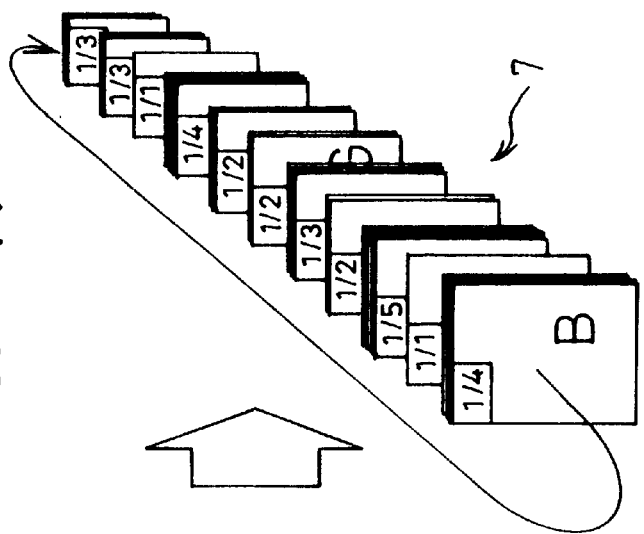
FIG. 75(a) to FIG. 75(c) are explanatory drawings showing, in the aforementioned ring-form display, another configuration of the cluster of file bundles.
Figure 75B:
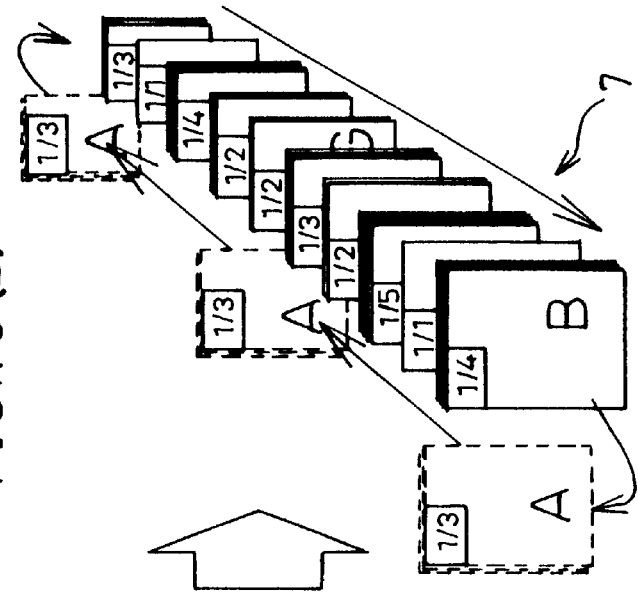
Figure 75A:
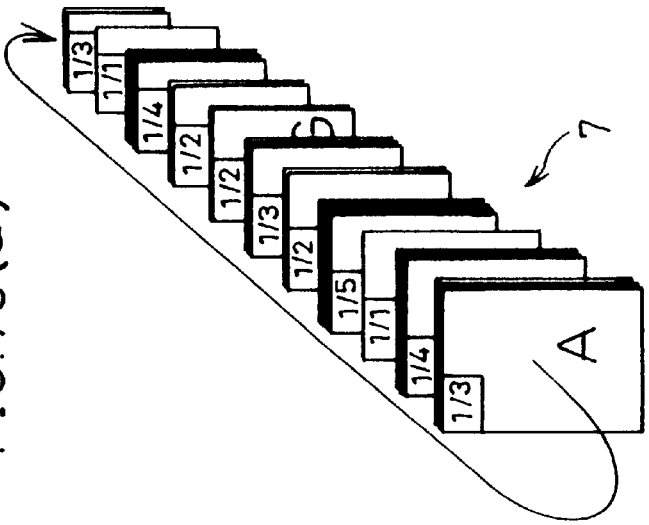

In such an arrangement, to facilitate a search through the file bundles, the file bundles may be sequentially moved in a similar manner to the rotational movement of the ring-form display, so that the file bundle A in the foreground is moved far back, and thereby, the file bundle B that was immediately behind the file bundle A comes to be displayed in the foreground as shown in FIG. 75(a) to FIG. 75(c). Note that although in the foregoing, the file bundle in the foreground is displayed after being moved to the far back, this is nothing but an example. In the other way round, the file bundle in the far back may be displayed after being moved to the foreground.

Figure 76C:
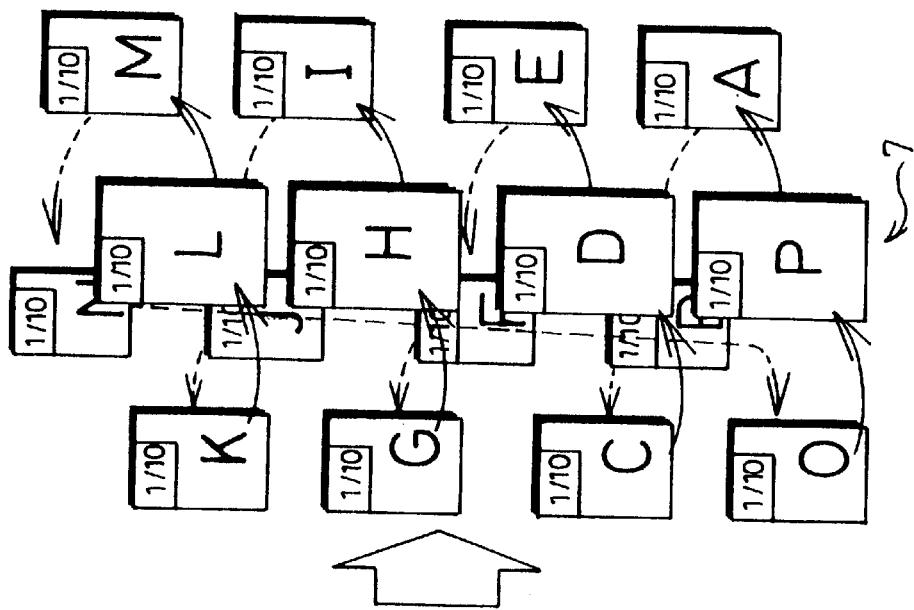
FIG. 76(a) to FIG. 76(c) are explanatory drawings showing, in the aforementioned ring-form display, still another configuration of the cluster of file bundles.
Figure 76B:
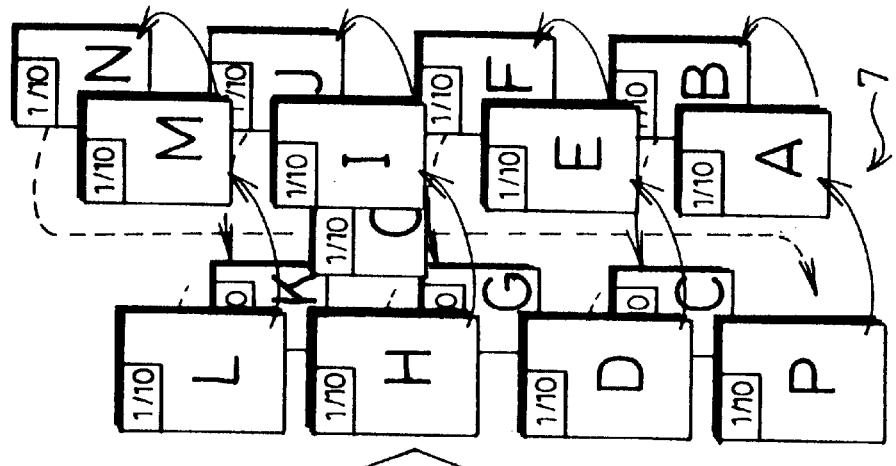
Figure 76A:
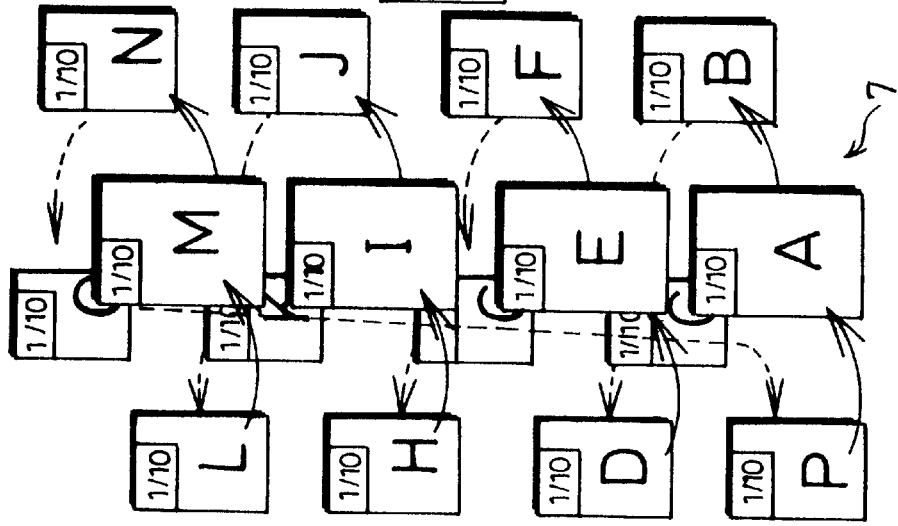
Figure 78:
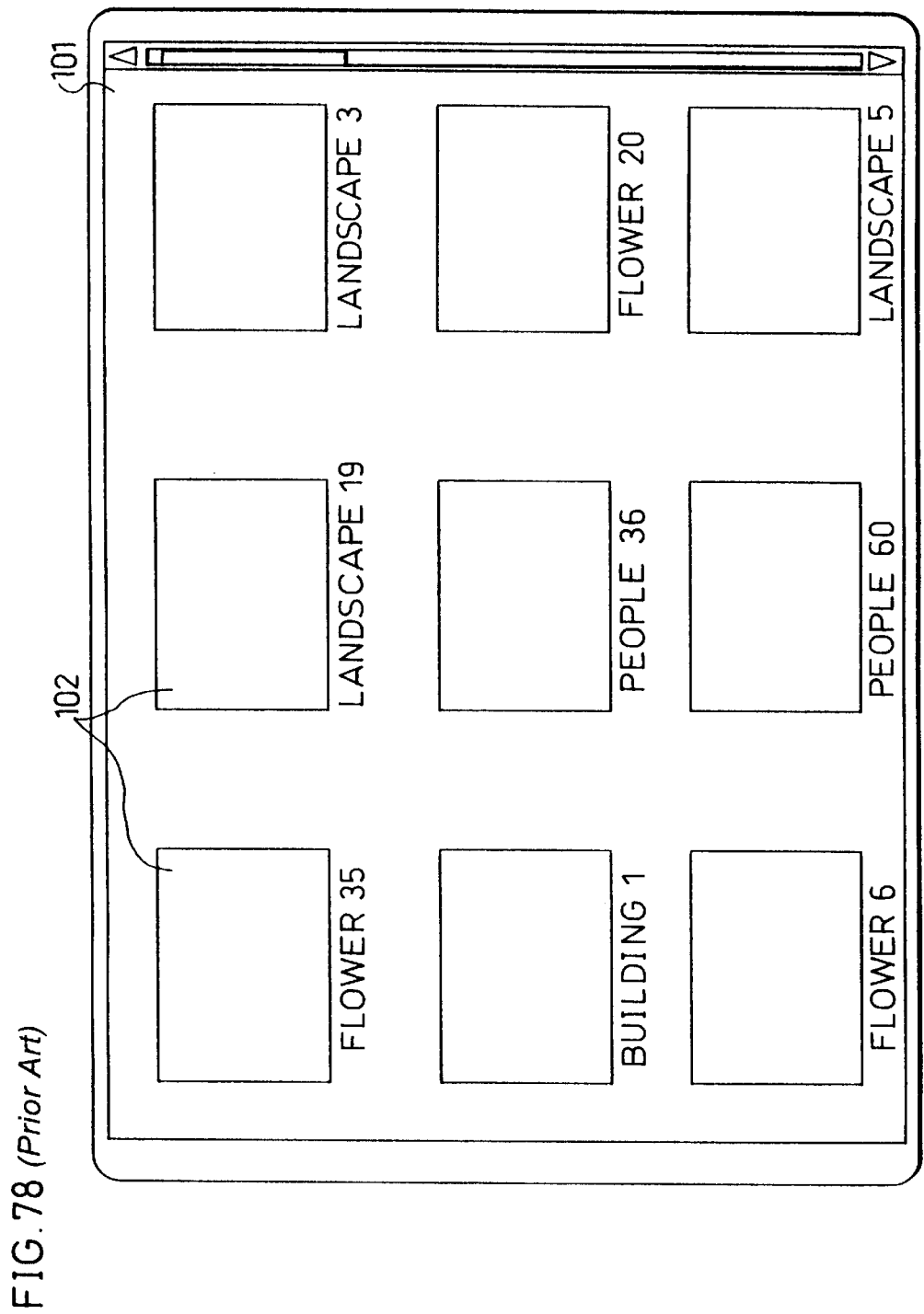
FIG. 78 is an explanatory drawing showing a search screen of another conventional information managing device.

Furthermore, instead of the ring-form display detailed in the aforementioned embodiments, the file bundles in the cluster of file bundles 7 may, for example, be displayed in a spiral-form display as shown in FIG. 76(a) to FIG. 76(c). Such a spiral-form display allows more file bundles to be displayed in the foreground than does the ring-form display, thus enabling increased search efficiency for a target file bundle.

Moreover, in such a spiral-form display, in a similar manner to the rotational movement in the ring-form display, the file bundles may be displayed while being rotated around the central axis of the spiral acting as the rotation axis, moving upwards sequentially in accordance with the rotation, with the topmost file bundle descending along the central axis to the bottom, as shown in FIG. 76(a) to FIG. 76(c). Such a rotational movement enables an increased search efficiency through file bundles.

Embodiment 35

Embodiment 35 in accordance with the present invention is related to the display form shown in FIG. 74(a) to FIG. 74(e) detailed in aforementioned embodiment 34, achieving even easier visual identification and enhanced search efficiency. Therefore, in embodiment 35, the polyhedrons, or more preferably cubes, of the cluster of polyhedron file bundles 7h in such a polyhedron display can be displayed while being rotated in a similar manner to the foregoing as shown in FIG. 74(a), FIG. 74(b), and FIG. 74(c) in chronological order. The rotational display enables further enhanced search efficiency.

The procedures to rotate the clusters of file bundles displayed as polyhedron in the form of three-dimensional rings as shown in FIG. 74(a) to FIG. 74(e) are substantially the same as the method explained in embodiment 1 (the only difference lies in the co-ordinates in the first to third co-ordinates tables).

Figure 79:
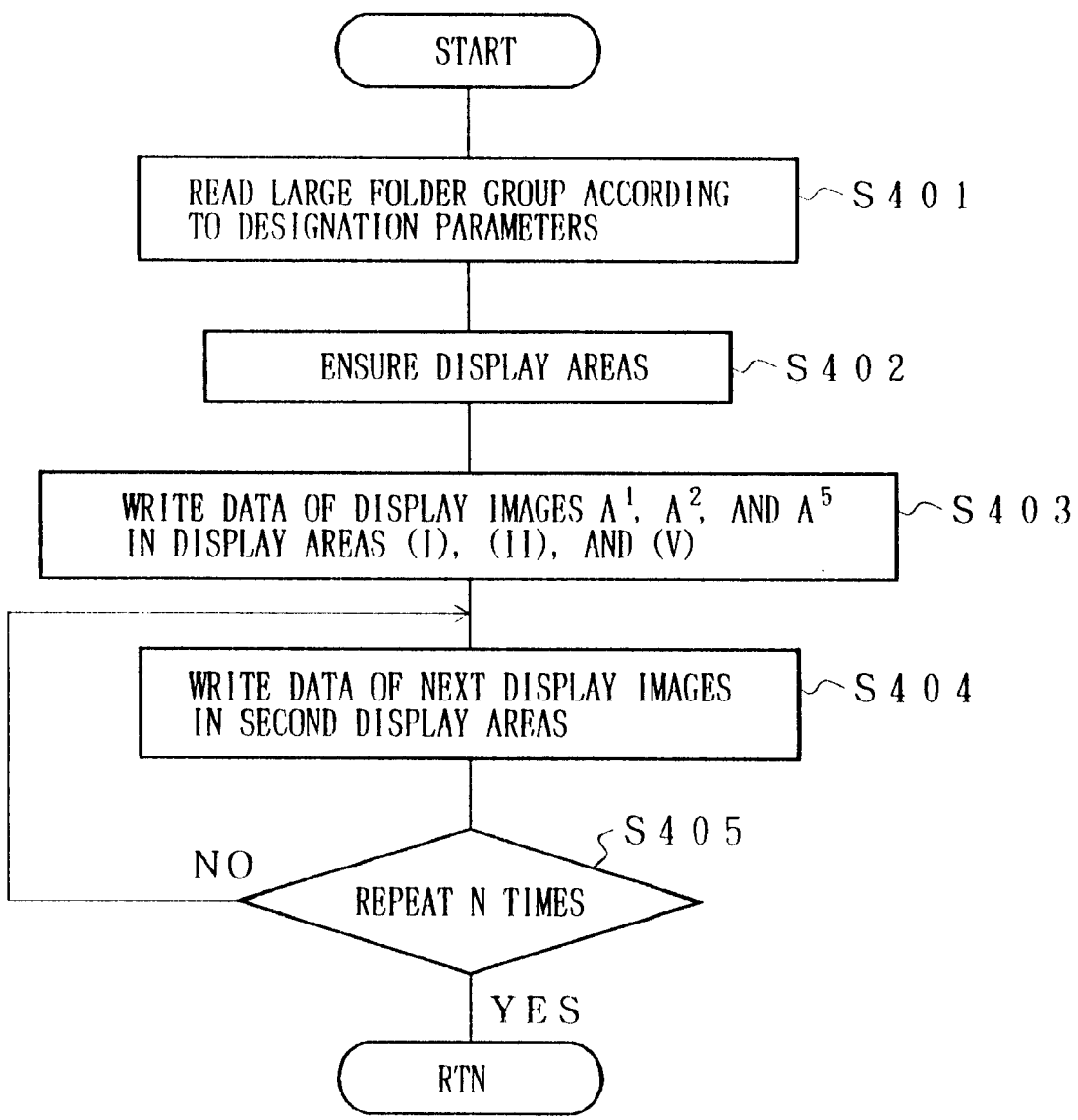
FIG. 79 is a flow chart showing, in the information managing device of the present invention, procedures to display the thumbnail files as images on the surfaces of a polyhedron.

A specific description will be given in the following to the ring-form display procedures on such a display screen in reference to the flow chart shown in FIG. 79. First, a folder group including the aforementioned plurality of polyhedron file bundles displayed in the form of a three-dimensional ring is selected. Thereafter, a registered folder group is recalled according to a set of rules (parameters) that were registered in advance by the user (S401).

To display the recalled folder group, the n polyhedron file bundles belonging to that folder group are counted, and display areas (actual display positions) are thereby ensured for the file bundles (S402). Subsequently, the display image data sets $A^1$, $A^2$, and $A^5$ are written in the actual display areas (I), (II), and (V) respectively shown in Table 5, so that those images are displayed (S403) (see FIG. 80).

Subsequently, the next display image data sets $B^1$, $B^2$, and $B^5$ are written into the actual display areas of the next stage, so that those images are displayed (S404). In this manner, the polyhedrons are displayed in the form of a ring by repeating the aforementioned writing and display process for n times, which is equal to the number of the file bundles displayed in the form of a polyhedron (cube) (S405).

TABLE 5

| Virtual Display Area | Display Image | Actual Display Area | Display Location |
|---|---|---|---|
| (I) | $A^1$ | Area (I) | $(X^1, Y^1), (X^3, Y^3)$ |
| (II) | $A^2$ | Area (II) | $(X^2, Y^4), (X^3, Y^1)$ |
| (III) | $A^3$ | | |
| (IV) | $A^4$ | | |
| (V) | $A^5$ | Area (V) | $(X^3, Y^1), (X^4, Y^2)$ |
| (VI) | $A^6$ | | |

Figure 80:
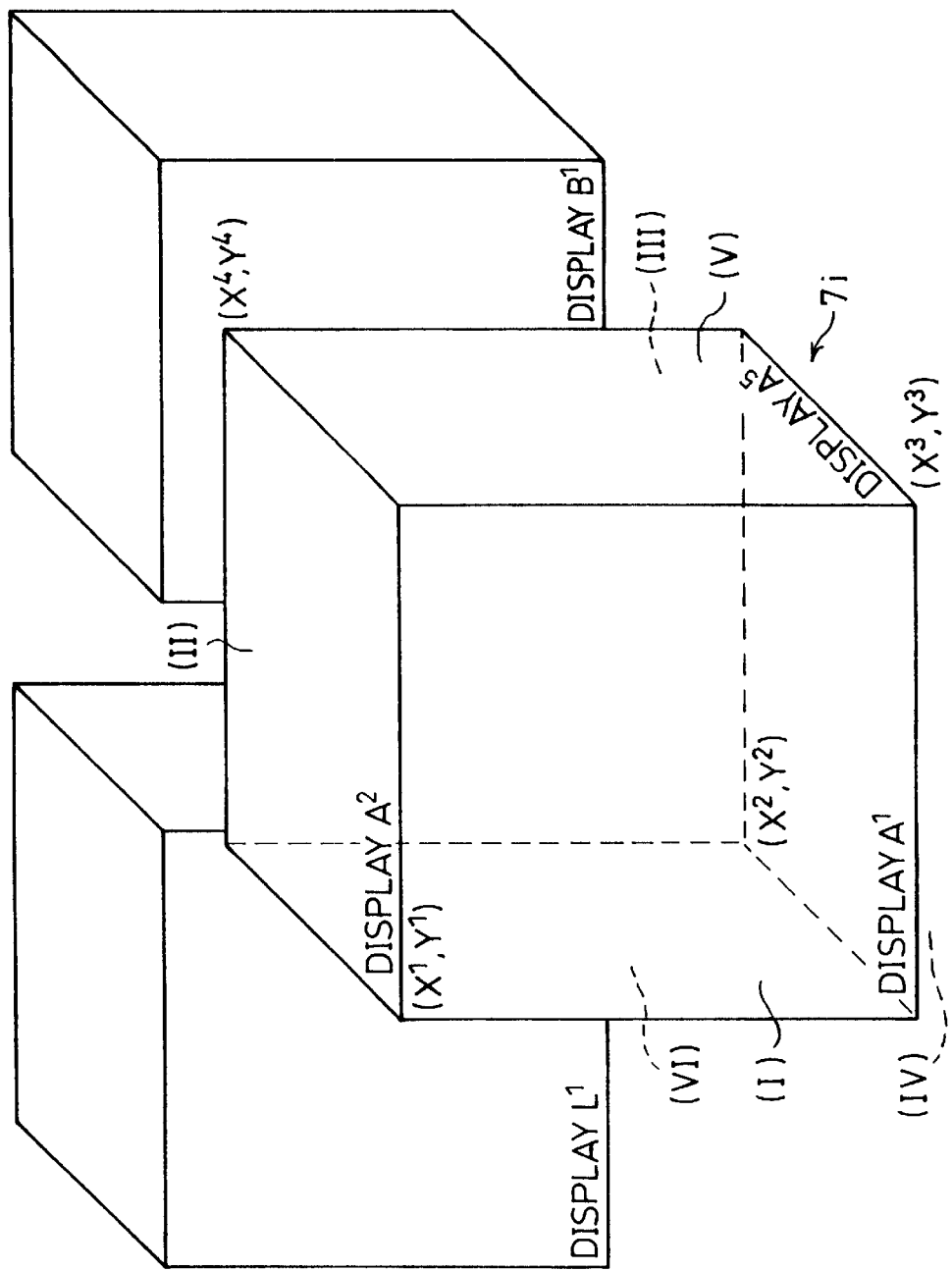
FIG. 80 is a perspective view showing display locations of thumbnail files displayed as images on the surfaces of a polyhedron, using the aforementioned information managing device.

Furthermore, in the aforementioned polyhedron, ring-form display of among the file bundles on the surfaces of the polyhedron, as shown in FIG. 80, only three display areas (I), (II), and (V) are concurrently visually identifiable among the six file surfaces [(I) to (VI)] of the polyhedron, even when specifications are made to display as many file surfaces as possible.

Here, if the file bundle 7i displayed in the form of a polyhedron in the front position (that is, the polyhedron displayed in the largest size) can be rotated so that other file surfaces can also be displayed, good visual identification can be ensured while enabling father enhanced search efficiency.

Figure 81:
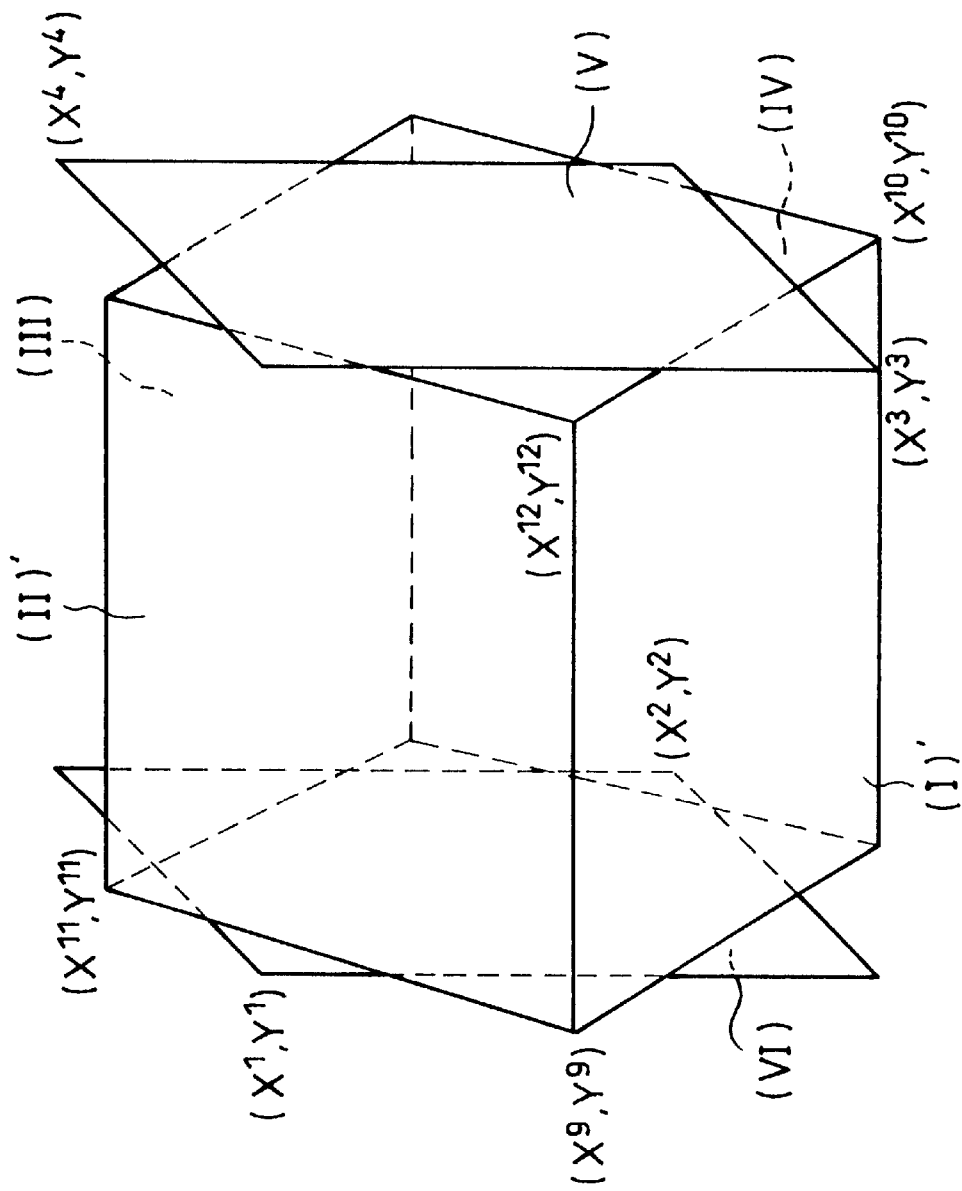
FIG. 81 is an explanatory drawing explaining thumbnail files displayed as images on the surfaces of a polyhedron in a vertical rotational movement, using the aforementioned information managing device.

In other words, in the three-dimensional polyhedron-from display, the file surfaces (III) and (IV), although not being displayed in the state shown in FIG. 80 because they are hidden surfaces, can be displayed as shown in FIG. 81 by rotating the file surfaces (I) to (IV) forward or backward with respect to the display surface around the side file surfaces (V) and (VI) (this rotation will be referred to as a vertical rotation). In other words, the file surfaces that are side surfaces with respect to the rotation axis of the displayed polyhedron are rotated around the aforementioned rotation axis while the surfaces that are end surfaces with respect to the direction of the rotation axis are not moved.

Note here that the side file surfaces (V) and (VI) are not rotated to avoid reduced visual identification as a result of the rotation of the file surface (V) that has an orientation that most facilitates visual identification of the state of FIG. 80.

Figure 82:
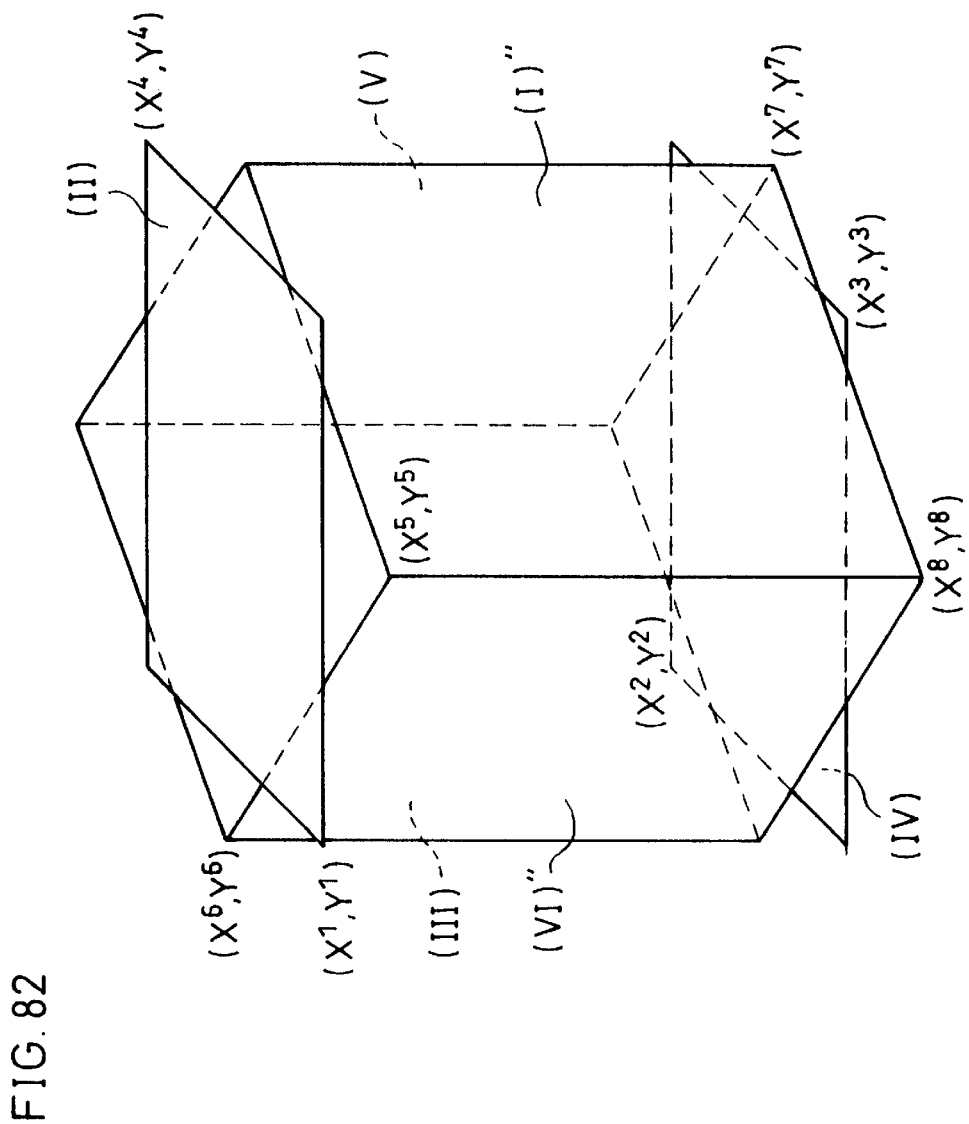
FIG. 82 is an explanatory drawing explaining thumbnail files displayed as images on the surfaces of a polyhedron in a horizontal rotational movement, using the aforementioned information managing device.

Moreover, the file surfaces (VI) and (III), being invisible in the state shown in FIG. 80, can be displayed as shown in FIG. 82, by rotating the file surfaces (I), (VI), (III), and (V) leftward or rightward with respect to the top and bottom file surfaces (II) and (IV) (this rotation will be referred to as a horizontal rotation).

Note here that the top and bottom file surfaces (II) and (IV) are not rotated to avoid reduced visual identification as a result of the rotation of the file surface (II) that has an orientation that most facilitates visual identification of the state of FIG. 80.

Next, referring to the flow chart shown in FIG. 83, the following description will explain in detail procedures to rotate the aforementioned polyhedron-form file bundle. Note that in the initial state before a rotation, as shown in Table 5, in the memory, the image data sets A1 to A6 are displayed in the display areas (I) to (VI) shown in FIG. 80 virtually, i.e., in the memory. However, for example, only the image data sets $A^1$, $A^2$, and $A^5$ in the actual display areas (I), (II), and (V) are actually displayed.

The user enters a command to rotate the polyhedron file bundle positioned on the front side the folder group that is displayed in advance in the following manner. First, the user enters a command for either a vertical rotation or a horizontal rotation (S406). If a vertical rotation is selected, the user enters a command for either a forward rotation or a backward rotation (S407).

Here, if a forward rotation is selected, according to that rotation, the image data set $A^2$ presently in the virtual display area (II) is moved to the virtual display area (I), and the image data set $A^3$ presently in the virtual display area (III) is moved to the virtual display area (II).

Therefore, as an operation display during the rotation, the image data sets for the display images $A^1$ and $A^2$ are written into the actual display areas (I)' and (II)' shown in FIG. 81 according to the set of rules shown in Table 6 and displayed on the screen (S408). Thereafter, the image data sets for the display images $A^2$ and $A^3$ are written into the actual display areas (I) and (II) shown in FIG. 80 according to the set of rules shown in Table 8 and displayed on the screen (S409).

TABLE 6

| Virtual Display Area | Display Image | Actual Display Area | Display Location |
|---|---|---|---|
| (I) | $A^1$ | Area (I)' | $(X^9, Y^9), (X^{10}, Y^{10})$ |
| (II) | $A^2$ | Area (II)' | $(X^{11}, Y^{11}), (X^{12}, Y^{12})$ |
| (III) | $A^3$ | | |
| (IV) | $A^4$ | | |
| (V) | $A^5$ | Area (V) | $(X^3, Y^1), (X^4, Y^2)$ |
| (VI) | $A^6$ | | |

TABLE 7

| Virtual Display Area | Display Image | Actual Display Area | Display Location |
|---|---|---|---|
| (I) | $A^1$ | Area (II)' | $(X^{11}, Y^{11}), (X^{12}, Y^{12})$ |
| (II) | $A^2$ | | |
| (III) | $A^3$ | | |
| (IV) | $A^4$ | Area (I)' | $(X^9, Y^9), (X^{10}, Y^{10})$ |
| (V) | $A^5$ | Area (V) | $(X^3, Y^1), (X^4, Y^2)$ |
| (VI) | $A^6$ | | |

TABLE 8

| Virtual Display Area | Display Image | Display Area | Actual Display Location |
|---|---|---|---|
| (I) | $A^2$ | Area (I) | $(X^1, Y^1), (X^3, Y^3)$ |
| (II) | $A^3$ | Area (II) | $(X^2, Y^4), (X^3, Y^1)$ |
| (III) | $A^4$ | | |
| (IV) | $A^1$ | | |
| (V) | $A^5$ | Area (V) | $(X^3, Y^1), (X^4, Y^2)$ |
| (VI) | $A^6$ | | |

TABLE 9

| Virtual Display Area | Display Image | Actual Display Area | Display Location |
|---|---|---|---|
| (I) | $A^1$ | Area (I)" | $(X^5, Y^7), (X^7, Y^7)$ |
| (II) | $A^2$ | Area (II) | $(X^2, Y^4), (X^3, Y^1)$ |
| (III) | $A^3$ | | |
| (IV) | $A^4$ | | |
| (V) | $A^5$ | | |
| (VI) | $A^6$ | Area (V)" | $(X^6, Y^6), (X^8, Y^8)$ |

TABLE 10

| Virtual Display Area | Display Image | Actual Display Area | Display Location |
|---|---|---|---|
| (I) | $A^1$ | Area (V)" | $(X^2, Y^4), (X^3, Y^1)$ |
| (II) | $A^2$ | Area (II) | $(X^2, Y^4), (X^3, Y^1)$ |
| (III) | $A^3$ | | |
| (IV) | $A^4$ | | |
| (V) | $A^5$ | Area (I)" | $(X^5, Y^5), (X^7, Y^7)$ |
| (VI) | $A^6$ | | |

TABLE 11

| Virtual Display Area | Display Image | Actual Display Area | Display Location |
|---|---|---|---|
| (I) | $A^1$ | Area (V)' | $(X^1, Y^1), (X^3, Y^3)$ |
| (II) | $A^2$ | Area (II) | $(X^2, Y^4), (X^3, Y^1)$ |
| (III) | $A^3$ | | |
| (IV) | $A^4$ | | |
| (V) | $A^5$ | Area (V) | $(X^3, Y^1), (X^4, Y^2)$ |
| (VI) | $A^6$ | | |

Moreover, if a backward rotation is selected in S407, the image data sets for the display images $A^2$ and $A^4$ are written into the actual display areas (II)' and (I)' shown in FIG. 81 according to the set of rules shown in Table 7 and displayed on the screen (S410). Thereafter, the image data sets for the display images $A^4$ and $A^1$ are written into the actual display areas (I) and (II) according to the set of rules shown in Table 8 and displayed on the screen (S411).

If a horizontal rotation is selected in S407, the user subsequently enters a command for either a leftward rotation or a rightward rotation (S412). Here, if a rightward rotation selected, according to that rotation, the image data set $A^1$ presently in the virtual display area (I) is moved to the virtual display area (V), and the image data set $A^6$ presently in the virtual display area (VI) is moved to the virtual display area (I).

Therefore, as an operation display during the rotation, the image data sets for the display images $A^1$ and $A^6$ are written into the actual display areas (I)" and (VI)" shown in FIG. 82 according to the set of rules shown in Table 9 and displayed on the screen (S413). Thereafter, the image data sets for the display images $A^1$ and $A^6$ are written into the actual display areas (V) and (I) shown in FIG. 80 according to the set of rules shown in Table 11 and displayed on the screen (S414).

Moreover, if a leftward rotation selected in S412, the image data sets for the display images $A^1$ and $A^5$ are written into the actual display areas (VI)" and (I)" shown in FIG. 82 according to the set of rules shown in Table 10 and displayed on the screen (S415). Thereafter, the image data sets for the display images $A^3$ and $A^5$ are written into the actual display areas (V) and (I) according to the set of rules shown in Table 11 and displayed on the screen (S416).

Note that in the aforementioned rotating display, smoother rotation images can be obtained by increasing the number of display images in the rotation shown in S408, S410, S413, and S415.

Furthermore, although in the aforementioned embodiments the image information of an original document such as a text document was taken as an example of an image file; the embodiments do not need to be limited to such image information, but are applicable to, for example, table data, such as spread sheet, and image data such as a design and a circuit diagram.

An information managing device in accordance with the present invention, in order to achieve the aforementioned objects, includes:

an image storage member for storing a plurality of image files;

an input member for entering a command to display the plurality of image files;

a thumbnail storage member for storing thumbnail files each corresponding to one of the plurality of image files stored in the image storage member;

a thumbnail display member for displaying images of the thumbnail files stored in the thumbnail storage member on a display screen according to a command entered through the input member; and an image file display member for reading, from the image storage member, the image file corresponding to the thumbnail file selected through the input member from the thumbnail files displayed on the display screen, and displaying that image file on the display screen, wherein the thumbnail display member is specified to configure the images of the thumbnail files so as to partially overlap each other in a three-dimensional manner.

With the arrangement, the thumbnail display member displays the images of the thumbnail files so as to partially overlap each other in a three-dimensional configuration. As a result, the thumbnail file on the foreground can be specified to have a size large enough to visually identify the thumbnail file, and those thumbnail files behind the thumbnail file on the foreground are partially displayed, thereby allowing the user to obtain some information on the contents of the thumbnail files in the back.

Consequently, with the aforementioned arrangement, since the thumbnail files are displayed so as to partially overlap each other, more thumbnail files can be displayed on the display screen than conventional techniques, having an advantage that searches can be conducted more quickly through thumbnail files for the image file corresponding to a desired thumbnail file.

The aforementioned information managing device, furthermore, may include:

a command member for entering a command to set a display size of the image of the thumbnail file; and an altering member for altering the display size of the image of the thumbnail file according to the command entered through the command member, and displaying the image of the thumbnail file in the altered display size on the display screen.

With the aforementioned arrangement, the command member controls the size of the images of the thumbnail files, and the altering member alter the display size of the thumbnail files according to the command. Consequently, the user can specify the size of the images of the thumbnail files to his/her liking, which results in an improved visual identification of the thumbnail files.

The aforementioned information managing device may further include a file moving member for moving one or more of the images of the thumbnail files displayed on the display screen according to the command entered through the input member.

With the aforementioned arrangement, the file moving member sequentially moves the images of the thumbnail files to the foreground. As a result, searches can be quickly made through the thumbnail files for a desired thumbnail file, and also searches can be quickly conducted for a desired image file taking advantage of the thumbnail files.

In the aforementioned information managing device, the thumbnail display member may be specified to configure the images of the thumbnail files in the form of a ring.

With the aforementioned arrangement, the images of the thumbnail files are configured in the form of a ring. As a result, when the user browses the images of the thumbnail files sequentially, the next image following the image of the last thumbnail file is the image of the thumbnail file that was browsed first. Consequently, in browsing the images, the user does not have to move the eyesight correctly making a long leap from an image to another, improving visual identification of the images of the thumbnail files.

The aforementioned information managing device may further include a rotation command member for rotating the images of the thumbnail files configured in the form of a ring on the display screen around a central axis of the ring-form configuration according to the command entered through the input member.

With the aforementioned arrangement, the images of the thumbnail files configured in the form of a ring can be displayed in rotation by the rotation command member, further improving visual identification of the thumbnail files and increasing search efficiency.

In the aforementioned information managing device, the file moving member may include a selection command member for, if a front page of the thumbnail file displayed on the display screen is not a desired image, selectively controlling procedures of the file movement according to the command entered through the input member, so that either a file immediately behind the front page or a file in the far back appears on the front page in response to every command input for a file movement.

With the aforementioned arrangement, a selection command member is provided. As a result, the front page, which is displayed as a part of the thumbnail file and easy to search for, can be quickly selected. Such a thumbnail file having a front page suitable for searching improves search efficiency.

In the aforementioned information managing device, the thumbnail display member may be specified to display the thumbnail files on respective surfaces of a polyhedron.

With the aforementioned arrangement, the thumbnail files are displayed on the respective surfaces of a polyhedron. As a result, more thumbnail files can be displayed on the display screen, speeding up the search through the thumbnail files. Consequently, image files can be more quickly searched via the thumbnail files.

Another the information managing device in accordance with the present invention, in order to achieve the aforementioned objects, includes:

an image storage member for storing a plurality of image files;

an input member for entering a command to display the plurality of image files;

a thumbnail storage member for storing thumbnail files each corresponding to one of the plurality of image files stored in the image storage member;

a thumbnail display member for displaying images of the thumbnail files stored in the thumbnail storage member on a display screen according to a command entered through the input member; and an image file display member for reading, from the image storage member, the image file corresponding to the thumbnail file selected through the input member from the thumbnail files displayed on the display screen, and displaying that image file on the display screen, wherein the thumbnail display member is specified to display the thumbnail files so as to overlap each other partially, sequentially, and diagonally from a front row to a far back row that is higher in position than the front row in accordance with positions of the thumbnail files in the configuration, so that upper portions of the thumbnail files are visible.

With the aforementioned arrangement, the thumbnail display member is specified to display the thumbnail files so as to overlap each other partially, sequentially, and diagonally from a front row to a far back row that is higher in position than the front row in accordance with positions of the thumbnail files in the configuration, so that upper portions of the thumbnail files are visible.

As a result, with the aforementioned arrangement, the thumbnail file on the foreground can be specified to have a size large enough to visually identify the thumbnail file, and those thumbnail files behind the thumbnail file on the foreground are partially displayed, thereby allowing the user to obtain some information on the contents of the thumbnail files even in the back.

Moreover, with the aforementioned arrangement, since the thumbnail files are displayed so as to partially overlap each other, more thumbnail files can be displayed on the display screen than conventional techniques. For these reasons, the arrangement enables searches to be conducted more quickly through thumbnail files for the image file corresponding to a desired thumbnail file.

The aforementioned information managing device may further include a first rewriting member for, if one or more of the thumbnail files are selected through the input member, counting and storing the number of times that each of the selected thumbnail files has ever been searched for, and rewriting the display order of the thumbnail files stored in the thumbnail storage member according to the number.

With the aforementioned arrangement, the first rewriting member rewrites the display order of the thumbnail files by the number of times that the thumbnail files have been searched for. As a result, the thumbnail files that have been searched for a large number of times can be arranged, for example, in the foreground, enabling quicker searches for an image file via the thumbnail files.

In the aforementioned information managing device, the thumbnail display member may include a first arrangement specifying section for arranging the thumbnail files on the display screen sequentially from a front row to a far back row in descending order of the number.

With the aforementioned arrangement, the first arrangement specifying section can arrange the thumbnail files that have been searched for a large number of times in the foreground, enabling quicker searches for an image file via the thumbnail files.

In the aforementioned information managing device, the thumbnail display member may include a second arrangement specifying section for arranging the thumbnail files on the display screen sequentially from a front row to a far back row in the configuration in descending order of the number, with the thumbnail files other than the thumbnail file in the front row being arranged alternately on the left-hand side and on the right-hand side.

With the aforementioned arrangement, the second arrangement specifying section can arrange the thumbnail files that have been searched for a large the number of times in the foreground, for example, in the front row, where the thumbnail files are easily identified on the display screen, enabling quicker searches for an image file via the thumbnail files.

In the aforementioned information managing device, preferably, the image files each have an identification tag to be distinguish from the other image files on the display screen.

With the aforementioned arrangement, the identification tags distinguishes the thumbnail files from each other and facilitate identification of the thumbnail files, thus enabling quick searches for a necessary thumbnail file and hence quicker searches for an image file via such thumbnail files.

Further in the aforementioned information managing device, the thumbnail display member may include a selective creation section for creating a partial cluster of those image files selected according to the identification tags and creating thumbnail files according to the partial cluster.

With the aforementioned arrangement, the selective creation section allows a partial cluster of thumbnail files selected by the identification tags to be displayed, enabling quicker searches for a desired thumbnail file and hence quicker searches for an image file via thumbnail file.

In the aforementioned information managing device, preferably, the image files each represent a bundle of original documents. Typically, when the image files each represent a bundle of original documents, if the aforementioned original document bundle is scaled down on the display screen, the display becomes too complex to identify each original document.

However, with the aforementioned arrangement, the images of the thumbnail files corresponding to the aforementioned original document bundle represent the contents of the aforementioned original document bundle by arranging the images in a different configuration displaying the titles in a featured manner, so as to display the original document bundle suitably. As a result, searches can be more quickly conducted through image files representing the original document bundle by the thumbnail file display.

Further in the aforementioned information managing device, preferably, the thumbnail display member includes:
  a monitoring member for monitoring the time when one or more of the thumbnail files are searched for, and image files corresponding to those thumbnail files are inputted; and
  a second rewriting member for creating a partial cluster of only those image files inputted during a period of time designated through the input member according to the monitoring member, and rewriting the thumbnail files stored in the thumbnail storage member according to the partial cluster.

With the aforementioned arrangement, the display of the thumbnail files is specified according to the time when the image files was inputted. Also, typically, highly associated image files are inputted during a short period of time. As a result, a desired image file can be searched for more quickly taking advantage of the thumbnail files selected according to the input time.

The aforementioned information managing device may further include a first specifying member for specifying the identification tag by designating a frame in an image file display with the input member, the identification tags being used in an image file search conducted through displayed predetermined image files.

With the aforementioned arrangement, the first specifying member enables an identification tag to be specified by designating a frame in an image file display using an input member. As a result, the identification tag can be specified more surely and easily, and searches using the identification tag can be conducted more quickly.

The aforementioned information managing device may further include:
  a list display member for creating a list of display features of predetermined image files displayed on the display screen, and displaying the list on the display screen;
  a feature selecting member for selecting one of the display features from the list;
  a second specifying member for displaying image file portions showing the display feature selected through the feature selecting member, and when a desired image file portion is selected through the input member, specifying the desired image file portion as the identification tag.

With the aforementioned arrangement, the list display member makes a list of display features of the image files and thus enables one of the listed display features to be selected with the feature selecting member. As a result, the second select member allows the identification tag to be specified by selecting one of the display features of the image files with the input member. Consequently, the identification tag can be specified more surely and easily, and searches using the identification tag can be conducted more quickly.

The aforementioned information managing device may further include a third specifying member for specifying the identification tag in a predetermined header area of each of the image files with the input member, the identification tags being used to register the image files.

With the aforementioned arrangement, the third specifying member enables an identification tag to be specified to the liking of the user with the input member. Consequently, the identification tag can be specified more surely and easily, and searches using the identification tag can be conducted more quickly.

Still another the information managing device in accordance with the present invention includes:
  a rectangular parallelopiped device main body;
  a storage member for storing image information in the device main body;
  a display member provided with a display screen for displaying the image information stored in the storage member on the device main body; and
  a substantially rectangular parallelopiped scanner provided with a reading section for optically scanning the image information from an original document sheet and also with a transmission section for transmitting the image information to the storage member,
  wherein the scanner is freely attachable to, and removable from, the device main body in a first position and a second position, the first position being such that at least one of outside surfaces of the scanner forms a flush plane with a surface of the device main body, the surface being substantially parallel to the display screen, the second position being such that the reading section of the scanner opposes a surface of the device main body, the surface being substantially parallel to the display screen.

With the aforementioned arrangement, the scanner is freely attachable to, and removable from, the device main body in the first position and the second position. As a result, the scanner in the first position is highly integrated into the device main body, allowing easy and convenient installation of the scanner on the desk and enhancing portability of the scanner. The scanner is in the second position forms a transport guide surface for original document sheets from the surface that is substantially parallel to the display screen on the device main body, and can stabilise reading of information on the original document sheet through the reading surface of the scanner, facilitating information input.

Furthermore, with the aforementioned arrangement, the scanner is freely attachable to, and removable from, the device main body. As a result, the scanner becomes capable of freely scanning information drawn on a variety of original documents, further facilitating information input.

The aforementioned information managing device, in order to use the storage member as an external storage, may further include:

a first relay section including: a first concave section for holding the device main body upright by member of interposition of a side of the device main body to which the scanner is attached in the first position; and a first interface section for externally transmitting information to and from the storage member.

With the aforementioned arrangement, the provision of the first concave section and the first relay section allows the storage member to serve as an external storage. As a result, when the information managing device is used alongside with information equipment such as a personal computer, the aforementioned information equipment does not need to have an external storage device. Further, the provision of the first concave section allows the substantially rectangular parallelopiped device main body to be used in an upright position, requiring a smaller installation space.

The aforementioned information managing device, in order to use the scanner and an external scanner, may further include:

a second relay section including: a second concave section for holding the device main body upright by member of interposition of a common side of the scanner and the device main body to which the scanner is attached in the first position; and a second interface section for externally transmitting information to and from the scanner.

With the aforementioned arrangement, the provision of the second concave section and the second the relay section allows the scanner to serve as an external scanner. As a result, when the information managing device is used alongside with information equipment such as a personal computer, the aforementioned information equipment does not need to have a dedicated scanner. Further, the provision of the second concave section allows the substantially rectangular parallelopiped device main body to be used in an upright position, requiring a smaller installation space.

In the aforementioned information managing device, preferably, the second relay section includes a sheet guide section for forming a flush plane with the reading section of the scanner in order to stably transport an original document sheet through the reading section when the device main body having the scanner in the first position is attached.

With the aforementioned arrangement, the sheet guide section stabilises transport of original documents while the scanner is in operation, achieving improved scanner function easily and at low costs.

In the aforementioned information managing device, preferably, the thumbnail files each have display portion data for displaying differences between the image files on the display screen in order to distinguish between the individual image files.

With the aforementioned arrangement, the display portion data provided to each of the thumbnail files enables the types of the image files to be identified easily; for example, whether it has been read or unread, how the image files are associated. As a result, searches can be conducted more easily for an image file via the thumbnail files.

The aforementioned information managing device may further include a fourth specifying member for specifying the display portion data according to the number of times that each of the image files has ever been searched for or according to an importance specified with respect to each of the image files through the input member.

With the aforementioned arrangement, a hierarchical display of the thumbnail files weighted according to the number of times searched, importance (specified by the user), or other criteria further facilitates distinguishing those image files that have been once searched for in a display of the thumbnail files each corresponding to one of the image files. The hierarchical display is suitably realised by the use of colours, logos, icons etc. (by the use of different colours and logos).

In the aforementioned information managing device, the display portion data may include designated time data on a designated time specified through the input member, and a fifth specifying member may be further provided for specifying the display portion data according to the designated time data and input time data specified through the input member, so as to enable corresponding one or more of the thumbnail files to be distinguished from the other thumbnail files on the display screen. Typically, many of the image files need to be worked on within certain timeframes, or reviewed every predetermined period of time. With the aforementioned arrangement, by designating desired time to the image file, the thumbnail file corresponding to one of the aforementioned image files is displayed in the foreground of the display screen at the designated date and time, or can be otherwise distinguished from the thumbnail files corresponding to the other image files on the display screen. As a result, the user can more surely work on the image file to which a timeframe is designated.

In the aforementioned information managing device, the thumbnail display member may be specified so as to display clusters of the thumbnail files, and a third rewriting member may be further provided for rewriting the clusters of the thumbnail files so as to substitute each other and synthesize the clusters according to the display portion data designated through the input member.

With the aforementioned arrangement, when a plurality of clusters of thumbnail files are displayed, a new cluster can be made by synthesizing thumbnail files selected according to the display portion data. As a result, with the aforementioned arrangement, the image file meeting desired conditions can be easily searched for.

In the aforementioned information managing device, the image files each may have keyword data, and a sixth specifying member may be provided for specifying the display portion data according to the keyword data and input keyword data specified through the input member, so as to enable corresponding one or more of thumbnail files to be distinguished from the other thumbnail files on the display screen.

With the aforementioned arrangement, the image files each have keyword data. As a result, by inputting, to the keyword data, input keywords that specify display portion data, the sixth specifying member can specify the display portion data, facilitating specification of display portion data.

The aforementioned information managing device may further include a fourth rewriting member for rewriting display order of clusters of the thumbnail files according to the keyword data and the input keyword data specified through the input member.

With the aforementioned arrangement, when a plurality of clusters of thumbnail files are displayed, a new cluster can be made by synthesizing or grouping thumbnail files selected according to the display portion data. As a result, with the aforementioned arrangement, the image file meeting desired conditions can be easily searched for.

The aforementioned information managing device may further include a first deleting member for searching for similar thumbnail files through the thumbnail files on the display screen, and deleting all but one of the similar thumbnail files from the display screen.

In many cases, among the image files, there are more than one image files that have substantially the same contents. In such a case, if all of the thumbnail files corresponding to those similar image files are displayed in a three dimensional manner, there are too many thumbnail files being displayed, making it difficult to search for a desired image file and causing other inconveniences.

With the aforementioned arrangement, such inconveniences are avoidable by canceling the display of unnecessary thumbnail files by the first deleting member; for example, when there are more than one image files bearing the same name (title), but different dates and times of creation, only the thumbnail file corresponding to the image file bearing the newest date and time is displayed, and the image files bearing older creation dates and times are removed from the display.

In the aforementioned information managing device, the thumbnail display member may include grouping member for displaying the thumbnail files in groups on the display screen.

With the aforementioned arrangement, the grouping member groups the displayed thumbnail file under desired conditions, facilitating searches through the thumbnail files.

In the aforementioned information managing device, the thumbnail display member may include a marking member for searching mutually associated thumbnail files through the thumbnail files on the display screen, and adding an association marking to each of the mutually associated thumbnail files to denote the association between the associated thumbnail files.

With the aforementioned arrangement, the marking member provides an association marking to each of the thumbnail files corresponding to the image files that are highly associated with each other among all the image files, allowing the user to see and identify the association of the thumbnail files and thus facilitating searches of an image file through the thumbnail files.

In the aforementioned information managing device, the thumbnail display member may include an association display member for displaying only the thumbnail files having an association marking in the form of a ring in response to a designation of the association marking through the input member.

With the aforementioned arrangement, the association display member displays only the thumbnail files having an association marking in the form of a ring, allowing the user to see and identify the association of the thumbnail files and thus facilitating searches of an image file through the thumbnail files.

In the aforementioned information managing device, the thumbnail display member may include a second deleting member for deleting the thumbnail file having no association marking from the ring-form display in response to a designation of the association marking through the input member.

With the aforementioned arrangement, by the user designating an association marking to his/her liking when thumbnail files, including those having an association marking, are displayed in the form of a ring, the second deleting member deletes the thumbnail files having no association marking from the ring-form display, facilitating searches for the associated thumbnail files having the association marking.

The information managing device may further include:
 a position detecting member for monitoring positions of the thumbnail files in a rotational movement on the display screen; and
 a temporary suspension member for temporarily suspending the rotational movement of the thumbnail files according to the positions thereof monitored by the position detecting member when one of the thumbnail files moves into the foreground.

With the aforementioned arrangement, the aforementioned rotational movement is temporarily suspended when a desired thumbnail file moves into the foreground in a rotation of the thumbnail files displayed in a three-dimensional manner. As a result, the contents, for example, character information contained in the thumbnail file can be easily identified, facilitating searches of an image file through the thumbnail files.

The aforementioned information managing device may further include a third deleting member for deleting the thumbnail files that have been searched for from the display screen in response to a designation through the input member.

With the aforementioned arrangement, the thumbnail files that have ever been searched for are deleted from the three-dimensional display. As a result, there are less thumbnail files being displayed, enabling a desired thumbnail file to be searched for more quickly and thus speeding up image file searches.

The aforementioned information managing device may further include a storage member for moving the deleted thumbnail files to a partial cluster of other thumbnail files linked to the deleted thumbnail files according to the command entered through the input member, and storing the moved thumbnail files.

With the aforementioned arrangement, those thumbnail files that have been once searched for are deleted from a three-dimensional display. As a result, there are less thumbnail files being displayed, which enables searches to be conducted more quickly for a desire thumbnail file and thus enables quicker searches for an image file.

In the aforementioned information managing device, the thumbnail display member may include a third display member for simultaneously displaying, on the display screen, the thumbnail files that are currently displayed on the display screen and the other thumbnail files linked to those thumbnail files according to the command entered through the input member.

With the aforementioned arrangement, the thumbnail files once deleted can be displayed, enabling searches to be conducted more surely and thus searches to be conducted more surely for an image file through the thumbnail files.

In the aforementioned information managing device, the third display member may be arranged so as to display the thumbnail files that are currently displayed on the display screen and the other thumbnail files linked to those thumbnail files vertically side by side on the display screen.

With the aforementioned arrangement, the thumbnail files once deleted can be displayed, enabling searches to be conducted more surely and thus searches to be conducted more surely for an image file through the thumbnail files.

In the aforementioned information managing device, the third display member may be arranged so as to create, on the display screen, a plurality of images of the other linked thumbnail files around the images of the thumbnail files that are currently displayed on the display screen according to the command entered through the input member.

With the aforementioned arrangement, when there are many thumbnail files being displayed and searched, the thumbnail files are displayed in groups, facilitating searches for an image file through the thumbnail files.

The aforementioned information managing device may further include a scroll control member for scrolling the images in both horizontal and vertical directions to render all the images of the thumbnail files visible on the display screen.

With the aforementioned arrangement, the scroll member can move any given partial cluster of thumbnail files to the centre of the display, facilitating searches for an image file through the thumbnail files.

The aforementioned information managing device may further include:

a display time detecting member for detecting display time on the display screen for each of the images of the thumbnail files; and a fourth deleting member for deleting the images of the thumbnail files that have not searched for for a predetermined period of time from the display screen according to the display time detecting member.

With the aforementioned arrangement, if unnecessary thumbnail files are found in a temporarily created cluster of thumbnail files, those thumbnail files are stored, and there are limitlessly more thumbnail files in the cluster in some cases. However, with the aforementioned arrangement, the thumbnail files that have not searched for a predetermined period of time are deleted from the display. As a result, the number of the thumbnail files displayed is prevented from increasing meaninglessly, preventing poor search efficiency.

In the aforementioned information managing device, preferably, the polyhedron is a cube.

With the aforementioned arrangement, the cube, serving as the polyhedron, allows the thumbnail files to be displayed on square surfaces, facilitating the display of the thumbnail files that are image data.

In the aforementioned information managing device, the thumbnail display member may be specified so as to display a cube having one of the thumbnail files displayed on each surface thereof in a rotational movement around a symmetric axis of the cube.

With the aforementioned arrangement, the images of the thumbnail files on the surfaces of the cube can be moved to the foreground, for example, by either a simple vertical or horizontal rotational movement on the display screen, enabling the thumbnail files to be identified more easily.

In the aforementioned information managing device, the thumbnail display member may be specified to display the cube in a rotational movement around a symmetric axis of the cube, while a display of those surfaces that are end surfaces with respect to a direction of the symmetric axis is being fixed, and a display of the other surfaces is being rotated.

With the aforementioned arrangement, the thumbnail file that is image data displayed on a side or top surface of the cube does not turn around with the aforementioned rotational movement, which maintains the unchanged easy identification of the thumbnail file, i.e., keeps the thumbnail file to be in a easily identifiable position.

In the aforementioned information managing device, the thumbnail display member may be specified so as to display a plurality of cubes with the cube having a larger size than the others being displayed in rotation.

With the aforementioned arrangement, the cube displayed in a larger size than the others, for example, the cube displayed in the foreground, is easy to identify because of the large size thereof. By rotating such a cube, the thumbnail files that are image data displayed on the surfaces of the cube can be more surely searched.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An information managing device, comprising:

image storage means for storing a plurality of image files;

input means for entering a command to display the plurality of image files;

thumbnail storage means for storing thumbnail files each corresponding to one of the plurality of image files stored in the image storage means;

thumbnail display means for displaying images of the thumbnail files stored in the thumbnail storage means on a display screen according to a command entered through the input means; and image file display means for reading, from the image storage means, the image file corresponding to the thumbnail file selected through the input means from the thumbnail files displayed on the display screen, and displaying that image file on the display screen, wherein the thumbnail display means is specified to configure the thumbnail files so as to overlap each other partially in the form of a three-dimensional ring and sequentially from a front row to a back row that is higher in position than the front row in accordance with positions of the thumbnail files in the configuration, so that upper portions of the thumbnail files are visible.

2. The information managing device as defined in claim 1, further comprising:

command means for entering a command to set a display size of the image of the thumbnail file; and altering means for altering the display size of the image of the thumbnail file according to the command entered through the command means, and displaying the image of the thumbnail file in the altered display size on the display screen.

3. The information managing device as defined in claim 1, further comprising:

file moving means for moving one or more of the images of the thumbnail files displayed on the display screen according to the command entered through the input means.

4. The information managing device as defined in claim 3, wherein the file moving means includes selection command means for, if a front page of the thumbnail file displayed on the display screen is not a desired image, selectively controlling procedures of the file movement according to the command entered through the input means, so that either a file immediately behind the front page or a file in the far back appears on the front page in response to every command input for a file movement.

5. The information managing device as defined in claim 1, further comprising:

rotation command means for rotating the images of the thumbnail files configured in the form of a ring on the display screen around a central axis of the ring-form configuration according to the command entered through the input means.

6. The information managing device as defined in claim 5, further comprising:

position detecting means for monitoring positions of the thumbnail files in a rotational movement on the display screen; and temporary suspension means for temporarily suspending the rotational movement of the thumbnail files according to the positions thereof monitored by the position detecting means when one of the thumbnail files moves into the foreground.

7. The information managing device as defined in claim 6, further comprising:

third deleting means for deleting the thumbnail files that have been searched for from the display screen in response to a designation through the input means.

8. The information managing device as defined in claim 7, further comprising:

storage means for moving the deleted thumbnail files to a partial cluster of other thumbnail files linked to the deleted thumbnail files according to the command entered through the input means, and storing the moved thumbnail files.

9. The information managing device as defined in claim 8, wherein the thumbnail display means includes third display means for simultaneously displaying, on the display screen, the thumbnail files that are currently displayed on the display screen and the other thumbnail files linked to those thumbnail files according to the command entered through the input means.

10. The information managing device as defined in claim 9, wherein the third display means is arranged so as to display the thumbnail files that are currently displayed on the display screen and the other thumbnail files linked to those thumbnail files vertically side by side on the display screen.

11. The information managing device as defined in claim 9, wherein the third display means is arranged so as to create, on the display screen, a plurality of images of the other linked thumbnail files around the images of the thumbnail files that are currently displayed on the display screen according to the command entered through the input means.

12. The information managing device as defined in claim 11, further comprising:

scroll control means for scrolling the images in both horizontal and vertical directions to render all the images of the thumbnail files visible on the display screen.

13. The information managing device as defined in claim 6, further comprising:

display time detecting means for detecting display time on the display screen for each of the images of the thumbnail files; and fourth deleting means for deleting the images of the thumbnail files that have not searched for for a predetermined period of time from the display screen according to the display time detecting means.

14. The information managing device as defined in claim 1, wherein the thumbnail display means is specified to display the thumbnail files on respective surfaces of a polyhedron.

15. The information managing device as defined in claim 14, wherein the polyhedron is a cube.

16. The information managing device as defined in claim 15, wherein the thumbnail display means is specified so as to display a plurality of cubes with the cube having a larger size than the others being displayed in rotation.

17. The information managing device as defined in claim 14, wherein the thumbnail display means is specified so as to display a cube having one of the thumbnail files displayed on each surface thereof in a rotational movement around a symmetric axis of the cube.

18. The information managing device as defined in claim 17, wherein the thumbnail display means is specified to display the cube in a rotational movement around a symmetric axis of the cube, while a display of those surfaces that are end surfaces with respect to a direction of the symmetric axis is being fixed, and a display of the other surfaces is being rotated.

19. The information managing device as defined in claim 1, further comprising:

first rewriting means for, if one or more of the thumbnail files are selected through the input means, counting and storing the number of times that each of the selected thumbnail files has ever been searched for, and rewriting the display order of the thumbnail files stored in the thumbnail storage means according to the number.

20. The information managing device as defined in claim 9, wherein the thumbnail display means includes a first arrangement specifying section for arranging the thumbnail files on the display screen sequentially from a front row to a far back row in descending order of the number.

21. The information managing device as defined in claim 19, wherein the image files each have an identification tag to be distinguish from the other image files on the display screen.

22. The information managing device as defined in claim 21, wherein the thumbnail display means includes a selective creation section for creating a partial cluster of those image files selected according to the identification tags and creating thumbnail files according to the partial cluster.

23. The information managing device as defined in claim 21, further comprising:

first specifying means for specifying the identification tag by designating a frame in an image file display with the input means, the identification tags being used in an image file search conducted through displayed predetermined image files.

24. The information managing device as defined in claim 21, further comprising:

list display means for creating a list of display features of predetermined image files displayed on the display screen, and displaying the list on the display screen;

feature selecting means for selecting one of the display features from the list;

second specifying means for displaying image file portions showing the display feature selected through the feature selecting means, and when a desired image file portion is selected through the input means, specifying the desired image file portion as the identification tag.

25. The information managing device as defined in claim 21, further comprising:

a third specifying means for specifying the identification tag in a predetermined header area of each of the image files with the input means, the identification tags being used to register the image files.

26. The information managing device as defined in claim 1, wherein the image files each represent a bundle of original documents.

27. The information managing device as defined in claim 19, wherein the thumbnail display means includes:

monitoring means for monitoring the time when one or more of the thumbnail files are searched for, and image files corresponding to those thumbnail files are inputted; and a second rewriting means for creating a partial cluster of only those image files inputted during a period of time designated through the input means according to the monitoring means, and rewriting the thumbnail files stored in the thumbnail storage means according to the partial cluster.

28. The information managing device as defined in claim 1, wherein the thumbnail files each have display portion data for displaying differences between the image files on the display screen in order to distinguish between the individual image files.

29. The information managing device as defined in claim 28, further comprising:

fourth specifying means for specifying the display portion data according to the number of times that each of the image files has ever been searched for and also according to an importance specified with respect to each of the image files through the input means.

30. The information managing device as defined in claim 28, wherein the display portion data includes designated time data on a designated time specified through the input means, the information managing device further comprising:

fifth specifying means for specifying the display portion data according to the designated time data and input time data specified through the input means, so as to enable corresponding one or more of the thumbnail files to be distinguished from the other thumbnail files on the display screen.

31. The information managing device as defined in claim 28, wherein the thumbnail display means is specified so as to display clusters of the thumbnail files, the information managing device further comprising:

third rewriting means for rewriting the clusters of the thumbnail files so as to substitute each other and synthesize the clusters according to the display portion data designated through the input means.

32. The information managing device as defined in claim 28, wherein the image files each have keyword data, the information managing device further comprising:

sixth specifying means for specifying the display portion data according to the keyword data and input keyword data specified through the input means, so as to enable corresponding one or more of thumbnail files to be distinguished from the other thumbnail files on the display screen.

33. The information managing device as defined in claim 32, further comprising:

fourth rewriting means for rewriting display order of clusters of the thumbnail files according to the keyword data and the input keyword data specified through the input means.

34. The information managing device as defined in claim 28, wherein the thumbnail display means includes grouping means for displaying the thumbnail files in groups on the display screen.

35. The information managing device as defined in claim 28, wherein the thumbnail display means includes marking means for searching mutually associated thumbnail files through the thumbnail files on the display screen, and adding an association marking to each of the mutually associated thumbnail files to denote the association between the associated thumbnail files.

36. The information managing device as defined in claim 35, wherein the thumbnail display means includes association display means for displaying only the thumbnail files having an association marking in the form of a ring in response to a designation of the association marking through the input means.

37. The information managing device as defined in claim 36, wherein the thumbnail display means includes second deleting means for deleting the thumbnail file having no association marking from the ring-form display in response to a designation of the association marking through the input means.

38. An information managing device, comprising:

image storage means for storing a plurality of image files;

input means for entering a command to display the plurality of image files;

thumbnail storage means for storing thumbnail files each corresponding to one of the plurality of image files stored in the image storage means;

thumbnail display means for displaying images of the thumbnail files stored in the thumbnail storage means on a display screen according to a command entered through the input means;

image file display means for reading, from the image storage means, the image file corresponding to the thumbnail file selected through the input means from the thumbnail files displayed on the display screen, and displaying that image file on the display screen, wherein the thumbnail display means is specified to configure the images of the thumbnail files so as to partially overlap each other in a three-dimensional manner, first rewriting means for, when one or more of the thumbnail files are selected through the input means, counting and storing the number of times that each of the selected thumbnail files has ever been searched for, and rewriting the display order of the thumbnail files stored in the thumbnail storage means according to the number, and wherein the thumbnail display means includes a second arrangement specifying section for arranging the thumbnail files on the display screen sequentially from a front row to a far back row in the configuration in descending order of the number, with the thumbnail files other than the thumbnail file in the front row being arranged alternately on the left-hand side and on the right-hand side.

39. An information managing device, comprising:

image storage means for storing a plurality of image files;

input means for entering a command to display the plurality of image files;

thumbnail storage means for storing thumbnail files each corresponding to one of the plurality of image files stored in the image storage means;

thumbnail display means for displaying images of the thumbnail files stored in the thumbnail storage means on a display screen according to a command entered through the input means;

image file display means for reading, from the image storage means, the image file corresponding to the thumbnail file selected through the input means from the thumbnail files displayed on the display screen, and displaying that image file on the display screen, wherein the thumbnail display means is specified to configure the images of the thumbnail files so as to partially overlap each other in a three-dimensional manner, wherein the thumbnail files each have display portion data for displaying differences between the image files on the display screen in order to distinguish between the individual image files, and first deleting means for searching for similar thumbnail files through the thumbnail files on the display screen, and deleting all but one of the similar thumbnail files from the display screen.

40. An information managing device, comprising:

a memory for storing a plurality of image files;

an input for entering a command to display the plurality of image files;

wherein thumbnail files are stored, each thumbnail file corresponding to one of the plurality of image files stored;

a thumbnail display for displaying images of the thumbnail files on a display screen according to a command entered through the input; and wherein the thumbnail display is specified to configure the thumbnail files so as to, as viewed from the front of the display, overlap each other partially in the form of a three-dimensional ring and sequentially from a front row to a back row that is higher in position than the front row in accordance with positions of the thumbnail files in the configuration, so that upper portions of the thumbnail files are visible.

* * * * *